US012812240B2

(12) United States Patent
Ye et al.

(10) Patent No.: US 12,812,240 B2
(45) Date of Patent: Nov. 24, 2026

(54) OPERATION MODE SWITCHING CONTROL METHOD, ELECTRONIC DEVICE, AND READABLE STORAGE MEDIUM

(71) Applicant: Honor Device Co., Ltd., Shenzhen (CN)

(72) Inventors: Ling Ye, Shenzhen (CN); Guoqiao Chen, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 108 days.

(21) Appl. No.: 18/547,641

(22) PCT Filed: Apr. 26, 2022

(86) PCT No.: PCT/CN2022/089195

§ 371 (c)(1),
(2) Date: Aug. 23, 2023

(87) PCT Pub. No.: WO2023/019999

PCT Pub. Date: Feb. 23, 2023

(65) Prior Publication Data

US 2024/0137649 A1 Apr. 25, 2024
US 2024/0236485 A9 Jul. 11, 2024

(30) Foreign Application Priority Data

Aug. 20, 2021 (CN) ........................ 202110971250.X
Jan. 27, 2022 (CN) ........................ 202210099723.6

(51) Int. Cl.
*H04N 23/65* (2023.01)
*H04N 23/60* (2023.01)
(Continued)

(52) U.S. Cl.
CPC ......... *H04N 23/651* (2023.01); *H04N 23/611* (2023.01); *H04N 23/665* (2023.01); *H04N 23/667* (2023.01); *H04N 23/71* (2023.01)

(58) Field of Classification Search
CPC ...... H04N 26/61; H04N 26/611; H04N 26/65; H04N 26/651; H04N 26/665; H04N 26/667; H04N 26/71
See application file for complete search history.

(56) References Cited

U.S. PATENT DOCUMENTS 10,572,403 B1 2/2020 Zhan
11,223,762 B2 1/2022 Cha et al.
(Continued)

FOREIGN PATENT DOCUMENTS

CN 101459785 A 6/2009
CN 101505434 A 8/2009
(Continued)

*Primary Examiner* — Daniel M Pasiewicz
(74) *Attorney, Agent, or Firm* — WOMBLE BOND DICKINSON (US) LLP

(57) ABSTRACT

An operation mode switching control method, an electronic device, and a computer-readable storage medium are provided. The electronic device includes a processor and a camera. An image sensor in the camera includes at least two operation modes. The operation mode switching control method includes: The processor sends a signal to the image sensor through an I2C interface, where the signal is used to control the image sensor to run in an operation mode corresponding to the signal.

20 Claims, 37 Drawing Sheets

(51) Int. Cl.

| | |
|---|---|
| ***H04N 23/611*** | (2023.01) |
| ***H04N 23/667*** | (2023.01) |
| ***H04N 23/71*** | (2023.01) |

(56) References Cited

U.S. PATENT DOCUMENTS

| | | | | |
|---|---|---|---|---|
| 2010/0053326 | A1 | 3/2010 | Zhao et al. | |
| 2017/0359499 | A1 | 12/2017 | Thanigasalam | |
| 2019/0034374 | A1 | 1/2019 | Kim et al. | |
| 2019/0129875 | A1 | 5/2019 | Chard et al. | |
| 2020/0272592 | A1 | 8/2020 | Chan et al. | |
| 2020/0412972 | A1* | 12/2020 | Kadambala .......... | H04N 23/651 |
| 2021/0176396 | A1 | 6/2021 | Cha et al. | |
| 2021/0218898 | A1 | 7/2021 | Moon | |
| 2022/0353411 | A1* | 11/2022 | Kim ..................... | H04N 23/611 |
| 2023/0319395 | A1 | 10/2023 | Qi et al. | |

FOREIGN PATENT DOCUMENTS

| | | | |
|---|---|---|---|
| CN | 102547158 | A | 7/2012 |
| CN | 102625170 | A | 8/2012 |
| CN | 102929826 | A | 2/2013 |
| CN | 105100730 | A | 11/2015 |
| CN | 105430276 | A | 3/2016 |
| CN | 110177199 | A | 8/2019 |
| CN | 112148662 | A | 12/2020 |
| CN | 112351194 | A | 2/2021 |
| CN | 112929560 | A | 6/2021 |
| TW | 202110144 | A | 3/2021 |
| WO | 2021038923 | A1 | 3/2021 |

* cited by examiner

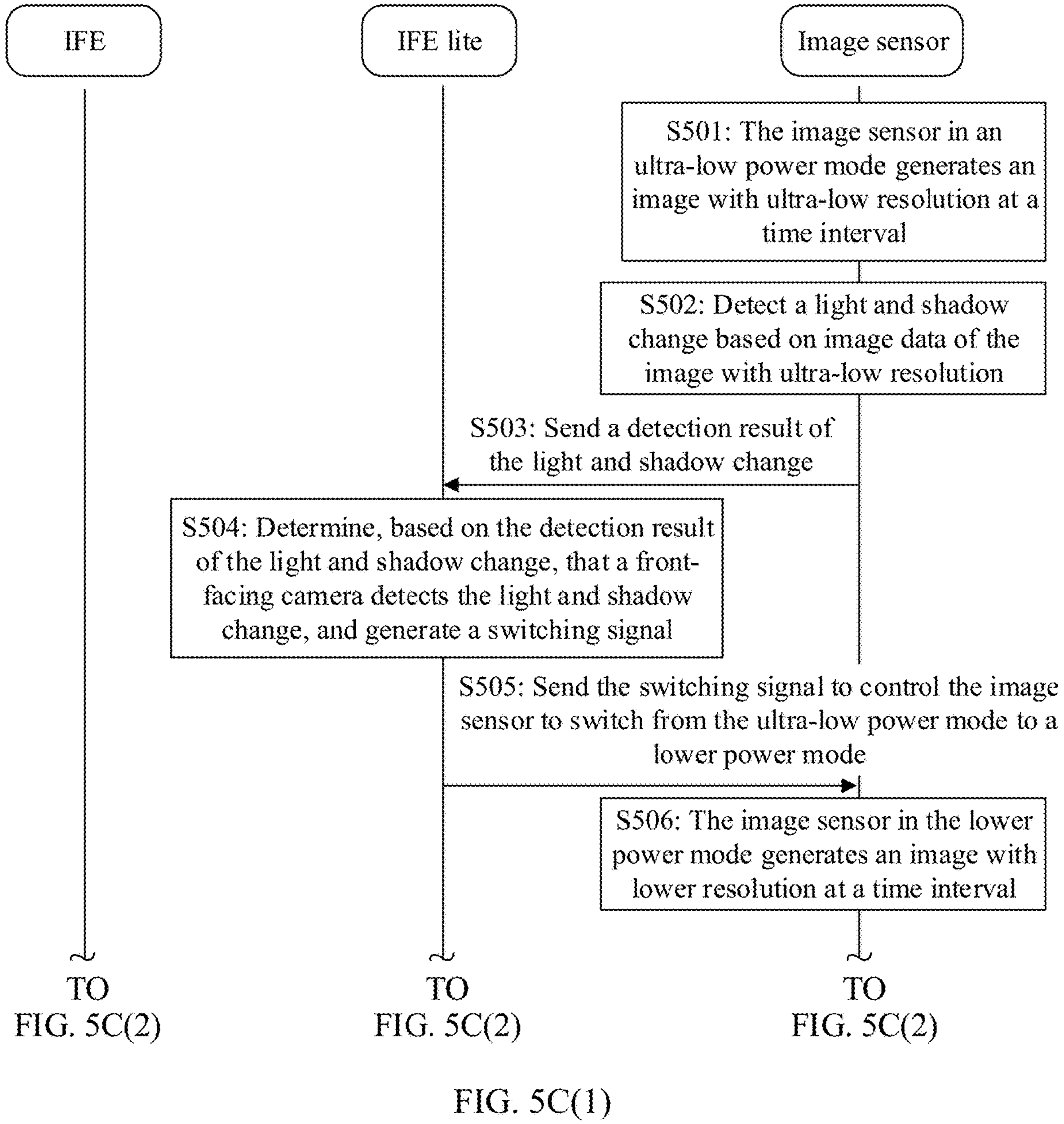
FIG. 5C(1)

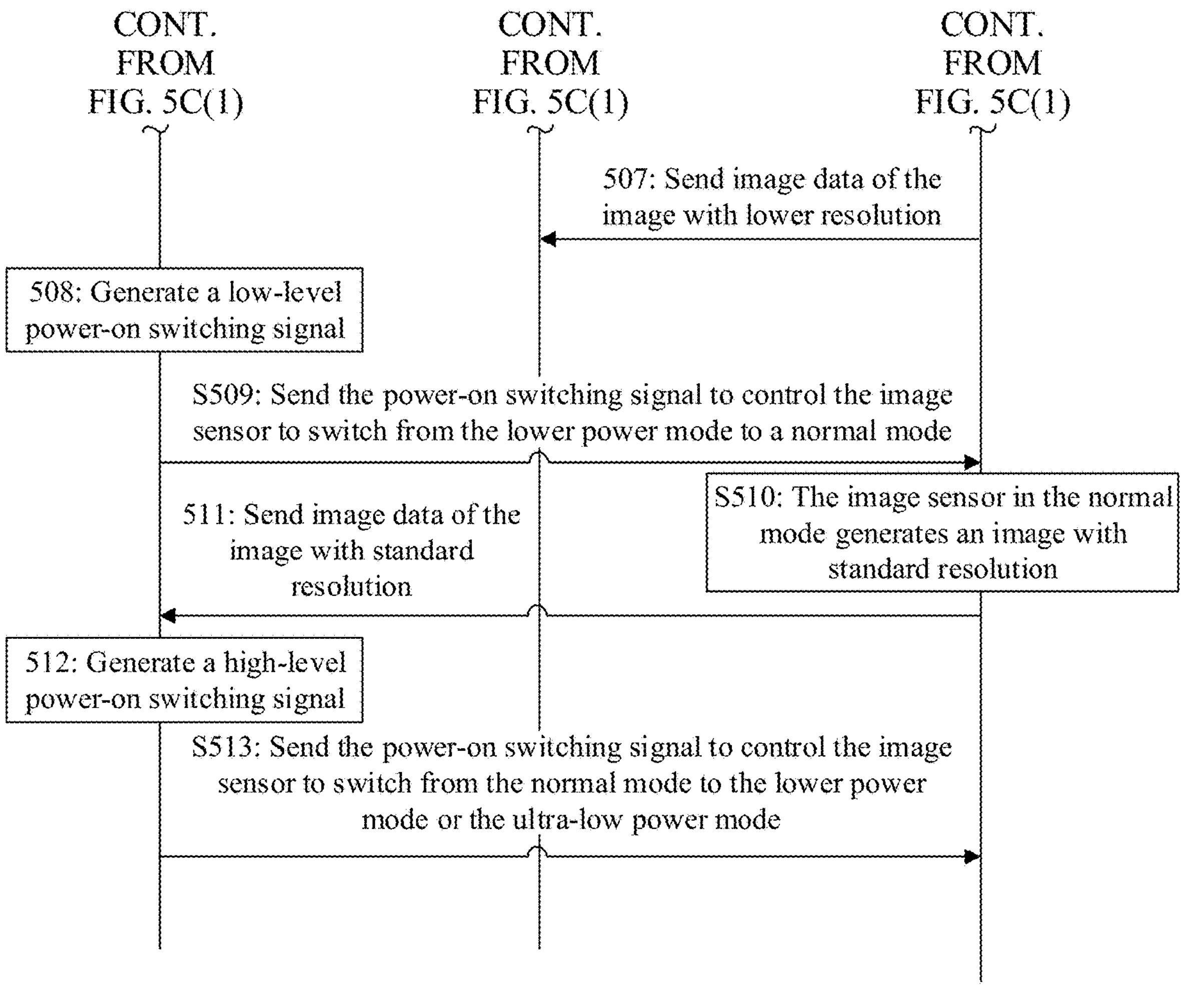
FIG. 5C(2)

| Mode | I2C address | Switching signal 1 | Switching signal 2 |
|---|---|---|---|
| normal mode | I2C 1 | 0 | |
| Lower power mode | I2C 1 | 1 | |
| Low power mode | I2C 2 | | 0 |
| Ultra-low power mode | I2C2 | | 1 |

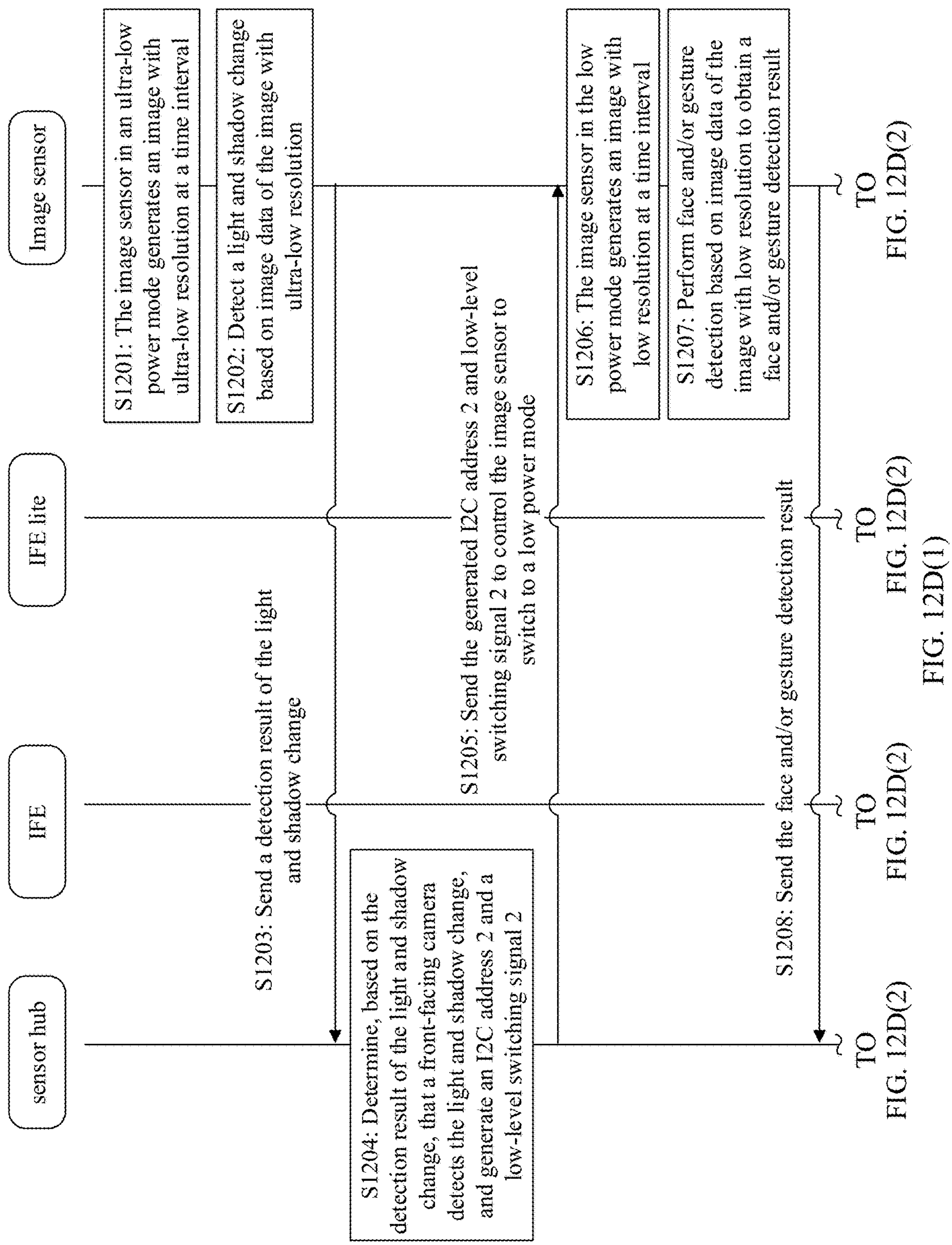
FIG. 12D(1)

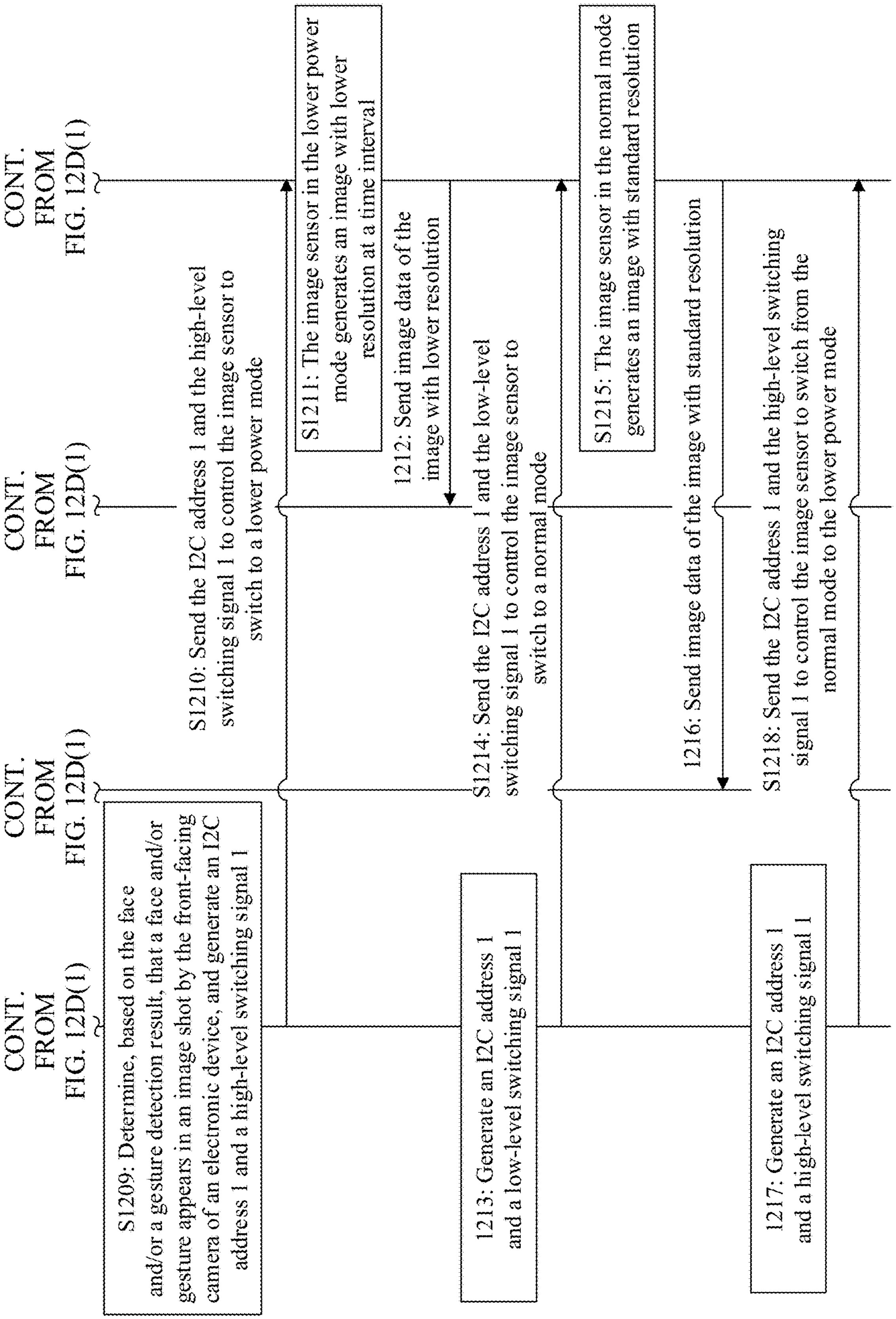
FIG. 12D(2)

OPERATION MODE SWITCHING CONTROL METHOD, ELECTRONIC DEVICE, AND READABLE STORAGE MEDIUM

This application claims priority to Chinese Patent Application No. 202110971250.X, filed with the China National Intellectual Property Administration on Aug. 20, 2021 and entitled "OPERATION MODE SWITCHING METHOD, ELECTRONIC DEVICE, AND MEDIUM", and claims priority to Chinese Patent Application No. 202210099723.6, filed with the China National Intellectual Property Administration on Jan. 27, 2022 and entitled "OPERATION MODE SWITCHING CONTROL METHOD, ELECTRONIC DEVICE, AND READABLE STORAGE MEDIUM", which are incorporated herein by reference in their entireties.

TECHNICAL FIELD

This application relates to the field of data processing technologies, and in particular, to an operation mode switching control method, an electronic device, and a readable storage medium.

BACKGROUND

A camera of an electronic device, for example, a mobile phone, includes an image sensor, and the image sensor includes two operation modes to adapt to different power consumption requirements. In an operation mode switching process of the image sensor, the following problem exists:

Mutual switching between the two operation modes of the image sensor needs a processor to generate a high level or a low level acting on a switching pin of the image sensor, and control logic of the processor is complex.

SUMMARY

This application provides an operation mode switching control method, an electronic device, a program product, and a storage medium, to resolve a problem that control logic is complex during operation mode switching of an image sensor.

To achieve the foregoing objective, this application provides the following technical solutions.

According to a first aspect, this application provides an operation mode switching control method, applied to an electronic device. The electronic device includes a processor and a camera, an image sensor in the camera includes at least two operation modes. The operation mode switching control method includes: The processor sends a signal to the image sensor through an I2C interface, where the signal is used to control the image sensor to run in an operation mode corresponding to the signal.

It can be learned from the foregoing content that the processor sends the signal to the image sensor through the I2C interface, to control the image sensor to run in the operation mode corresponding to the signal. In this way, the processor controls operation mode switching of the image sensor by sending the signal through the I2C interface, and the processor does not need to generate a high/low level to implement operation mode switching of the image sensor. Therefore, a problem that complex control logic occurs because the processor implements operation mode switching of the image sensor by using the high/low level is resolved.

In a possible implementation, the signal is an I2C address.

In a possible implementation, the image sensor includes an I2C control module, and that the processor sends a signal to the image sensor through an I2C interface includes: The processor sends the I2C address to the image sensor through the I2C interface to trigger the I2C control module corresponding to the I2C address to run, to control the image sensor to run in an operation mode corresponding to the I2C address.

In a possible implementation, one I2C control module corresponds to two I2C addresses, and one I2C address corresponds to at least one operation mode of the image sensor.

In a possible implementation, the image sensor includes I2C control modules of a same quantity as that of the operation modes of the image sensor, each I2C control module corresponds to one I2C address, and one I2C address corresponds to one operation mode of the image sensor.

In a possible implementation, one I2C address corresponds to at least two operation modes of the image sensor, and the operation mode switching control method further includes: The image sensor controls, in response to a switching signal, the image sensor to run in one of operation modes corresponding to a same I2C address, where the switching signal is sent by the processor to the image sensor or is generated by the image sensor.

In a possible implementation, the operation modes of the image sensor includes a first operation mode and a second operation mode, and the second operation mode has lower power consumption than that of the first operation mode. The first operation mode may also be referred to as a normal operation mode or a normal mode, and resolution of an image generated in the first operation mode is first image resolution. The second operation mode may also be referred to as a lower power mode, and resolution of an image generated in the second operation mode is second image resolution. The first image resolution>the second image resolution. The first operation mode of the image sensor corresponds to a first I2C address, and the second operation mode of the image sensor corresponds to a second I2C address. That the processor sends a signal to the image sensor through an I2C interface includes: When determining that the camera is enabled, the processor sends the first I2C address to the image sensor to control the image sensor to run in the first operation mode; when determining that the camera is disabled, the processor sends the second I2C address to the image sensor to control the image sensor to run in the second operation mode; and when determining that a display of the electronic device is in a screen-off state, the processor sends the second I2C address to the image sensor to control the image sensor to run in the second operation mode.

In a possible implementation, the operation modes of the image sensor include a first operation mode, a second operation mode, and a third operation mode, the second operation mode has lower power consumption than that of the first operation mode, the third operation mode has lower power consumption than that of the second operation mode, the first operation mode of the image sensor corresponds to a first I2C address, the second operation mode of the image sensor corresponds to a second I2C address, and the third operation mode of the image sensor corresponds to a third I2C address. The first operation mode may also be referred to as a normal operation mode or a normal mode, and resolution of an image generated in the first operation mode is first image resolution. The second operation mode may also be referred to as a lower power mode, and resolution of an image generated in the second operation mode is second image resolution. The third operation mode may also be referred to as an ultra-low power mode, and resolution of an image generated in the third operation mode is third image resolution. The first image resolution>the second image resolution>the third image resolution. That the processor sends a signal to the image sensor through an I2C interface includes: When determining that the camera is enabled, the processor sends the first I2C address to the image sensor to control the image sensor to run in the first operation mode; when determining that the camera is disabled, the processor sends the second I2C address to the image sensor to control the image sensor to run in the second operation mode, or sends the third I2C address to the image sensor to control the image sensor to run in the third operation mode; when determining that a display of the electronic device is in a screen-off state, the processor sends the second I2C address to the image sensor to control the image sensor to run in the second operation mode, or sends the third I2C address to the image sensor to control the image sensor to run in the third operation mode; the processor determines, based on a detection result of a light and shadow change, that the camera detects the light and shadow change, and sends the second I2C address to the image sensor to control the image sensor to run in the second operation mode, where the detection result of the light and shadow change is obtained by detecting the light and shadow change by the image sensor in the third operation mode based on image data of an image with ultra-low resolution; and the processor determines, based on image data of an image with lower resolution, that the electronic device meets an exit condition of the second operation mode, and sends the third I2C address to the image sensor to control the image sensor to run in the third operation mode, where the image with lower resolution is generated by the image sensor in the second operation mode.

In this possible implementation, because the ultra-low power mode is set for the image sensor, and the ultra-low power mode has lower power consumption than that of the lower power mode, the image sensor runs in the ultra-low power mode when the electronic device is not used, thereby reducing power consumption. That the electronic device is not used may be understood as that the electronic device is in a standby state, the display is in the screen-off state, or the electronic device is in a locked state.

In a possible implementation, the operation modes of the image sensor include a first operation mode, a second operation mode, and a third operation mode, the second operation mode has lower power consumption than that of the first operation mode, the third operation mode has lower power consumption than that of the second operation mode, the first operation mode of the image sensor corresponds to a first I2C address, and the second operation mode and the third operation mode of the image sensor correspond to a second I2C address. The first operation mode may also be referred to as a normal operation mode or a normal mode, and resolution of an image generated in the first operation mode is first image resolution. The second operation mode may also be referred to as a lower power mode, and resolution of an image generated in the second operation mode is second image resolution. The third operation mode may also be referred to as an ultra-low power mode, and resolution of an image generated in the third operation mode is third image resolution. The first image resolution>the second image resolution>the third image resolution. That the processor sends a signal to the image sensor through an I2C interface includes: When determining that the camera is enabled, the processor sends the first I2C address to the image sensor to control the image sensor to run in the first operation mode; when determining that the camera is disabled, the processor sends the second I2C address to the image sensor to control the image sensor to run in the second operation mode or the third operation mode; and when determining that a display of the electronic device is in a screen-off state, the processor sends the second I2C address to the image sensor to control the image sensor to run in the second operation mode or the third operation mode.

In this possible implementation, because the ultra-low power mode is set for the image sensor, and the ultra-low power mode has lower power consumption than that of the lower power mode, the image sensor runs in the ultra-low power mode when the electronic device is not used, thereby reducing power consumption. That the electronic device is not used may be understood as that the electronic device is in a standby state, the display is in the screen-off state, or the electronic device is in a locked state. In addition, the second operation mode and the third operation mode of the image sensor correspond to the second I2C address. In this way, the second I2C address can be multiplexed in a time division manner.

In a possible implementation, that the image sensor controls, in response to a switching signal, the image sensor to run in one of operation modes corresponding to a same I2C address includes: The image sensor controls, in response to a first switching signal, the image sensor to run in the second operation mode, where the first switching signal is generated when the processor or the image sensor determines, based on a detection result of a light and shadow change, that the camera detects the light and shadow change, and the detection result of the light and shadow change is obtained by detecting the light and shadow change by the image sensor in the third operation mode based on image data of an image with ultra-low resolution; and the image sensor controls, in response to a second switching signal, the image sensor to run in the third operation mode, where the second switching signal is generated when the processor or the image sensor determines, based on image data of an image with lower resolution, that the electronic device meets an exit condition of the second operation mode, and the image with lower resolution is generated by the image sensor in the second operation mode.

In a possible implementation, that the image sensor controls, in response to a switching signal, the image sensor to run in one of operation modes corresponding to a same I2C address includes: The image sensor receives a control signal transmitted by an I2C control module corresponding to the second I2C address, and controls the image sensor to run in an operation mode specified by the control signal, where the control signal is used to specify the third operation mode or the second operation mode.

In a possible implementation, the operation modes of the image sensor include a first operation mode, a second operation mode, a third operation mode, and a fourth operation mode, the second operation mode has lower power consumption than that of the first operation mode, the fourth operation mode has lower power consumption than that of the second operation mode, the third operation mode has lower power consumption than that of the fourth operation mode, the first operation mode corresponds to a first I2C address, the second operation mode corresponds to a second I2C address, the fourth operation mode corresponds to a third I2C address, and the third operation mode corresponds to a fourth I2C address. The first operation mode may also be referred to as a normal operation mode or a normal mode, and resolution of an image generated in the first operation mode is first image resolution. The second operation mode may also be referred to as a lower power mode, and resolution of an image generated in the second operation mode is second image resolution. The third operation mode may also be referred to as an ultra-low power mode, and resolution of an image generated in the third operation mode is third image resolution. The fourth operation mode may be referred to as a low power mode, and resolution of an image generated in the fourth operation mode is fourth image resolution. The first image resolution>the second image resolution>the fourth image resolution>the third image resolution. That the processor sends a signal to the image sensor through an I2C interface includes: When determining that the camera is enabled, the processor sends the first I2C address to the image sensor to control the image sensor to run in the first operation mode; when determining that the camera is disabled, the processor sends the second I2C address to the image sensor to control the image sensor to run in the second operation mode, sends the third I2C address to the image sensor to control the image sensor to run in the fourth operation mode, or sends the fourth I2C address to the image sensor to control the image sensor to run in the third operation mode; when determining that a display of the electronic device is in a screen-off state, the processor sends the third I2C address to the image sensor to control the image sensor to run in the fourth operation mode, or sends the fourth I2C address to the image sensor to control the image sensor to run in the third operation mode; when determining, based on a detection result of a light and shadow change, that the camera detects the light and shadow change, the processor sends the third I2C address to the image sensor to control the image sensor to run in the fourth operation mode, where the detection result of the light and shadow change is obtained by detecting the light and shadow change by the image sensor in the third operation mode based on image data of an image with ultra-low resolution; when determining, based on a face and/or gesture detection result, that a face and/or gesture appears in an image shot by the camera, the processor sends the second I2C address to the image sensor to control the image sensor to run in the second operation mode, where the face and/or gesture detection result is obtained by performing face and/or gesture detection by the image sensor in the fourth operation mode based on image data of an image with low resolution; when determining, based on the face and/or gesture detection result, that no face and/or gesture appears in the image shot by the camera, the processor sends the fourth I2C address to the image sensor to control the image sensor to run in the third operation mode; and when determining, based on image data of an image with lower resolution, that the electronic device meets an exit condition of the second operation mode, the processor sends the fourth I2C address to the image sensor to control the image sensor to run in the third operation mode, where the image with lower resolution is generated by the image sensor in the second operation mode.

In this possible implementation, the low power mode and the ultra-low power mode are additionally set for the image sensor, the ultra-low power mode has lower power consumption than that of the low power mode, and the low power mode has lower power consumption than that of the lower power mode. In this way, it can be ensured that the electronic device controls the image sensor to run in the four operation modes, to further ensure that the electronic device controls the image sensor to run in a mode with appropriate power consumption, thereby reducing power consumption of the electronic device.

In a possible implementation, the operation modes of the image sensor include a first operation mode, a second operation mode, a third operation mode, and a fourth operation mode, the second operation mode has lower power consumption than that of the first operation mode, the fourth operation mode has lower power consumption than that of the second operation mode, the third operation mode has lower power consumption than that of the fourth operation mode, the first operation mode and the second operation mode correspond to a first I2C address, and the fourth operation mode and the third operation mode correspond to a second I2C address. The first operation mode may also be referred to as a normal operation mode or a normal mode, and resolution of an image generated in the first operation mode is first image resolution. The second operation mode may also be referred to as a lower power mode, and resolution of an image generated in the second operation mode is second image resolution. The third operation mode may also be referred to as an ultra-low power mode, and resolution of an image generated in the third operation mode is third image resolution. The fourth operation mode may be referred to as a low power mode, and resolution of an image generated in the fourth operation mode is fourth image resolution. The first image resolution>the second image resolution>the fourth image resolution>the third image resolution. That the processor sends a signal to the image sensor through an I2C interface includes: When determining that the camera is enabled, the processor sends the first I2C address to the image sensor to control the image sensor to run in the first operation mode; the processor determines that the camera is disabled, and sends the second I2C address to the image sensor to control the image sensor to run in the third operation mode; when determining that a display is in a screen-off state, the processor sends the second I2C address to the image sensor to control the image sensor to run in the third operation mode; and when determining, based on a face and/or gesture detection result, that no face and/or gesture appears in an image shot by the camera, the processor sends the second I2C address to the image sensor to control the image sensor to run in the third operation mode, where the face and/or gesture detection result is obtained by performing face and/or gesture detection by the image sensor in the fourth operation mode based on image data of an image with low resolution.

In a possible implementation, that the image sensor controls, in response to a switching signal, the image sensor to run in one of operation modes corresponding to a same I2C address includes: The image sensor controls, in response to a first switching signal, the image sensor to run in the fourth operation mode, where the first switching signal is generated when the processor or the image sensor determines, based on a detection result of a light and shadow change, that the camera detects the light and shadow change, and the detection result of the light and shadow change is obtained by detecting the light and shadow change by the image sensor in the third operation mode based on image data of an image with ultra-low resolution; and the image sensor controls, in response to a second switching control, the image sensor to run in the second operation mode, where the second switching signal is generated when the processor determines, based on the face and/or gesture detection result, that a face and/or gesture appears in the image shot by the camera, where the face and/or gesture detection result is obtained by performing face and/or gesture detection by the image sensor in the fourth operation mode based on the image data of the image with low resolution.

In a possible implementation, one I2C address corresponds to at least two operation modes of the image sensor, and that the processor sends a signal to the image sensor through an I2C interface includes: The processor sends the I2C address and a switching signal to the image sensor to control the image sensor to run in an operation mode corresponding to the I2C address and the switching signal.

In a possible implementation, the operation modes of the image sensor include a first operation mode, a second operation mode, a third operation mode, and a fourth operation mode, the second operation mode has lower power consumption than that of the first operation mode, the fourth operation mode has lower power consumption than that of the second operation mode, the third operation mode has lower power consumption than that of the fourth operation mode, the first operation mode and the second operation mode correspond to a first I2C address, and the fourth operation mode and the third operation mode correspond to a second I2C address. The first operation mode may also be referred to as a normal operation mode or a normal mode, and resolution of an image generated in the first operation mode is first image resolution. The second operation mode may also be referred to as a lower power mode, and resolution of an image generated in the second operation mode is second image resolution. The third operation mode may also be referred to as an ultra-low power mode, and resolution of an image generated in the third operation mode is third image resolution. The fourth operation mode may be referred to as a low power mode, and resolution of an image generated in the fourth operation mode is fourth image resolution. The first image resolution>the second image resolution>the fourth image resolution>the third image resolution. That the processor sends the I2C address and a switching signal to the image sensor to control the image sensor to run in an operation mode corresponding to the I2C address and the switching signal includes: When determining that the camera is enabled, the processor sends the first I2C address and a first switching signal to the image sensor to control the image sensor to run in the first operation mode; when determining that the camera is disabled, the processor sends the first I2C address and a second switching signal to the image sensor to control the image sensor to run in the second operation mode, sends the second I2C address and a third switching signal to the image sensor to control the image sensor to run in the fourth operation mode, or sends the second I2C address and a fourth switching signal to the image sensor to control the image sensor to run in the third operation mode; when determining that a display of the electronic device is in a screen-off state, the processor sends the second I2C address and the third switching signal to the image sensor to control the image sensor to run in the fourth operation mode, or sends the second I2C address and the fourth switching signal to the image sensor to control the image sensor to run in the third operation mode; when determining, based on a detection result of a light and shadow change, that the camera detects the light and shadow change, the processor sends the second I2C address and the third switching signal to the image sensor to control the image sensor to run in the fourth operation mode, where the detection result of the light and shadow change is obtained by detecting the light and shadow change by the image sensor in the third operation mode based on image data of an image with ultra-low resolution; when determining, based on a face and/or gesture detection result, that a face and/or gesture appears in an image shot by the camera, the processor sends the first I2C address and the second switching signal to the image sensor to control the image sensor to run in the second operation mode, where the face and/or gesture detection result is obtained by performing face and/or gesture detection by the image sensor in the fourth operation mode based on image data of an image with low resolution; when determining, based on the face and/or gesture detection result, that no face and/or gesture appears in the image shot by the camera, the processor sends the second I2C address and the fourth switching signal to the image sensor to control the image sensor to run in the third operation mode; and when determining, based on image data of an image with lower resolution, that the electronic device meets an exit condition of the second operation mode, the processor sends the second I2C address and the fourth switching signal to the image sensor to control the image sensor to run in the third operation mode, where the image with lower resolution is generated by the image sensor in the second operation mode.

In a possible implementation, the operation modes of the image sensor include a first operation mode, a second operation mode, a third operation mode, and a fourth operation mode, the second operation mode has lower power consumption than that of the first operation mode, the fourth operation mode has lower power consumption than that of the second operation mode, the third operation mode has lower power consumption than that of the fourth operation mode, the first operation mode corresponds to a first I2C address, and the second operation mode, the fourth operation mode, and the third operation mode correspond to a second I2C address. The first operation mode may also be referred to as a normal operation mode or a normal mode, and resolution of an image generated in the first operation mode is first image resolution. The second operation mode may also be referred to as a lower power mode, and resolution of an image generated in the second operation mode is second image resolution. The third operation mode may also be referred to as an ultra-low power mode, and resolution of an image generated in the third operation mode is third image resolution. The fourth operation mode may be referred to as a low power mode, and resolution of an image generated in the fourth operation mode is fourth image resolution. The first image resolution>the second image resolution>the fourth image resolution>the third image resolution. That the processor sends a signal to the image sensor through an I2C interface includes: When determining that the camera is enabled, the processor sends the first I2C address to the image sensor to control the image sensor to run in the first operation mode.

In a possible implementation, that the image sensor controls, in response to a switching signal, the image sensor to run in one of operation modes corresponding to a same I2C address includes: The image sensor receives a control signal transmitted by an I2C control module corresponding to the second I2C address, and controls the image sensor to run in an operation mode specified by the control signal, where the control signal is used to specify the third operation mode, the second operation mode, or the fourth operation mode.

In a possible implementation, control signals transmitted by the I2C control module corresponding to the second I2C address include a first control signal, a second control signal, and a third control signal; an operation mode specified by the first control signal is the third operation mode, and is generated when the processor determines that the camera is disabled, is generated when the processor determines that a display of the electronic device is in a screen-off state, is generated when the processor determines, based on a face and/or gesture detection result, that no face and/or gesture appears in an image shot by the camera, or is generated when the processor determines, based on image data of an image with lower resolution, that the electronic device meets an exit condition of the second operation mode; an operation mode specified by the second control signal is the fourth operation mode, and is generated when the processor determines that the camera is disabled, is generated when the processor determines that the display of the electronic device is in the screen-off state, or is generated when the processor determines, based on a detection result of a light and shadow change, that the camera detects the light and shadow change, where the detection result of the light and shadow change is obtained by detecting the light and shadow change by the image sensor in the third operation mode based on image data of an image with ultra-low resolution; and an operation mode specified by the third control signal is the second operation mode, and is generated when the processor determines that the camera is disabled, or is generated when the processor determines, based on the face and/or gesture detection result, that a face and/or gesture appears in the image shot by the camera.

In a possible implementation, the operation modes of the image sensor include a first operation mode, a third operation mode, and a fourth operation mode, the fourth operation mode has lower power consumption than that of the first operation mode, the third operation mode has lower power consumption than that of the fourth operation mode, the first operation mode of the image sensor corresponds to a first I2C address, the fourth operation mode of the image sensor corresponds to a second I2C address, and the third operation mode of the image sensor corresponds to a third I2C address. The first operation mode may also be referred to as a normal operation mode or a normal mode, and resolution of an image generated in the first operation mode is first image resolution. The third operation mode may also be referred to as an ultra-low power mode, and resolution of an image generated in the third operation mode is third image resolution. The fourth operation mode may be referred to as a low power mode, and resolution of an image generated in the fourth operation mode is fourth image resolution. The first image resolution>the fourth image resolution>the third image resolution. That the processor sends a signal to the image sensor through an I2C interface includes: When determining that the camera is enabled, the processor sends the first I2C address to the image sensor to control the image sensor to run in the first operation mode; when determining that the camera is disabled, the processor sends the second I2C address to the image sensor to control the image sensor to run in the fourth operation mode, or sends the third I2C address to the image sensor to control the image sensor to run in the third operation mode; when determining that a display of the electronic device is in a screen-off state, the processor sends the second I2C address to the image sensor to control the image sensor to run in the fourth operation mode, or sends the third I2C address to the image sensor to control the image sensor to run in the third operation mode; when determining, based on a detection result of a light and shadow change, that the camera detects the light and shadow change, the processor sends the second I2C address to the image sensor to control the image sensor to run in the fourth operation mode, where the detection result of the light and shadow change is obtained by detecting the light and shadow change by the image sensor in the third operation mode based on image data of an image with ultra-low resolution; and when determining, based on a face and/or gesture detection result, that no face and/or gesture appears in an image shot by the camera, the processor sends the third I2C address to the image sensor to control the image sensor to run in the third operation mode, where the face and/or gesture detection result is obtained by performing face and/or gesture detection by the image sensor in the fourth operation mode based on image data of an image with low resolution.

In a possible implementation, the operation modes of the image sensor include a first operation mode, a third operation mode, and a fourth operation mode, the fourth operation mode has lower power consumption than that of the first operation mode, the third operation mode has lower power consumption than that of the fourth operation mode, the first operation mode of the image sensor corresponds to a first I2C address, the fourth operation mode and the third operation mode of the image sensor correspond to a second I2C address. The first operation mode may also be referred to as a normal operation mode or a normal mode, and resolution of an image generated in the first operation mode is first image resolution. The third operation mode may also be referred to as an ultra-low power mode, and resolution of an image generated in the third operation mode is third image resolution. The fourth operation mode may be referred to as a low power mode, and resolution of an image generated in the fourth operation mode is fourth image resolution. The first image resolution>the fourth image resolution>the third image resolution. That the processor sends a signal to the image sensor through an I2C interface includes: When determining that the camera is enabled, the processor sends the first I2C address to the image sensor to control the image sensor to run in the first operation mode; when determining that the camera is disabled, the processor sends the second I2C address to the image sensor to control the image sensor to run in the fourth operation mode or the third operation mode; and when determining that a display of the electronic device is in a screen-off state, the processor sends the second I2C address to the image sensor to control the image sensor to run in the fourth operation mode or the third operation mode.

In a possible implementation, that the image sensor controls, in response to a switching signal, the image sensor to run in one of operation modes corresponding to a same I2C address includes: The image sensor controls, in response to a first switching signal, the image sensor to run in the fourth operation mode, where the first switching signal is generated when the processor or the image sensor determines, based on a detection result of a light and shadow change, that the camera detects the light and shadow change, and the detection result of the light and shadow change is obtained by detecting the light and shadow change by the image sensor in the third operation mode based on image data of an image with ultra-low resolution; and the image sensor controls, in response to a second switching signal, the image sensor to run in the third operation mode, where the second switching signal is generated when the processor or the image sensor determines, based on a face and/or gesture detection result, that no face and/or gesture appears in an image shot by the camera, and the face and/or gesture detection result is obtained by performing face and/or gesture detection by the image sensor in the fourth operation mode based on image data of an image with low resolution.

In a possible implementation, that the image sensor controls, in response to a switching signal, the image sensor to run in one of operation modes corresponding to a same I2C address includes: The image sensor receives a control signal transmitted by an I2C control module corresponding to the second I2C address, and controls the image sensor to run in an operation mode specified by the control signal, where the control signal is used to specify the third operation mode or the fourth operation mode.

In a possible implementation, an object that sends the signal includes: a camera driver of the processor, an image front end lite or an image front end in an image signal processor of the processor, an application processor of the processor, or a smart sensor hub of the processor.

In a possible implementation, the switching signal is sent to the image sensor by the image front end lite or the image front end in the image signal processor of the processor, the application processor of the processor, or the smart sensor hub.

In this possible implementation, the smart sensor hub has low power consumption. Therefore, generating and sending the switching signal by the smart sensor hub has an advantage of low power consumption.

According to a second aspect, this application provides an electronic device, including: a display; a camera, where the camera includes an image sensor, and the image sensor includes at least two operation modes; one or more processors; and a memory, where the memory stores a program, and when the program is executed by the one or more processors, the electronic device is enabled to perform the operation mode switching control method according to any item of the first aspect.

According to a third aspect, this application provides a computer-readable storage medium. The computer-readable storage medium stores a computer program, and when the computer program is executed by a processor, the operation mode switching control method according to any item of the first aspect is implemented.

According to a fourth aspect, this application provides a computer program product. When the computer program product is run on a computer, the computer is enabled to perform the operation mode switching control method according to any item of the first aspect.

BRIEF DESCRIPTION OF DRAWINGS

FIG. 5C(1) and FIG. 5C(2) are a sequence diagram of an operation mode switching control method according to Embodiment 1 of this application;

DESCRIPTION OF EMBODIMENTS

The terms “first”, “second”, “third”, and the like in the specification, claims, and accompanying drawings of this application are used to distinguish between different objects, but are not used to limit a specific sequence.

In the embodiments of this application, words such as “example” or “for example” are used to represent giving an example, an illustration, or a description. Any embodiment or design solution described as “example” or “for example” in the embodiments of this application should not be construed as being more preferred or advantageous than other embodiments or design solutions. Exactly, use of the words such as “example” or “for example” is intended to present a related concept in a specific manner.

A user may take a photo or take a selfie by using an electronic device, may view a webpage, news, an article, and the like by using the electronic device, and may further play a game and watch a video by using the electronic device. When the user uses the electronic device to view the webpage, the news, and the article, play the game, or watch the video, the user gazes at a display of the electronic device for a long time. To support the user for long-time gazing at the display, the electronic device takes a photo for the user by using a front-facing camera. After it is detected, based on an image shot by the front-facing camera, that the user gazes at the display for a long time, a plurality of corresponding events may be performed, for example, the display is maintained in a screen-on state, and ringtone volume is turned down.

Figure 1A:
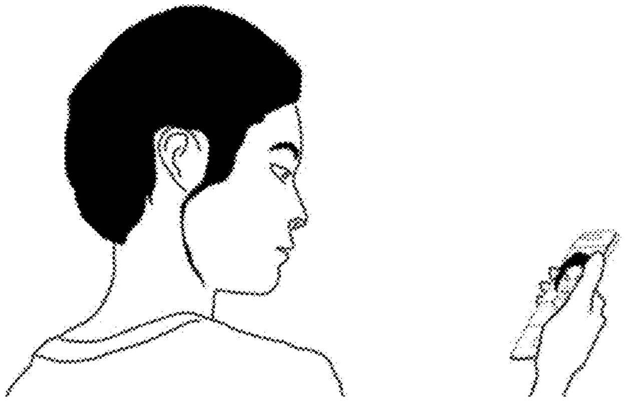
FIG. 1A and FIG. 1B are diagrams of application scenarios of an electronic device according to this application.
Figure 1B:
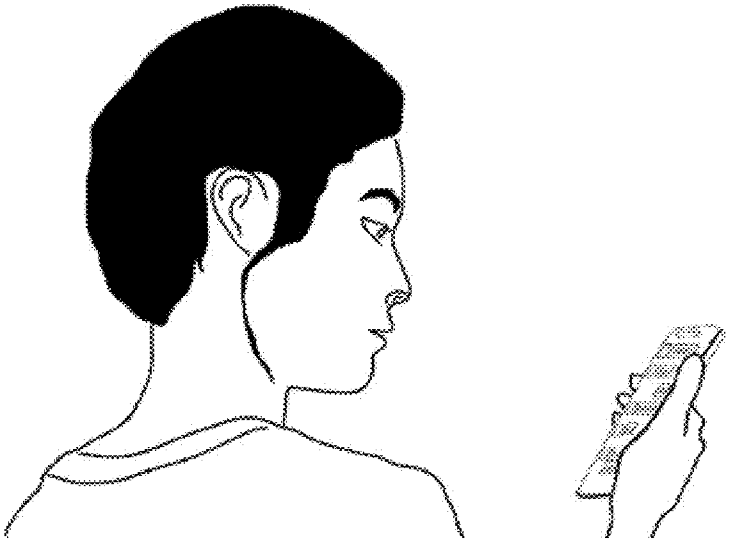

FIG. 1A shows a scenario in which a user takes a selfie by using a front-facing camera of an electronic device. FIG. 1B shows a scenario in which a user views a webpage by using an electronic device. The following uses the two scenarios as examples for solution description. In addition, because the front-facing camera of the electronic device is used in both the two scenarios, the front-facing camera of the electronic device is used as an example for description. However, none of these constitutes a limitation on an application scenario of the solutions.

Figure 2:
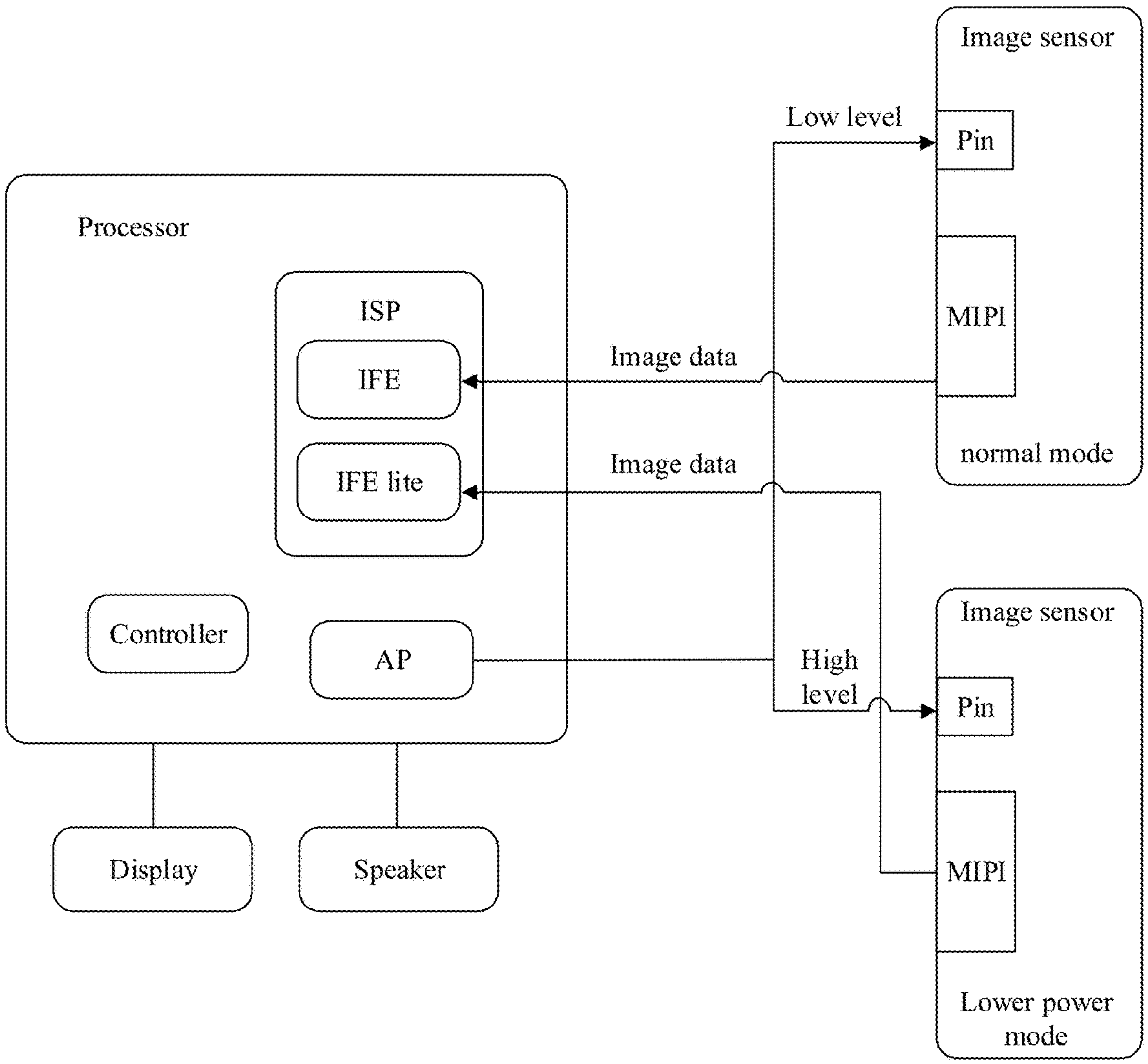
FIG. 2 is a schematic diagram of a connection between an image sensor and a processor in an electronic device according to this application.

Refer to FIG. 2. A normal mode and a lower power mode are usually set for an image sensor in the front-facing camera of the electronic device, and the lower power mode has lower power consumption than that of the normal mode. The normal mode may also be referred to as a normal operation mode, and belongs to a common imaging mode. The electronic device uses the front-facing camera for shooting, and the image sensor runs in the normal mode.

The electronic device is powered on, and the front-facing camera (the front-facing camera is shown as the image sensor in the figure, and the front-facing camera is replaced by the image sensor for description below) is also powered on. After being powered on, the front-facing camera enters the lower power mode under control of a camera driver.

The image sensor in the lower power mode generates an image with lower resolution at a time interval, where the lower resolution is usually 640*480; and sends image data of the image with lower resolution to an image front end lite (Image Front End lite, IFE lite) unit through a mobile industry processor interface (mobile industry processor interface, MIPI). The image data that is of the image with lower resolution and that is output by the IFE lite may be stored in a secure buffer of a memory.

Figure 3A:
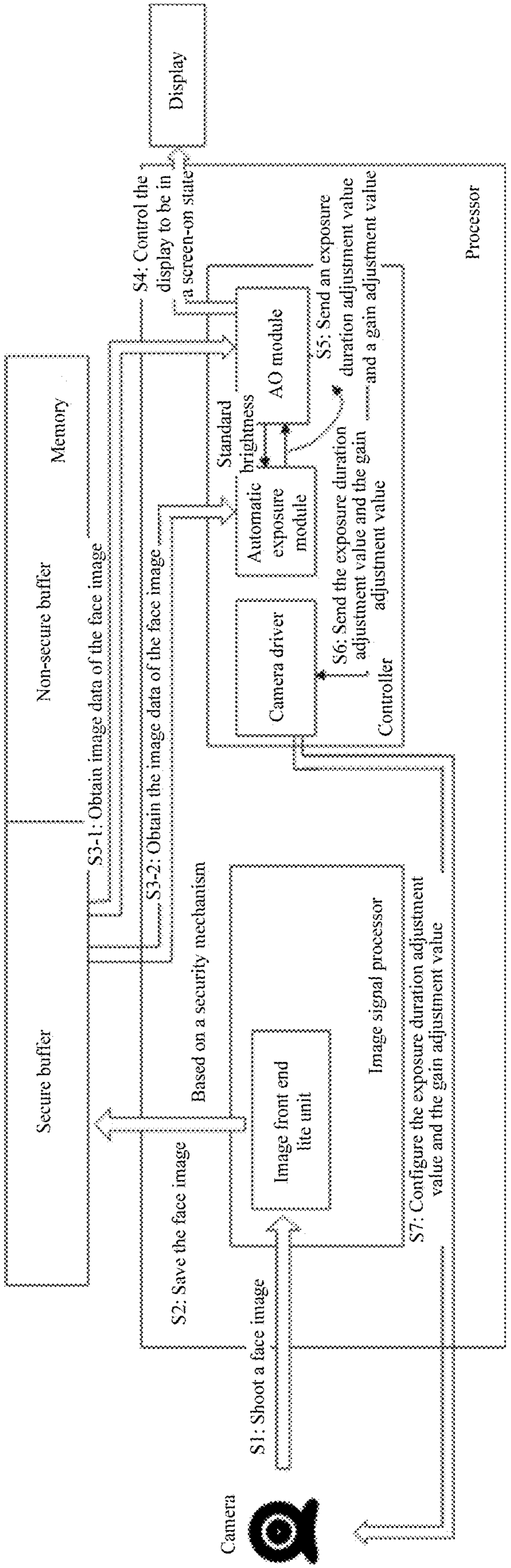
FIG. 3A is a schematic diagram of a structure of an electronic device according to this application.

Refer to FIG. 3A. The image front end lite (Image Front End lite, IFE lite) unit is an integrated unit in an image signal processor (image signal processor, ISP), image data that is of an image with low resolution and that is output by each camera of the electronic device can reach the IFE lite, and the IFE lite stores the image output by the camera in the secure buffer of the memory.

A controller of a processor may perform, based on the image data of the image with lower resolution, a plurality of events, for example, detection of human eyes gazing at a display (also referred to as an AO solution).

The controller performs the AO solution by using three logic units: an automatic exposure module, an AO (always on) module, and a camera driver. The following first describes the three logic units.

The automatic exposure module is a logic unit of the controller, and is obtained by running an automatic exposure (automatic exposure, AE) algorithm by the controller.

The AO (always on) module is also a logic unit of the controller, and is obtained by running the AO (always on) solution by the controller. The AO solution is an intelligent awareness solution implemented based on an AO camera (always on camera), usually includes functions such as human eye gazing recognition, owner recognition, and gesture recognition, and has a typical feature of running for a long time with low power consumption.

The camera driver is also a logic unit of the controller, is configured to configure a parameter, an operation mode, and the like for the camera, and is further configured to enable or disable the camera, and the like.

A specific manner in which the controller of the processor performs the AO solution by using the image data of the image with lower resolution is as follows:

The display of the electronic device displays a webpage, and a user gazes at the display of the electronic device to view the webpage. As shown in FIG. 3A, the electronic device sends an instruction, and the front-facing camera of the electronic device runs in response to the instruction, to perform step S1 of shooting a face image of the user. The image front end lite unit performs step S2 of reading the face image, and stores the face image in the secure buffer of the memory based on a security mechanism. The AO module performs step S3-1 of obtaining image data of the face image stored in the secure buffer of the memory, and determines, by analyzing the image data, whether eyes of the user gaze at the display. When determining that the eyes of the user gaze at the display, the AO module performs step S4 of controlling the display of the electronic device to be in a screen-on state.

Image quality of the face image shot by the camera restricts accuracy of the AO module in determining whether the eyes of the user gaze at the display. In particular, when image brightness of the face image shot by the camera is high or low, an error of the AO module in determining whether the eyes of the user gaze at the display is large. In this case, the automatic exposure module performs step S3-2 of obtaining the image data of the face image stored in the memory, calculates the image brightness of the face image based on the image data, compares the calculated image brightness with standard brightness to obtain a comparison result, and adjusts exposure parameters, which are usually exposure duration and a gain, of the camera based on the comparison result to obtain an exposure duration adjustment value and a gain adjustment value. The automatic exposure module further performs step S5 of transmitting the calculated exposure duration adjustment value and gain adjustment value to the AO module. Then, the AO module sends the exposure duration adjustment value and the gain adjustment value to the camera driver according to step S6 in FIG. 3A. According to step S7 in FIG. 3A, the camera driver configures the camera to enable the camera to run based on the exposure duration adjustment value and the gain adjustment value. The electronic device may send an instruction again, and the camera runs based on the exposure duration adjustment value and the gain adjustment value in response to the instruction of the electronic device, to shot an image.

Figure 3B:
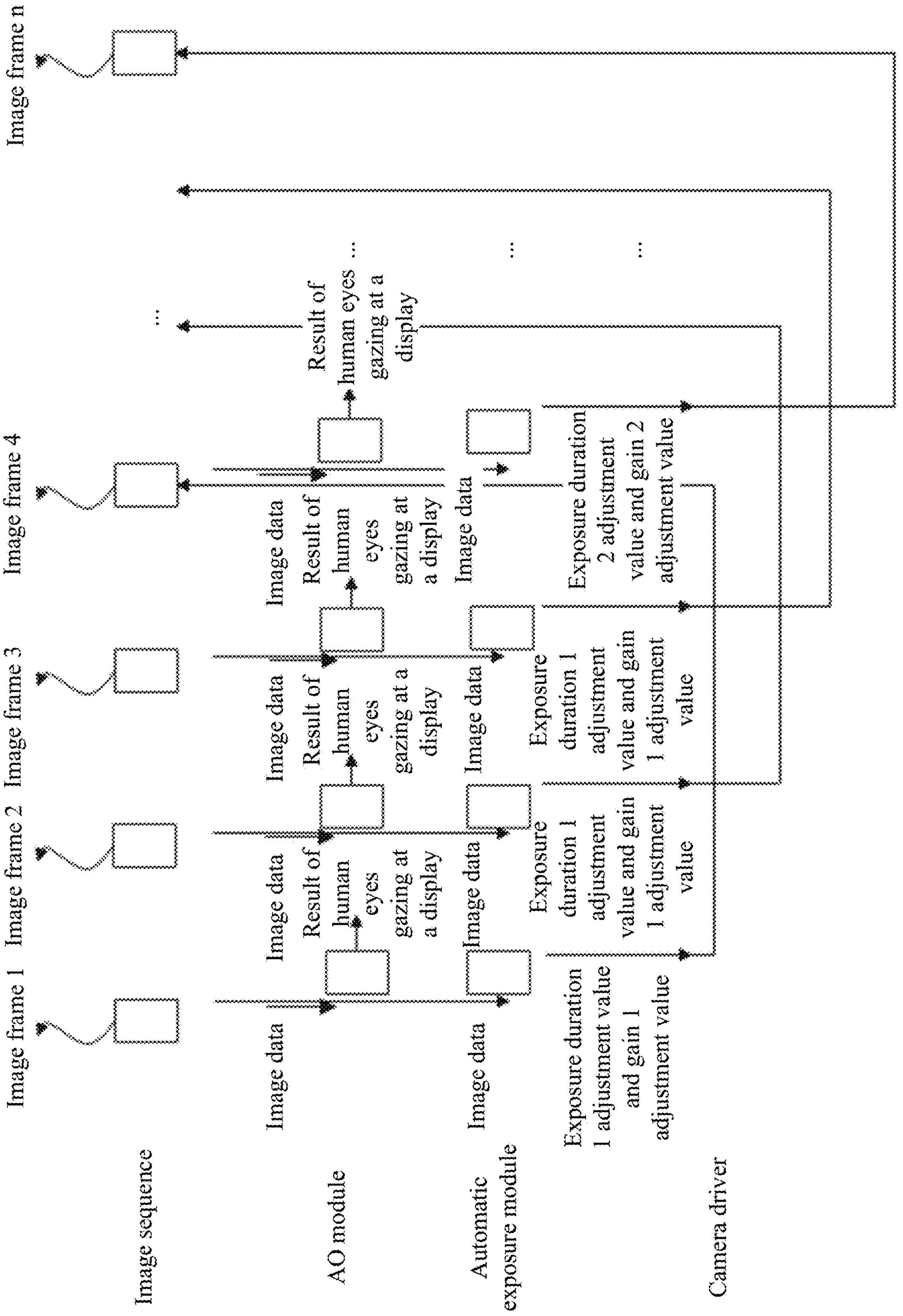
FIG. 3B is a diagram showing a running process of logic units in an electronic device according to this application.

The following describes, with reference to FIG. 3B, a specific manner in which the AO module determines, by analyzing the image data, whether the eyes of the user gaze at the display, and the automatic exposure module adjusts the exposure parameters of the camera.

Refer to FIG. 3B. An image sequence includes a plurality of frames of images such as image frames 1, 2, 3, 4, . . . , and n shot by the camera. The camera runs based on universal exposure duration and a universal gain at the beginning. Usually, the universal exposure duration and the universal gain may be preset. The automatic exposure module successively obtains image data of each frame of image in the image sequence based on a storage order of the images. For a first frame of image (also referred to as an image frame 1), the automatic exposure module calculates image brightness of the image frame 1 based on image data of the image frame 1, and compares the image brightness of the image frame 1 with standard brightness to obtain a comparison result. If the comparison result reflects that a difference between the image brightness of the image frame 1 and the standard brightness is less than a preset value (for example, ±10%), the automatic exposure module does not perform an operation, and the camera still runs based on original exposure duration and an original gain. The original exposure duration and the original gain refer to the universal exposure duration and the universal gain mentioned above. If the comparison result reflects that the difference between the image brightness of the image frame 1 and the standard brightness is not less than the preset value, the automatic exposure module adjusts exposure duration and a gain of the camera based on the comparison result to obtain an exposure duration 1 adjustment value and a gain 1 adjustment value. The automatic exposure module transmits the exposure duration 1 adjustment value and the gain 1 adjustment value to the camera driver by using the AO module. The camera driver configures the camera to enable the camera to run based on the exposure duration 1 adjustment value and the gain 1 adjustment value, to shoot an image.

The automatic exposure module and the camera driver perform a procedure once, and shooting of one frame of image by the camera is lagged. It is assumed that an image frame 2 and an image frame 3 are shot by the camera that runs based on the original exposure duration and the original gain. The automatic exposure module performs calculation based on image data of the image frame 2 and the image frame 3 in the foregoing processing manner, to obtain the exposure duration 1 adjustment value and the gain 1 adjustment value; and the camera driver configures the camera to enable the camera to run based on the exposure duration 1 adjustment value and the gain 1 adjustment value, to shoot an image. An image frame 4 is shot by the camera configured with the exposure duration 1 adjustment value and the gain 1 adjustment value. The automatic exposure module also performs calculation based on image data of the image frame 4 by sampling the foregoing processing manner, to obtain an exposure duration 2 adjustment value and a gain 2 adjustment value; and the camera driver configures the camera to enable the camera to run based on the exposure duration 2 adjustment value and the gain 2 adjustment value, to shoot an image. The process is repeated until the automatic exposure module learns through comparison that a difference between image brightness of an image frame and the standard brightness is less than the preset value, for example, ±10%.

The AO module also successively obtains the image data of each frame of image in the image sequence based on the storage order of the images. For the image data that is of each frame of image and that is obtained by the AO module, the AO module performs the following procedure, to obtain a determining result for whether human eyes in each frame of image gaze at the display. The following uses an example in which the AO module processes the image data of the image frame 1 for description.

The AO module compares the image data of the image frame 1 with a sample feature library, and configures a confidence level for the image frame 1 based on a result of comparison between the image data of the image frame 1 and the sample feature library. The confidence level is used for representing a probability that human eyes in the image frame 1 gaze at the display. The AO module determines whether the confidence level of the image frame 1 is less than a threshold, and if the confidence level of the image frame 1 is not less than the threshold, determines that the human eyes in the image frame 1 gaze at the display, or if the confidence level of the image frame 1 is less than the threshold, determines that the human eyes in the image frame 1 do not gaze at the display.

In some embodiments, the sample feature library includes feature data of an image in which human eyes gaze at the display. The feature data is determined in the following manner: A large quantity of sample images are obtained, where the sample images include sample images in which human eyes gaze at the display and sample images in which human eyes do not gaze at the display; and learning is performed based on image data of each sample image, to obtain feature data for representing an image in which human eyes gaze at the display. The sample images in which human eyes gaze at the display and the sample images in which human eyes do not gaze at the display all refer to face images shot by the front-facing camera of the electronic device.

If the AO module determines that a frame of image in which human eyes gaze at the display exists among images shot within specific duration, the AO module performs corresponding events, for example, controlling the display of the electronic device to be in the screen-on state and turning down the ringtone volume.

In some embodiments, the AO module determines that a frame of image in which human eyes in this frame of image gaze at the display exists in a plurality of consecutive frames of images. In this case, the AO module controls the display of the electronic device to be in the screen-on state, which is combined with a solution of controlling the display to be in the screen-off state based on screen-off time set for the display of the electronic device. A combination manner is as follows.

It is assumed that the screen-off time set for the electronic device is 15 seconds. Timing is started at a moment at which the display of the electronic device is enabled to display data. When timing is performed for specified time, for example, after 7 seconds, the front-facing camera of the electronic device shoots images, and the AO module successively obtains the images and performs the following operations for each frame of image obtained: comparing image data of the image with the sample feature library, and configuring a confidence level for the image based on a result of comparison between the image data of the image and the sample feature library; and determining whether the confidence level configured for the image is less than a screened confidence level threshold, and if the confidence level configured for the image is not less than the confidence level threshold, determining that human eyes in the image gaze at the display, or if the confidence level configured for the image is less than the confidence level threshold, determining that the human eyes in the image do not gaze at the display.

During a time period from a 7th second to a 15th second after timing starts, if the AO module determines that there is one frame of image in which human eyes gaze at the display, the AO module controls the display to be in the screen-on state; or if the AO module continuously determines that human eyes in all the images do not gaze at the display, the AO module controls the display to be in the screen-off state after the 15th second.

It should be noted that the foregoing content describes a processing procedure of the AO module by using an example in which the screen-off time is 15 seconds, but this does not constitute a limitation.

In a process in which the user gazes at the display, and the controller of the electronic device performs the AO solution, if the user enables the front-facing camera of the electronic device, the user enters the scenario shown in FIG. 1A in which selfie taking is performed by using the front-facing camera. The electronic device responds to an operation of the user, the front-facing camera shoots an image, and the display displays the shot image.

Specifically, in the processor shown in FIG. 2, an application processor (application processor, AP) sends a low-level power-on switching signal to a switching pin of the image sensor, and the operation mode of the image sensor is switched from the lower power mode to the normal mode.

The image sensor in the normal mode generates an image with standard resolution at a time interval, and sends image data of the image with standard resolution to an image front end (Image Front End, IFE) of the ISP by using an MIPI pin. The image front end IFE processes the image data of the image with standard resolution, and the display displays processed image data.

If the user disables the front-facing camera, the electronic device performs a corresponding procedure in response to the operation of the user. Specifically, the AP shown in FIG. 2 sends a high-level power-on switching signal to the switching pin of the image sensor, and the image sensor switches from the normal mode to the lower power mode.

It can be learned from the foregoing content that the following problems exist in a process of operation mode switching of the image sensor:

1. When the image sensor is in the lower power mode, the image sensor generates an image with lower resolution, and the processor may perform a plurality of events such as the AO solution based on the image with lower resolution. When the image sensor performs the plurality of events such as the AO solution based on the image with lower resolution, a high power consumption problem exists.

It should be noted that, if the user does not use the electronic device, the image sensor of the electronic device still enters the lower power mode, and the processor cooperates with the image sensor to perform the plurality of events such as the AO solution. Consequently, power consumption of the processor is high.

2. Mutual switching between the lower power mode and the normal mode of the image sensor needs the processor to generate a high level or a low level acting on the switching pin of the image sensor, and control logic is complex.

Specifically, for an image sensor, when a high-level or low-level power-on switching signal is used for operation mode switching of the image sensor, the processor of electronic device needs to virtualize, for two operation modes of the image sensor, the image sensor into two devices in terms of control logic. To be specific, two kinds of control logic are configured for virtualized image sensors, switching and running of the two virtualized image sensors are controlled to send a power-on switching signal, so as to implement operation mode switching of the image sensor. In this case, the control logic is complex.

3. To cooperate with running of the image sensor in the lower power mode, the processor of the electronic device needs to be configured with an image front end lite (Image Front End lite, IFE lite) unit. In this way, use of the processor is limited. Only the processor configured with the image front end lite unit can cooperate with the image sensor to run in an operation mode with lower power consumption.

Based on the problems existing in the foregoing technical solutions, this application proposes solutions by using the following embodiments.

The solutions provided in the embodiments of this application are all applicable to electronic devices such as a mobile phone, a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), a wearable electronic device, and a smartwatch.

Figure 4A:
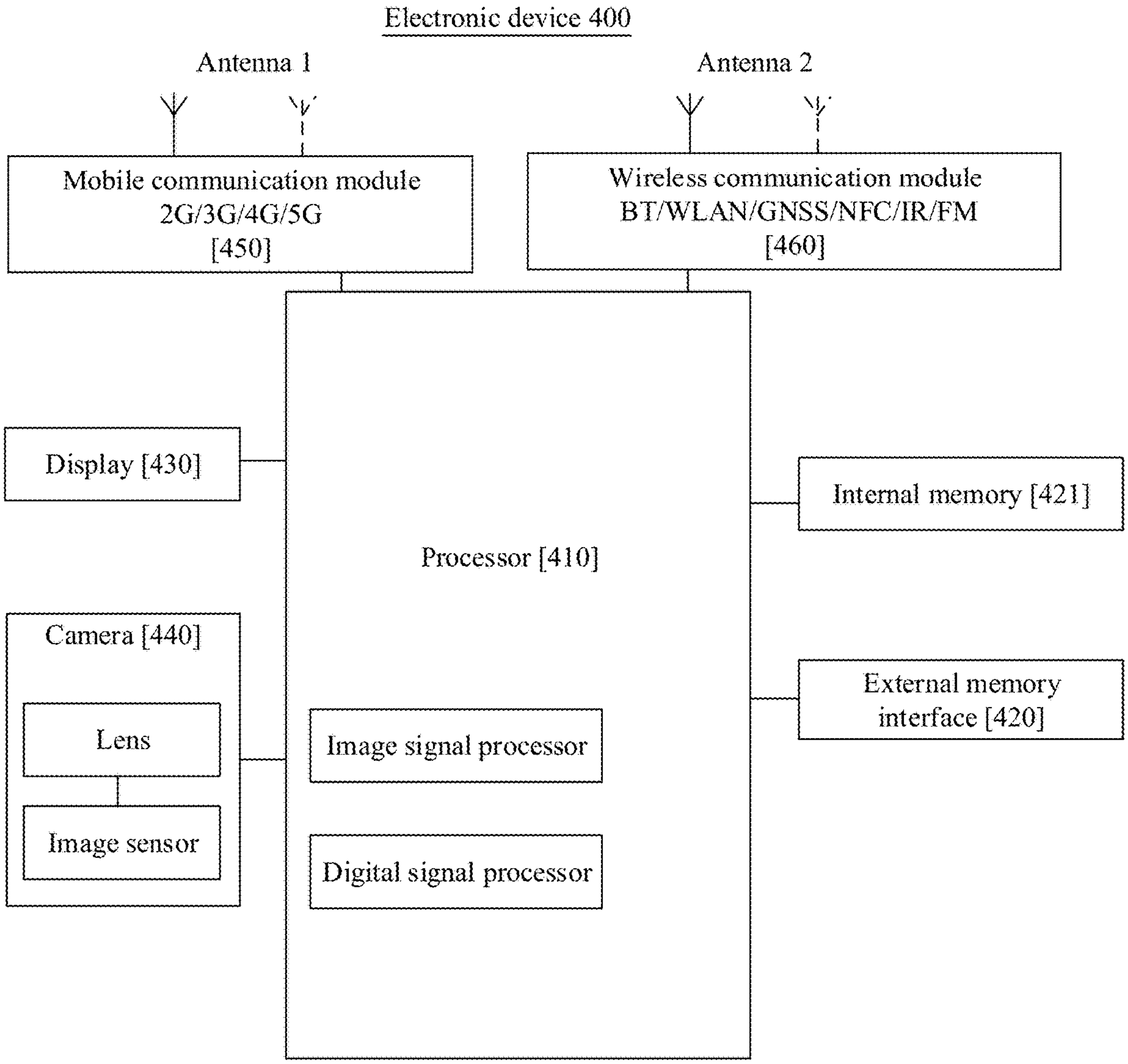
FIG. 4A is a schematic diagram of a structure of an electronic device according to an embodiment of this application.

FIG. 4A shows an example of composition of an electronic device according to an embodiment of this application. A mobile phone is used as an example. The electronic device 400 may include a processor 410, an external memory interface 420, an internal memory 421, a display 430, a camera 440, an antenna 1, an antenna 2, a mobile communication module 450, a wireless communication module 460, and the like.

It can be understood that the structure illustrated in this embodiment does not constitute a specific limitation on the electronic device. In some other embodiments, the electronic device may include more or fewer components than those shown in the figure, or combine some components, or split some components, or have different component arrangements. The components shown in the figure may be implemented by hardware, software, or a combination of software and hardware.

The processor 410 may include one or more processing units. For example, the processor 410 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may be a nerve center and a command center of the electronic device 400. The controller may generate an operation control signal based on instruction operation code and a timing signal, to complete control of instruction fetching and instruction execution.

The video codec is configured to compress or decompress a digital video. The electronic device can support one or more video codecs. In this way, the electronic device can play or record videos in a plurality of encoding formats, for example, moving picture experts group (moving picture experts group, MPEG)1, MPEG2, MPEG3, and MPEG4.

The NPU is a neural-network (neural-network, NN) computing processor that quickly processes input information by referring to a biological neural-network structure, for example, by referring to a transfer mode between human brain neurons, and can further perform self-learning continuously. Applications such as intelligent cognition of the electronic device, for example, image recognition, face recognition, speech recognition, and text understanding, may be implemented by using the NPU.

A memory may be further disposed in the processor 410, and is configured to store instructions and data. In some embodiments, the memory in the processor 410 is a cache. The memory may store instructions or data just used or cyclically used by the processor 410. If the processor 410 needs to use the instructions or the data again, the processor 410 may directly invoke the instructions or the data from the memory. This avoids repeated access and reduces waiting time of the processor 410, thereby improving efficiency of a system.

In some embodiments, the processor 410 may include one or more interfaces. The interfaces may include an inter-integrated circuit (Inter-Integrated Circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus, including a serial data line (serial data line, SDA) and a serial clock line (serial clock line, SCL). In some embodiments, the processor 410 may include a plurality of groups of I2C buses. The processor 410 may be separately coupled to the camera 440 and the like through different I2C bus interfaces.

The I2S interface may be used for audio communication.

The PCM interface may also be used for audio communication, to sample, quantize, and encode an analog signal.

The UART interface is a universal serial data bus used for asynchronous communication. The bus may be a bidirectional communication bus, and converts to-be-transmitted data between serial communication and parallel communication.

The MIPI interface may be configured to connect the processor 410 and peripheral devices such as the display 430 and the camera 440. The MIPI interface includes a camera serial interface (camera serial interface, CSI), a display serial interface (display serial interface, DSI), and the like. In some embodiments, the processor 410 and the camera 440 communicate with each other through the CSI interface, to implement a shooting function of the electronic device 400. The processor 410 and the display 430 communicate with each other through the DSI interface, to implement a display function of the electronic device 400.

The GPIO interface may be configured by using software. The GPIO interface may be configured as a control signal or may be configured as a data signal. In some embodiments, the GPIO interface may be configured to connect the processor 410 to the camera 440, the display 430, the wireless communication module 460, and the like.

It can be understood that an interface connection relationship between the modules illustrated in this embodiment is merely an example for description, and constitutes no limitation on the structure of the electronic device 400. In some other embodiments of this application, the electronic device 400 may alternatively use an interface connection manner different from that in the foregoing embodiment, or a combination of a plurality of interface connection manners.

The external memory interface 420 may be configured to connect to an external storage card, for example, a Micro SD card, to expand a storage capability of the electronic device. The external storage card communicates with the processor 410 through the external memory interface 420, to implement a data storage function, for example, to store files such as music and a video in the external storage card.

The internal memory 421 may be configured to store computer-executable program code. The executable program code includes instructions. The processor 410 executes various function applications and data processing of the electronic device 400 by running the instructions stored in the internal memory 421. The internal memory 421 may include a program storage area and a data storage area. The program storage area may store an operating system, an application required by at least one function (for example, a sound playing function or an image playing function), and the like. The data storage area may store data (for example, audio data and a phone book) and the like created in a use process of the electronic device. In addition, the internal memory 421 may include a high-speed random access memory, and may further include a non-volatile memory, for example, at least one magnetic disk storage device, a flash memory device, or a universal flash storage (universal flash storage, UFS). The processor 410 executes various function applications and data processing of the electronic device by running the instructions stored in the internal memory 421 and/or the instructions stored in the memory disposed in the processor.

The electronic device implements a display function by using the GPU, the display 430, the application processor, and the like. The GPU is a microprocessor for image processing, and is connected to the display 430 and the application processor. The GPU is configured to perform mathematical and geometric computing for graphics rendering. The processor 410 may include one or more GPUs. The one or more GPUs execute program instructions to generate or change displayed information.

The display 430 is configured to display an image, a video, or the like. The display 430 includes a display panel. The display panel may be a liquid crystal display (liquid crystal display, LCD), an organic light-emitting diode (organic light-emitting diode, OLED), an active-matrix organic light emitting diode or active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), or the like. In some embodiments, the electronic device may include one or N displays 430. N is a positive integer greater than 1.

A series of graphical user interfaces (graphical user interface, GUI) may be displayed on the display 430 of the electronic device, and all these GUIs are on a home screen of the electronic device. Usually, a size of the display 430 of the electronic device is fixed, and only a limited quantity of controls can be displayed on the display 430 of the electronic device. A control is a GUI element. The control is a software component included in an application, and controls all data processed by the application and an interaction operation related to the data. A user may interact with the control through direct manipulation (direct manipulation), to read or edit information about the application. Usually, controls may include visual interface elements such as an icon, a button, a menu, a tab, a text box, a dialog box, a status bar, a navigation bar, and a Widget.

The electronic device may implement a shooting function by using the ISP, the camera 440, the video codec, the GPU, the display 430, the application processor, and the like.

The ISP is configured to process data fed back by the camera 440. For example, a shutter is pressed during shooting, and light is transmitted to an image sensor of the camera through a lens. An optical signal is converted into an electrical signal. The image sensor of the camera transmits the electrical signal to the ISP for processing, to convert the electrical signal into an image visible to naked eyes. The ISP may further perform algorithm optimization on noise, brightness, and complexion of the image. The ISP may further optimize parameters such as exposure and a color temperature of a shooting scene. In some embodiments, the ISP may be disposed in the camera 440.

The camera 440 includes a lens and an image sensor. The camera 440 is configured to capture a still image or a video. An optical image is generated for an object through the lens and is projected onto the image sensor. The image sensor may be a charge coupled device (charge coupled device, CCD) or a complementary metal-oxide-semiconductor (complementary metal-oxide-semiconductor, CMOS) phototransistor. The image sensor converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the electronic device may include one or N cameras 440, where N is a positive integer greater than 1.

The DSP is configured to process a digital signal. In addition to processing a digital image signal, the DSP may further process another digital signal. For example, when the electronic device performs frequency selection, the digital signal processor is configured to perform Fourier transform or the like on frequency energy.

A wireless communication function of the electronic device may be implemented by using the antenna 1, the antenna 2, the mobile communication module 450, the wireless communication module 460, the modem processor, the baseband processor, and the like.

The antenna 1 and the antenna 2 are configured to transmit and receive electromagnetic wave signals. Each antenna in the electronic device may be configured to cover one or more communication frequency bands. Different antennas may be further multiplexed to increase antenna utilization. For example, the antenna 1 may be multiplexed as a diversity antenna in a wireless local area network. In some other embodiments, the antenna may be used in combination with a tuning switch.

The mobile communication module 450 may provide a solution for wireless communication such as 2G/3G/4G/5G and the like applied to the electronic device. The mobile communication module 450 may include at least one filter, a switch, a power amplifier, a low noise amplifier (low noise amplifier, LNA), and the like. The mobile communication module 450 may receive an electromagnetic wave by using the antenna 1, perform processing such as filtering and amplification on the received electromagnetic wave, and then transmit a processed electromagnetic wave to the modem processor for demodulation. The mobile communication module 450 may further amplify a signal modulated by the modem processor, and convert, by using the antenna 1, the signal into an electromagnetic wave for radiation. In some embodiments, at least some functional modules of the mobile communication module 450 may be disposed in the processor 410. In some embodiments, at least some functional modules of the mobile communication module 450 may be disposed in a same device as at least some modules of the processor 410.

The wireless communication module 460 may provide a solution for wireless communication applied to the electronic device, including a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), an infrared (infrared, IR) technology, and the like. The wireless communication module 460 may be one or more devices integrating at least one communication processing module. The wireless communication module 460 receives an electromagnetic wave by using the antenna 2, performs frequency modulation and filtering processing on an electromagnetic wave signal, and sends a processed signal to the processor 410. The wireless communication module 460 may further receive a to-be-sent signal from the processor 410, perform frequency modulation and amplification on the signal, and convert, by using the antenna 2, the signal into an electromagnetic wave for radiation.

In addition, an operating system runs on the foregoing components, for example, an iOS operating system, an Android operating system, a Windows operating system, or the like. An application may be installed and run on the operating system.

Figure 4B:
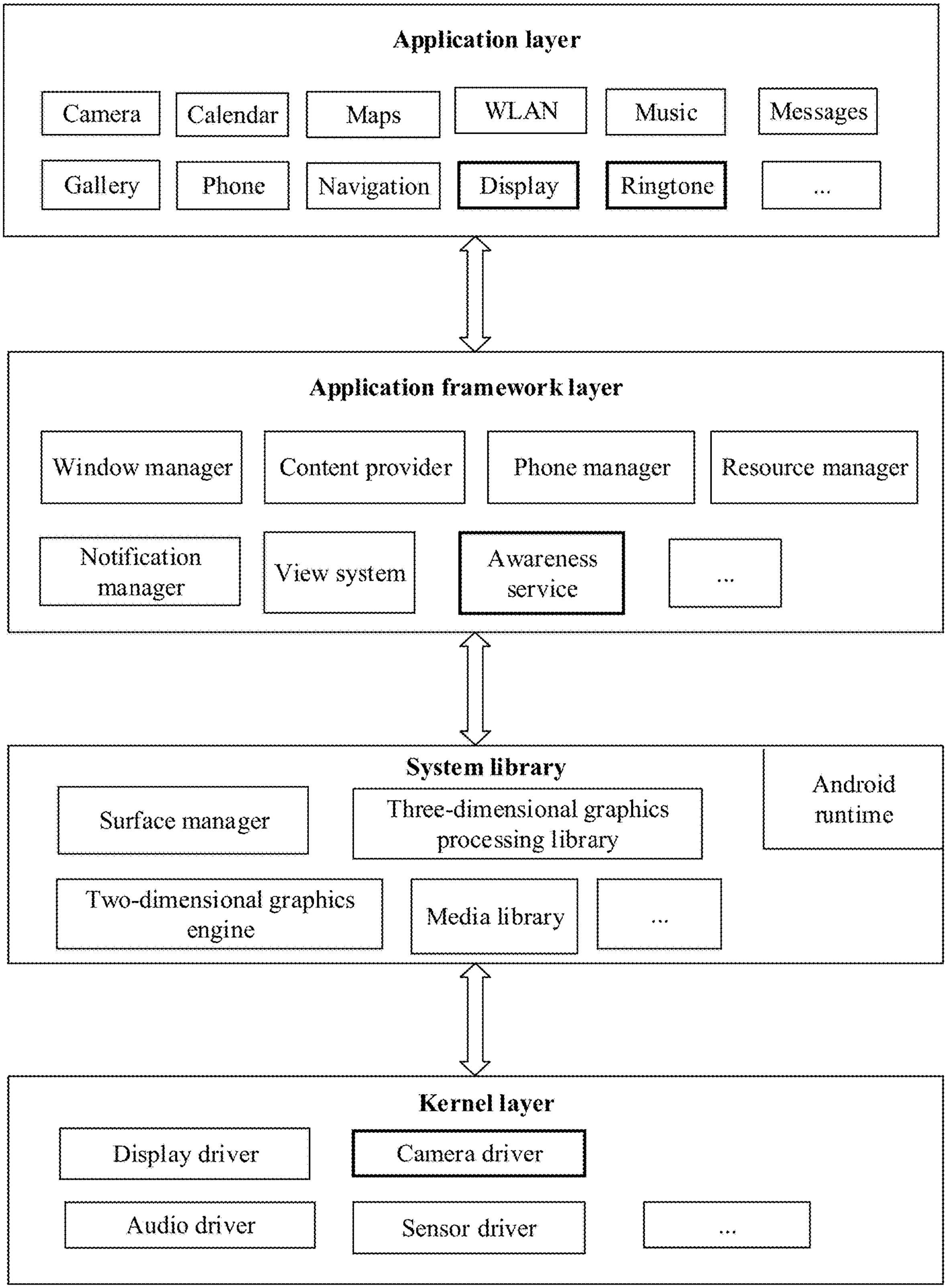
FIG. 4B is a diagram of an example of a software structure of an electronic device according to an embodiment of this application.

FIG. 4B is a block diagram of a software structure of an electronic device according to an embodiment of this application.

A layered architecture divides software into several layers, and each layer has a clear role and task. The layers communicate with each other through software interfaces. In some embodiments, the Android system is divided into four layers, which are respectively an application layer, an application framework layer, an Android runtime (Android runtime) and system library, and a kernel layer from top to bottom.

The application layer may include a series of application packages. As shown in FIG. 4B, the application packages may include applications such as Camera, Gallery, Calendar, Phone, Maps, Navigation, WLAN, Display, Music, Ringtone, and Messages.

The application framework layer provides an application programming interface (application programming interface, API) and a programming framework for an application at the application layer. The application framework layer includes some predefined functions. As shown in FIG. 4B, the application framework layer may include a window manager, a content provider, a phone manager, a resource manager, a notification manager, a view system, and the like. In some embodiments of this application, the application framework layer may further include an awareness service.

The window manager is configured to manage a window program. The window manager may obtain a display size, determine whether there is a status bar, whether to lock a screen, whether to take a screenshot, and the like.

The content provider is configured to store and obtain data, and enable the data to be accessible by an application. The data may include videos, images, audio, calls that are made and answered, browsing histories and bookmarks, a phone book, and the like.

The phone manager is configured to provide a communication function of the electronic device, for example, call status management (including answering, hanging up, or the like).

The resource manager provides various resources for an application, such as a localized string, an icon, a picture, a layout file, and a video file.

The notification manager enables an application to display notification information in the status bar, and may be configured to convey a message of a notification type, where the displayed notification information may automatically disappear after a short stay without user interaction. For example, the notification manager is configured to notify download completion, provide a message reminder, and the like. The notification manager may alternatively be a notification that appears in a top status bar of a system in a form of a graph or scroll bar text, for example, a notification of an application running in the background or a notification that appears on a screen in a form of a dialog window. For example, text information is prompted on the status bar, an alert sound is made, the electronic device vibrates, and an indicator light flashes.

The view system includes visual controls, for example, a control for displaying text and a control for displaying a picture. The view system may be configured to create an application. A display interface may include one or more views. For example, a display interface including an SMS notification icon may include a view for displaying text and a view for displaying a picture.

The awareness service is used for performing the AO solution mentioned above. In a process of performing the AO solution in the awareness service, if it is detected that human eyes in a frame of image gaze at the display, display of the application layer is controlled to be performed in a screen-on manner, and a ringtone is output at a lowered volume when the ringtone needs to be output.

The Android Runtime includes a kernel library and a virtual machine. The Android runtime is responsible for scheduling and management of the Android system. In some embodiments of this application, cold start of an application runs in the Android runtime, and the Android runtime obtains an optimized file status parameter of the application. Then, the Android runtime can determine, based on the optimized file status parameter, whether an optimized file is out of date due to system upgrade, and return a determining result to an application control module.

The kernel library includes two parts: One part is a functional function that needs to be invoked in a java language, and the other part is a kernel library of Android.

The application layer and the application framework layer are run on the virtual machine. The virtual machine executes java files at the application layer and the application framework layer as binary files. The virtual machine is configured to perform functions such as lifecycle management of an object, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a two-dimensional graphics engine (for example, SGL).

The surface manager is configured to manage a display subsystem, and provide 2D and 3D layer fusion for a plurality of applications.

The media library supports playing and recording in a plurality of common audio and video formats, a still image file, and the like. The media library may support a plurality of audio and video coding formats such as MPEG4, H.264, MP3, AAC, AMR, JPG, and PNG.

The three-dimensional graphics processing library is used to implement three-dimensional graphics drawing, image rendering and composition, layer processing, and the like.

The two-dimensional graphics engine is a drawing engine for 2D drawing.

The kernel layer is a layer between hardware and software. The kernel layer includes at least a display driver, a camera driver, an audio driver, and a sensor driver. The camera driver is configured to configure a parameter for the camera to enable or disable the camera.

It should be noted that although this embodiment of this application is described by using the Android system as an example, the basic principle thereof is also applicable to electronic devices based on operating systems such as iOS and Windows.

Embodiment 1

For the foregoing problem 1 of high power consumption, an embodiment of this application provides an electronic device. The electronic device includes a processor and an image sensor that can interact with the processor. The image sensor is usually disposed in a front-facing camera of the electronic device. For a hardware structure and a software architecture of the electronic device, refer to the foregoing content. Details are not described herein again.

Figure 5A:
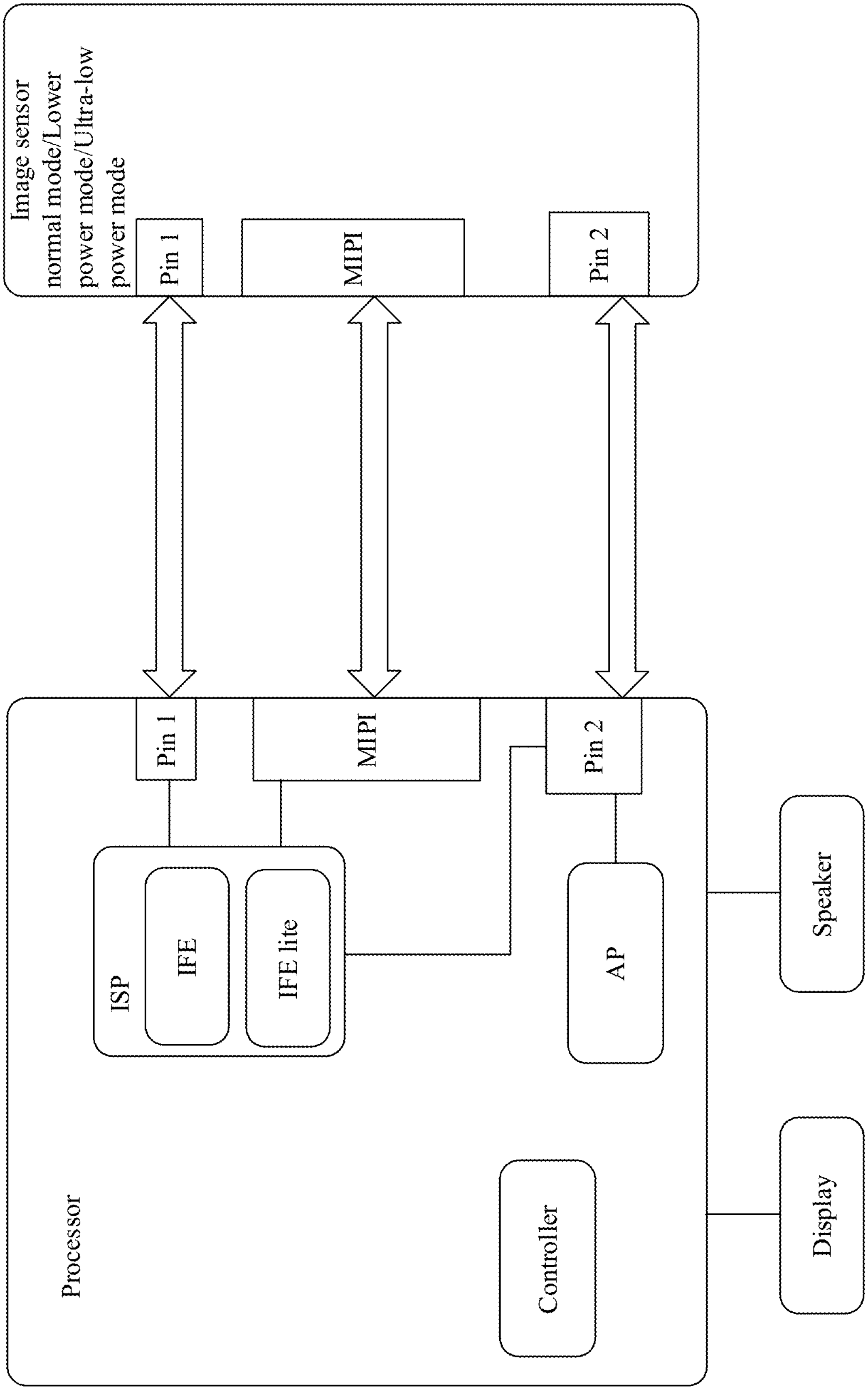
FIG. 5A and FIG. 5B are schematic diagrams of connections between an image sensor and a processor in an electronic device according to Embodiment 1 of this application.

Refer to FIG. 5A. In the electronic device provided in this embodiment, the processor includes a controller, an image signal processor ISP, and an application processor AP. The ISP includes at least two integrated units: an image front end IFE and an image front end lite IFE lite. The controller may include three logic units: an AO module, an automatic exposure module, and a camera driver. For functions of the AO module, the automatic exposure module, and the camera driver, refer to the foregoing content.

Operation modes set for the image sensor include a first operation mode, a second operation mode, and a third operation mode. The first operation mode may also be referred to as a normal operation mode or a normal mode, and resolution of an image generated in the first operation mode is first image resolution, for example, may be 4208*3120. The second operation mode may also be referred to as a lower power mode. Power consumption of the second operation mode is lower than power consumption of the first operation mode, and resolution of an image generated in the second operation mode is second image resolution, which may be usually 320*240, 520*392, 640*480, 720*540, 800*600, 960*720, or 1040*784. The third operation mode may also be referred to as an ultra-low power mode. Power consumption of the third operation mode is lowest, and resolution of an image generated in the third operation mode is third image resolution, which is usually 16*12. Therefore, it can be learned that the first image resolution>the second image resolution>the third image resolution.

An MIPI interface, a pin 1, and a pin 2 are disposed in each of the image sensor and the processor.

The MIPI interface of the image sensor may transmit image data of an image generated by the image sensor. The image data may be transmitted to the ISP of the processor through the MIPI interface of the processor. In some embodiments, the image front end IFE in the ISP obtains the image data received through the MIPI interface of the processor. In some other embodiments, the image front end lite IFE lite in the ISP obtains the image data received through the MIPI interface of the processor.

The pin 1 of the image sensor is configured to transmit 1 bit of level signal. Similarly, the pin 1 of the processor is also configured to transmit 1 bit of level signal. In some embodiments, the image sensor needs to send a level signal outward, for example, a detection result indicated by a high level or a low level may be transmitted outward by using the pin 1, and is transmitted to the ISP of the processor by using the pin 1 of the processor. In some embodiments, the image front end lite IFE lite in the ISP obtains the level signal received by the pin 1 of the processor.

In some examples, the pin 1 of the image sensor may be referred to as a GPO pin or an INT pin.

The pin 2 of the image sensor is also configured to transmit 1 bit of level signal. Similarly, the pin 2 of the processor is also configured to transmit 1 bit of level signal. In some embodiments, the pin 2 of the image sensor is a switching pin, and is configured to receive a switching signal indicating to switch an operation mode of the image sensor.

In some embodiments, the IFE lite or the IFE in the ISP of the processor or the AP of the processor generates a switching signal, and sends the switching signal by using the pin 2 of the processor. Then, the switching signal is transmitted to the image sensor by using the pin 2 of the image sensor. The image sensor performs operation mode switching based on the switching signal.

It should be noted that, the IFE lite, the IFE, or the AP has a capability of generating a switching signal. However, when the IFE lite, the IFE, or the AP is used to generate a switching signal, power consumption successively increases, and control complexity successively decreases.

In some examples, the pin 2 of the image sensor may be referred to as a PONV pin or an Xshutdown2 pin.

Figure 5B:
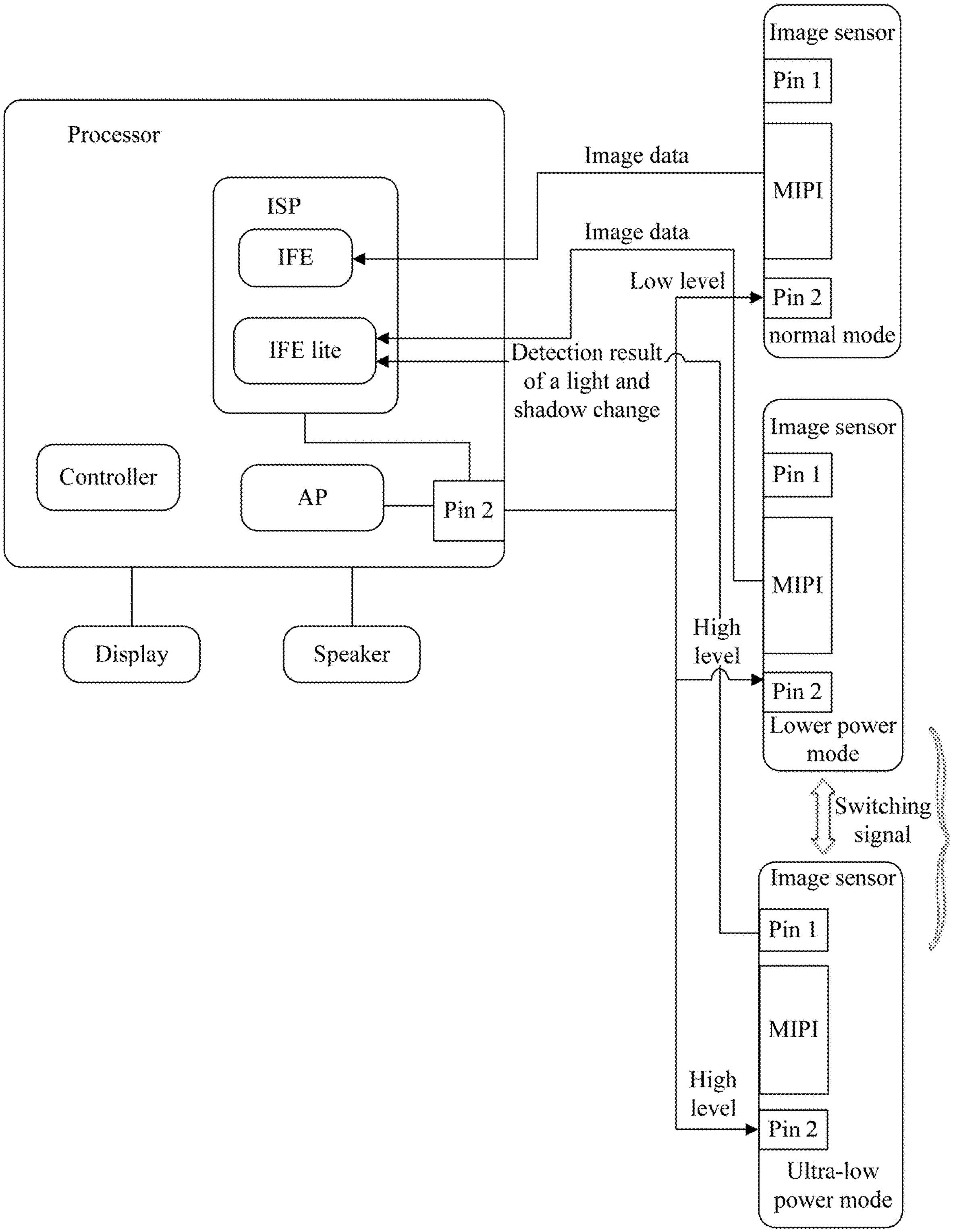

Refer to FIG. 5B (for ease of drawing, the pin 1 and the MIPI interface of the processor are not depicted in FIG. 5B) and FIG. 5C(1) and FIG. 5C(2). An operation mode switching control method provided in this embodiment is applied to the electronic device mentioned above. When the electronic device is powered on, the image sensor enters the ultra-low power mode by default, or usually enters the ultra-low power mode under control of the camera driver. The operation mode switching control method provided in this embodiment includes the following steps.

S501: The image sensor in the ultra-low power mode generates an image with ultra-low resolution at a time interval.

Figure 6A:
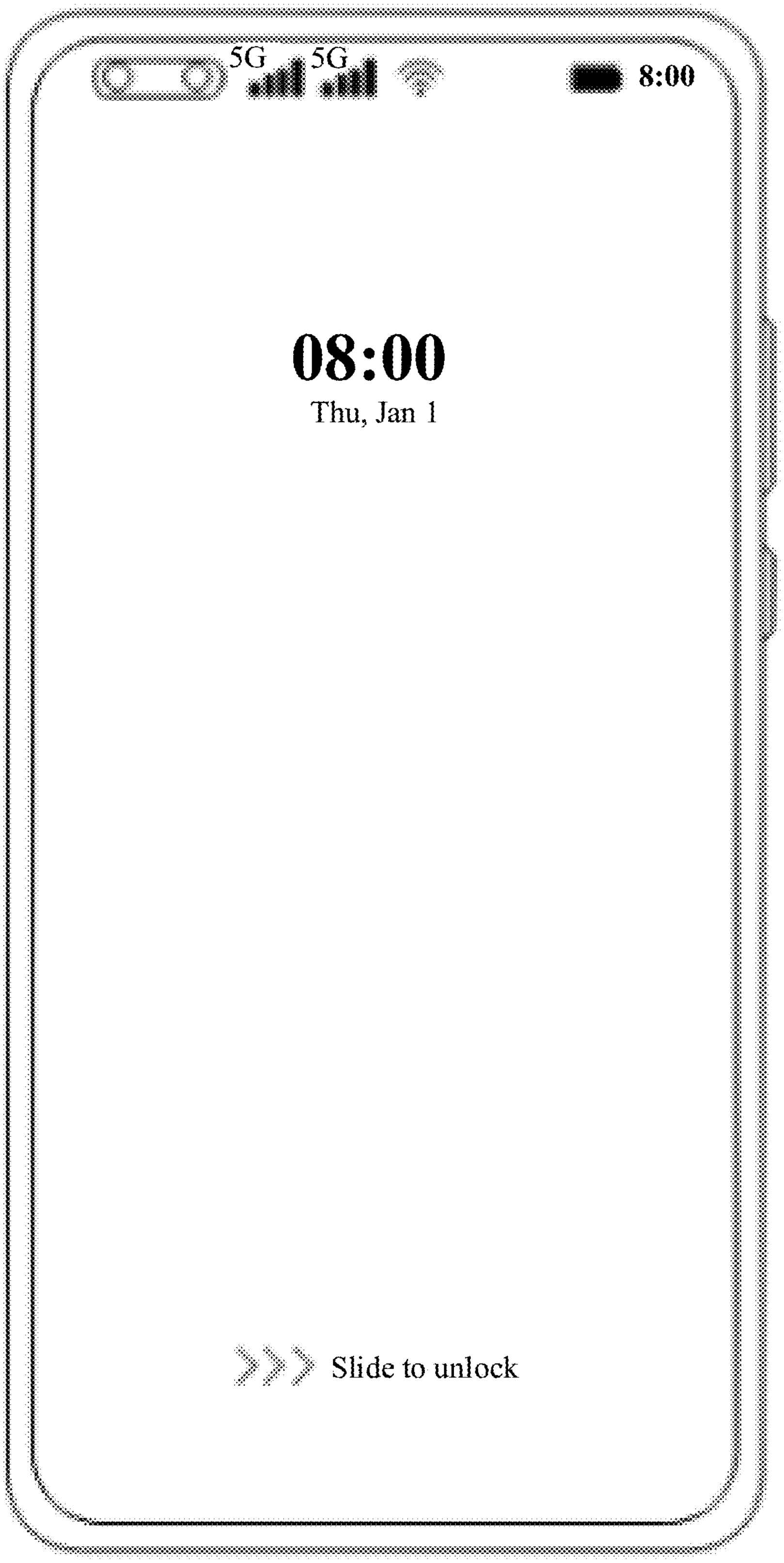
FIG. 6A, FIG. 6B, FIG. 6C, FIG. 6D, and FIG. 6E are diagrams showing operation states of an electronic device according to Embodiment 1 of this application.

In some embodiments, when the electronic device is powered on, a display is in a screen-on state and outputs a lock screen interface shown in FIG. 6A, and the image sensor runs in the ultra-low power mode to generate the image with ultra-low resolution at a configured time interval.

In some other embodiments, when the electronic device is in a standby state, and the display is in a screen-off state, the image sensor also runs in the ultra-low power mode to generate the image with ultra-low resolution at a configured time interval.

S502: The image sensor in the ultra-low power mode detects a light and shadow change based on image data of the image with ultra-low resolution, to obtain a detection result of the light and shadow change.

The image sensor detects the light and shadow change based on the image data of the image with ultra-low resolution, to determine whether there is the light and shadow change in front of the front-facing camera of the electronic device.

S503: The image sensor sends the detection result of the light and shadow change to the image front end lite IFE lite.

The image sensor may input the detection result of the light and shadow change into the image front end lite IFE lite by using the pin 1.

S504: The image front end lite IFE lite determines, based on the detection result of the light and shadow change, that the front-facing camera of the electronic device detects the light and shadow change, and generates a switching signal.

When the image front end lite IFE lite determines that the front-facing camera of the electronic device detects the light and shadow change, it indicates that a user may be using the electronic device and operation mode switching needs to be performed on the image sensor. Therefore, the IFE lite generates the switching signal to control the image sensor to switch from the ultra-low power mode to the lower power mode.

In some embodiments, the switching signal includes a high level and a low level. In an example, a high-level switching signal is used to control the image sensor to enter the ultra-low power mode, and a low-level switching signal is used to control the image sensor to enter the lower power mode. Certainly, the high-level switching signal may alternatively control the image sensor to switch to the lower power mode, and the low-level switching signal may alternatively control the image sensor to switch to the ultra-low power mode.

In some embodiments, the switching signal may alternatively be generated by the IFE or the AP. Specifically, the IFE or the AP interacts with the image front end lite IFE lite. When the image front end lite IFE lite determines, based on the detection result of the light and shadow change, that the front-facing camera of the electronic device detects the light and shadow change, the IFE or the AP generates the switching signal. Alternatively, the IFE or the AP receives the detection result of the light and shadow change, determines, based on the detection result of the light and shadow change, that the front-facing camera of the electronic device detects the light and shadow change, and generates the switching signal.

Figure 6B:

Refer to FIG. 6B. The display of the electronic device outputs a webpage, and the user gazes at the display for a long time when reading the webpage. Based on this, when detecting the light and shadow change based on the image data of the image with ultra-low resolution, the image sensor detects the light and shadow change, and the image front end lite IFE lite needs to generate the switching signal.

It should be noted that the image front end lite IFE lite may perform some events with low power consumption based on the detection result of the light and shadow change. For example, if it is detected that the front-facing camera detects the light and shadow change, the following functions are performed: maintaining the display in the screen-on state, turning down a ringtone volume, controlling the display to automatically rotate based on a face direction, triggering screenshot taking/playing and pause, and turning a page.

It should be further noted that, when the image front end lite IFE lite determines that the front-facing camera of the electronic device detects no light and shadow change, the image sensor is controlled to be continuously in the ultra-low power mode.

S505: The image front end lite IFE lite sends the switching signal to the image sensor.

The image front end lite IFE lite may send the switching signal to the image sensor by using the pin 2. The image sensor switches the operation mode from the ultra-low power mode to the lower power mode in response to the switching signal.

S506: The image sensor in the lower power mode generates an image with lower resolution at a time interval.

S507: The image sensor in the lower power mode sends image data of the image with lower resolution to the image front end lite IFE lite.

The image sensor sends the image data of the image with lower resolution to the image front end lite IFE lite by using an MIPI pin.

In some embodiments, the image front end lite IFE lite may store the image data of the image with lower resolution in a secure buffer of a memory. After the image front end lite IFE lite stores the image data of the image with lower resolution in the secure buffer of the memory, the controller of the processor may perform a plurality of events based on the image data of the image with lower resolution, for example, perform functions such as detection of human eyes gazing at the display (also referred to as an AO solution), controlling the display to automatically rotate based on a face direction, triggering screenshot taking/playing and pause, and turning a page.

It should be further noted that, in a process in which the controller performs a plurality of events based on the image data of the image with lower resolution, if the controller determines, based on the image data of the image with lower resolution, that the electronic device meets an exit condition of a performed event, for example, when the AO solution is performed and the controller continuously determines, based on the foregoing content, that human eyes in the image do not gaze at the display, the electronic device may not continue to perform the performed event. In addition, the image sensor may continuously run in the lower power mode, or the image sensor is controlled to switch to the ultra-low power mode.

In some embodiments, the image front end lite IFE lite generates a switching signal to control the image sensor to switch to the ultra-low power mode.

S508: The image front end IFE generates a low-level power-on switching signal.

Figure 6C:
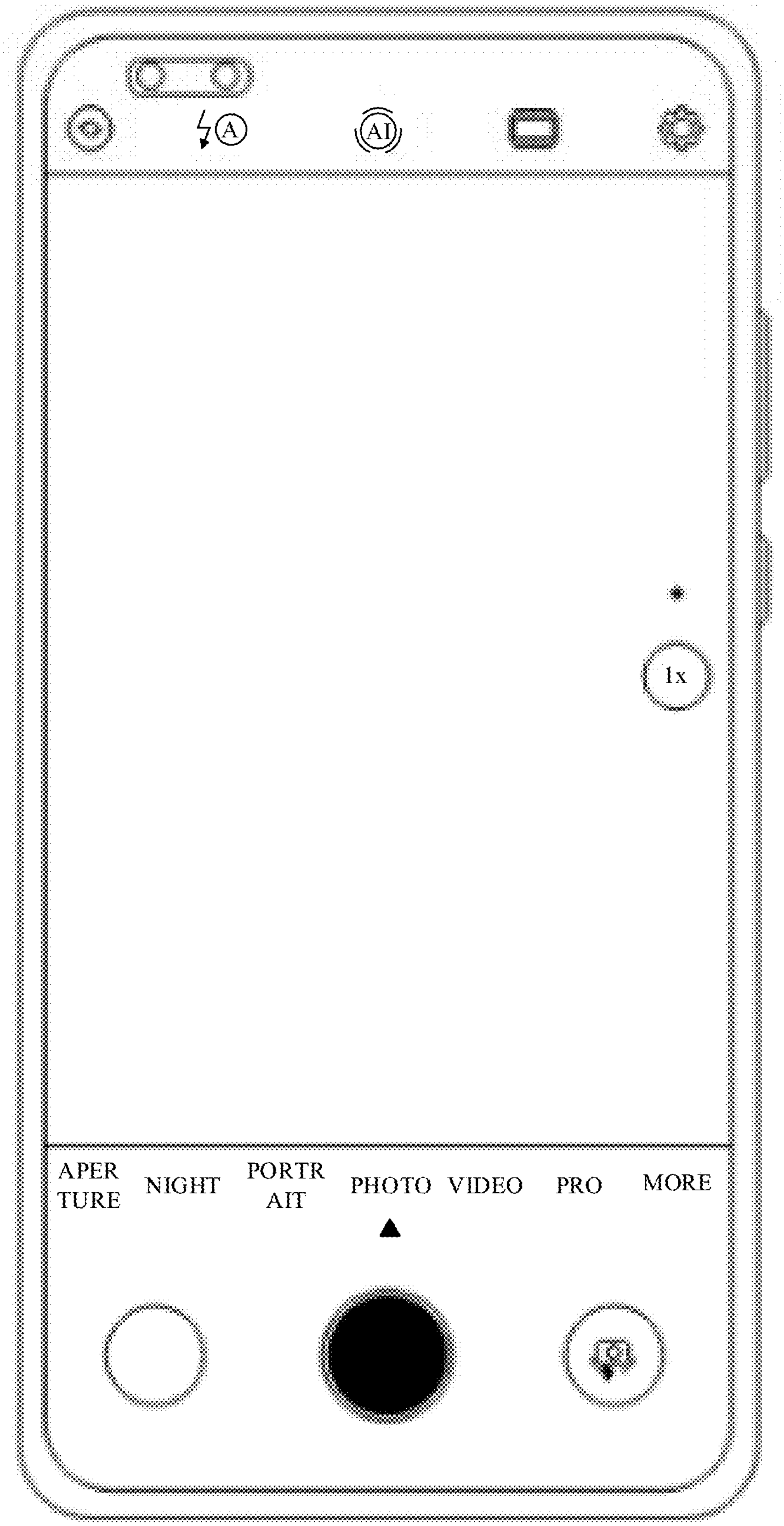

The user enables the front-facing camera of the electronic device, and the display of the electronic device displays a shooting mode of the front-facing camera, as shown in FIG. 6C. The electronic device responds to an operation of the user, the front-facing camera shoots an image, and the display displays the shot image.

Specifically, the front-facing camera of the electronic device is triggered by a control instruction and is enabled, and the image sensor needs to enter the normal mode. In some embodiments, after the front-facing camera of the electronic device is enabled, the image front end IFE generates the low-level power-on switching signal to control the image sensor to enter the normal mode. In some other embodiments, the IFE lite or the AP may alternatively generate the low-level power-on switching signal to control the image sensor to enter the normal mode. In this embodiment, an example in which the image front end IFE generates the low-level power-on switching signal is used for description.

A power-on switching signal includes a high level and a low level. In some embodiments, a low-level power-on switching signal is used to control the image sensor to switch to the normal mode, and a high-level power-on switching signal is used to control the image sensor to exit the normal mode. Certainly, the high-level power-on switching signal may alternatively control the image sensor to switch to the normal mode, and the low-level power-on switching signal controls the image sensor to exit the normal mode. In this embodiment, an example in which the low-level power-on switching signal controls the image sensor to switch to the normal mode, and the high-level power-on switching signal controls the image sensor to exit the normal mode is used for description.

It should be further noted that a performing location of step S508 is not limited to that shown in FIG. 5C(2). When the image sensor runs in the ultra-low power mode, if the front-facing camera is triggered and enabled, the image front end IFE also generates the low-level power-on switching signal, so that the image sensor switches to the normal mode for running.

S509: The image front end IFE sends the low-level power-on switching signal to the image sensor.

The image front end IFE sends the low-level power-on switching signal to the image sensor by using the pin 2. The image sensor receives the low-level power-on switching signal, and switches to the normal mode.

S510: The image sensor in the normal mode generates an image with standard resolution.

In some embodiments, the image sensor may alternatively generate the image with standard resolution by using a configured time interval as a cycle.

S511: The image sensor in the normal mode sends image data of the image with standard resolution to the image front end IFE.

In some embodiments, the image sensor in the normal mode may send the image data of the image with standard resolution to the image front end IFE by using the MIPI pin. The image front end IFE processes the image data of the image with standard resolution, and the display displays processed image data.

S512: The image front end IFE generates a high-level power-on switching signal.

If the user disables the front-facing camera, the electronic device performs a corresponding procedure in response to the operation of the user.

Specifically, the front-facing camera of the electronic device is triggered by a control instruction and is disabled, and the image sensor needs to exit the normal mode. The image front end IFE generates the high-level power-on switching signal to control the image sensor to exit the normal mode.

In some embodiments, the image front end IFE generates the high-level power-on switching signal, to control the image sensor to exit the normal mode and switch to the ultra-low power mode or the lower power mode.

In some embodiments, the front-facing camera of the electronic device is triggered by a control instruction and is disabled, the IFE lite or the AP may alternatively generate the high-level power-on switching signal, to control the image sensor to enter the ultra-low power mode or the lower power mode. In this embodiment, an example in which the image front end IFE generates the high-level power-on switching signal is used for description.

S513: The image front end IFE sends the high-level power-on switching signal to the image sensor.

The image front end IFE may send the high-level power-on switching signal to the image sensor by using the pin 2.

In some embodiments, when receiving the high-level power-on switching signal, the image sensor may directly switch to the ultra-low power mode.

Figure 6D:
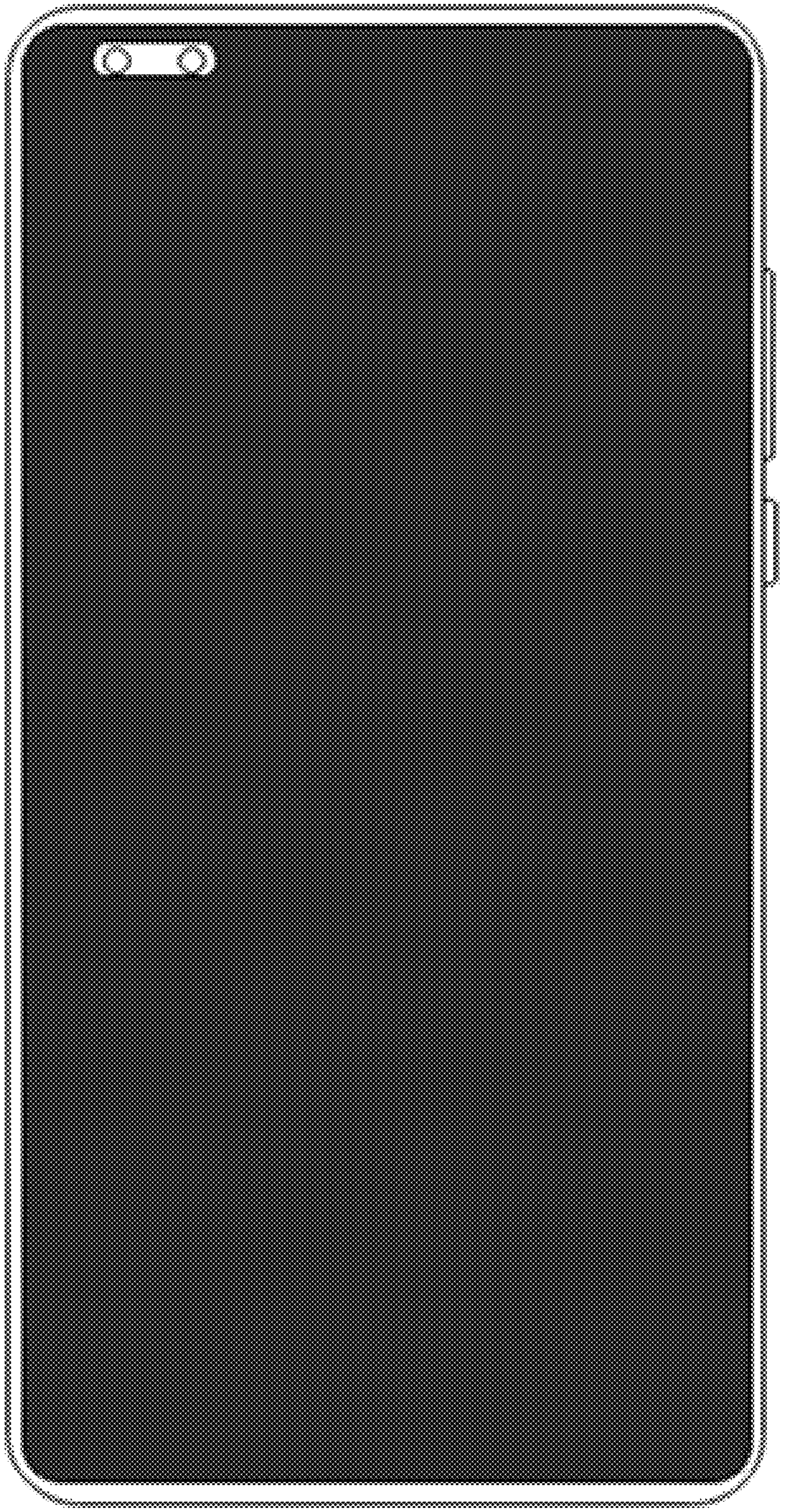
Figure 6E:
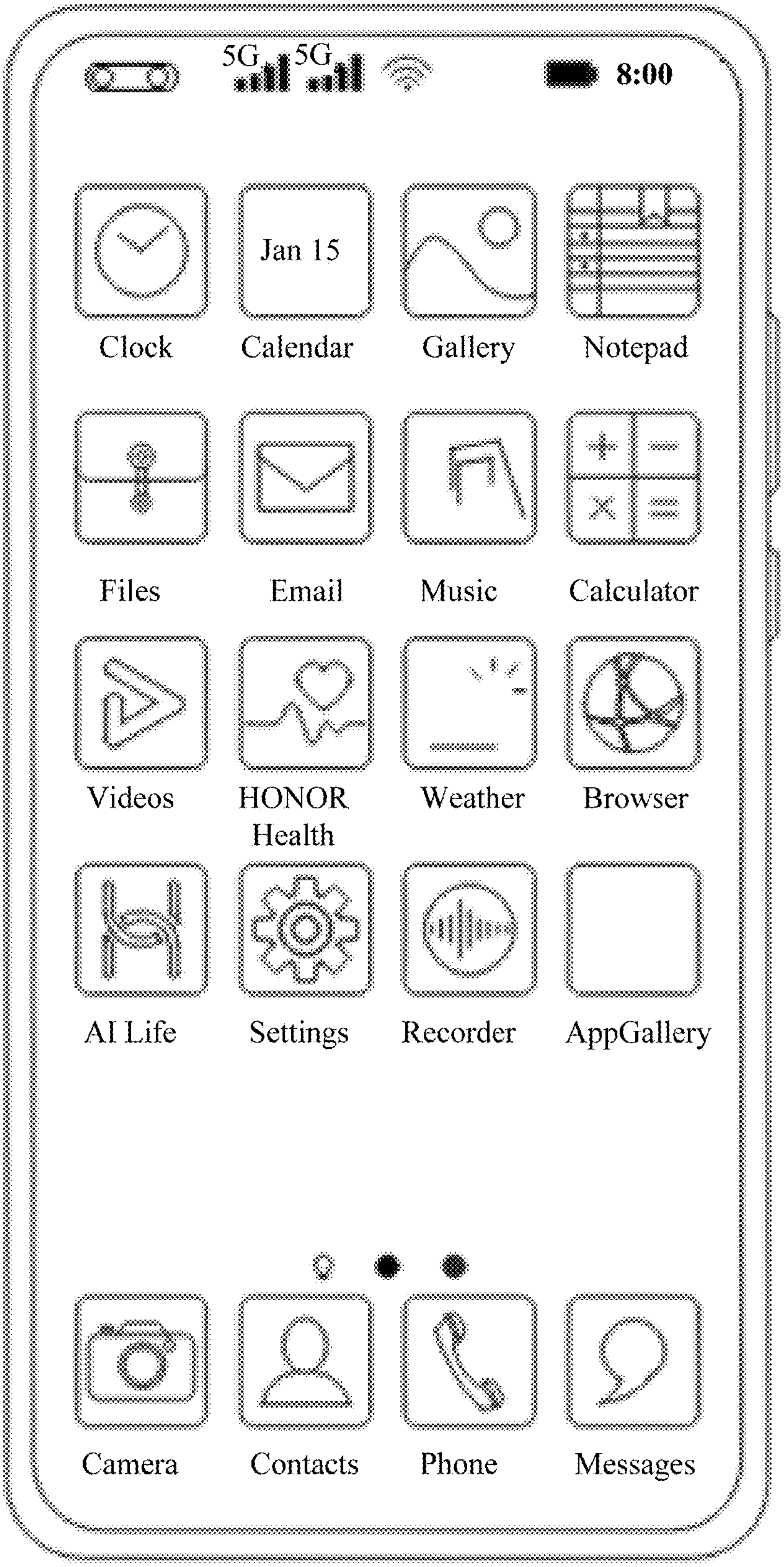

In some other embodiments, when receiving the high-level power-on switching signal, the image sensor may control, based on a state of the display, the image sensor to be in the lower power mode or the ultra-low power mode. In some embodiments, the front-facing camera of the electronic device is triggered by a control instruction and is disabled, and the electronic device is in the screen-off state, as shown in FIG. 6D. After the image sensor receives the high-level power-on switching signal sent by the image front end IFE, the image sensor switches to the ultra-low power mode. In some embodiments, the front-facing camera of the electronic device is triggered by a control instruction and is disabled, and the display of the electronic device is still in the screen-on state, as shown in FIG. 6E. After the image sensor receives the high-level power-on switching signal sent by the image front end IFE, the image sensor switches to the lower power mode.

It should be further noted that when the image sensor runs in the ultra-low power mode, step S501 is performed; or when the image sensor runs in the lower power mode, step S506 is performed.

It should be further noted that the image sensor may alternatively switch from the normal mode to another operation mode in the following implementation.

The image front end IFE generates and sends a high-level power-on switching signal to the image sensor. In addition, the AP, the IFE, or the IFE lite may generate and send a switching signal to the image sensor based on a current state of the electronic device, for example, a state of the display. The image sensor receives the high-level power-on switching signal and the switching signal, and switches from the normal mode to the lower power mode or the ultra-low power mode with reference to the high-level power-on switching signal and the switching signal. In an example, the image sensor receives the high-level power-on switching signal and a first switching signal (for example, at a high level), and the image sensor switches from the normal mode to the lower power mode. The image sensor receives the high-level power-on switching signal and a second switching signal (for example, at a low level), and the image sensor switches from the normal mode to the ultra-low power mode.

In some embodiments, a pin used by the image sensor to receive the switching signal may alternatively be the pin 2 depicted in FIG. 5B. Based on this, the pin 2 of the image sensor may receive the power-on switching signal and the switching signal in a time division manner, and switch to the lower power mode or the ultra-low power mode with reference to the high-level power-on switching signal and the switching signal.

In another embodiment, the image sensor may alternatively use different pins to receive the switching signal and the power-on switching signal. The image sensor switches to the lower power mode or the ultra-low power mode based on the switching signal and the power-on switching signal received by two pins.

In this embodiment, because the ultra-low power mode is set for the image sensor, and the ultra-low power mode has lower power consumption than that of the lower power mode, the image sensor runs in the ultra-low power mode when the electronic device is not used, thereby reducing power consumption. That the electronic device is not used may be understood as that the electronic device is in a standby state, the display is in the screen-off state, or the electronic device is in a locked state.

It should be noted that, regardless of whether the image sensor is in the ultra-low power mode and the lower power mode, an automatic exposure control module of the image sensor or the automatic exposure module of the controller may adjust exposure parameters based on brightness of an image generated by the image sensor, so that the image sensor generates an image whose brightness meets a requirement.

It should be further noted that, in an application scenario in which the ultra-low power mode is set for the image sensor, and the processor completes switching of the image sensor between the ultra-low power mode and the lower power mode based on the high and low levels, the processor needs to configure control logic of a virtualized image sensor for the ultra-low power mode of the image sensor, and the image sensor may be understood as a virtualized image sensor in the ultra-low power mode. Switching and running of the virtualized image sensor in the ultra-low power mode are controlled to send the switching signal, so that the image sensor switches to the ultra-low power mode.

It should be further noted that the foregoing content in which the IFE lite, the IFE, or the AP generates the switching signal to control the image sensor to switch between the ultra-low power mode and the lower power mode for running belongs to passive switching of the image sensor between the ultra-low power mode and the lower power mode. The passive switching may be understood as that operation mode switching of the image sensor needs to be controlled by whether the switching signal sent by the IFE lite, the IFE, or the AP is received. When receiving the switching signal, the image sensor performs operation mode switching based on the switching signal. Certainly, the image sensor may alternatively switch between the ultra-low power mode and the lower power mode in a control manner in which the image sensor performs active switching. The active switching may be understood as that the image sensor actively switches between the ultra-low power mode and the lower power mode without being limited by the switching signal sent by the IFE lite, the IFE, or the AP. Details are described below.

The image sensor detects a light and shadow change based on image data of an image with ultra-low resolution, to obtain a detection result of the light and shadow change. When the image sensor determines, based on the detection result of the light and shadow change, that the front-facing camera of the electronic device detects the light and shadow change, the image sensor switches to the lower power mode for running.

When the image sensor determines that the front-facing camera of the electronic device detects no light and shadow change, the image sensor is controlled to be continuously in the ultra-low power mode.

The image sensor is in the lower power mode, and generates an image with lower resolution. The image sensor may alternatively determine, based on image data of the image with lower resolution, that an exit condition of an event performed by the processor is met, for example, when an AO solution is performed and the image sensor continuously determines that human eyes in the image do not gaze at the display, the image sensor may continuously run in the lower power mode, or the image sensor is controlled to switch to the ultra-low power mode.

Embodiment 2

Figure 7A:
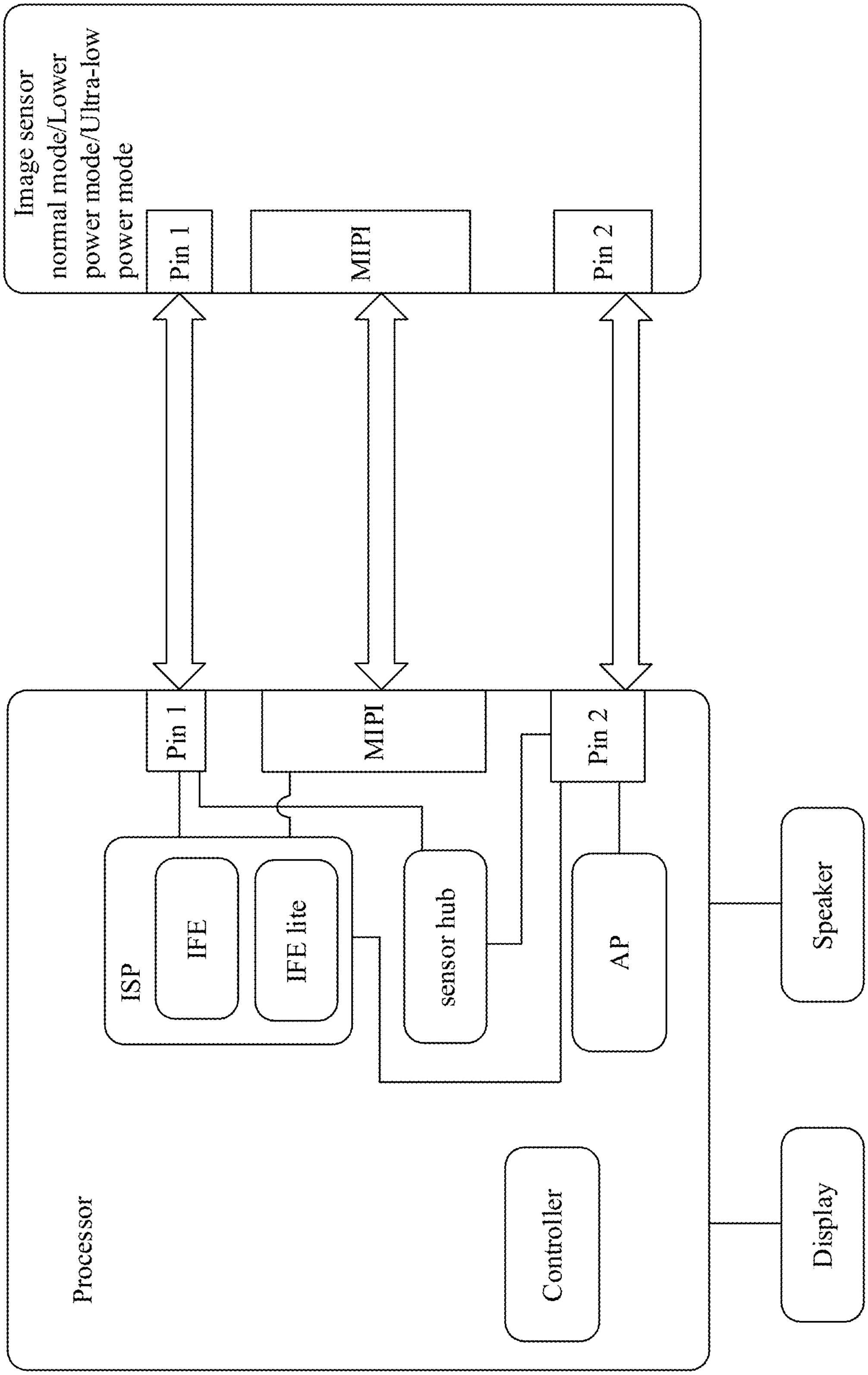
FIG. 7A is a schematic diagram of a connection between an image sensor and a processor in an electronic device according to Embodiment 2 of this application.

To resolve the foregoing problem 1 of high power consumption, another embodiment of this application further provides an electronic device. Different from the foregoing embodiment, in the electronic device in this embodiment, as shown in FIG. 7A, the processor includes a controller, an image signal processor ISP, an application processor AP, and a smart sensor hub (sensor hub).

The smart sensor hub provides a software-hardware combined solution based on an MCU with low power consumption and a lightweight RTOS operating system, and a main function of the smart sensor hub is to connect and process data from various sensor devices. In addition, the smart sensor hub is a conventional component in the processor, and the smart sensor hub is disposed in any conventional processor.

The sensor hub may be connected to the pin 1 and the pin 2, to receive, by using the pin 1, a detection result indicated by, for example, a high level or a low level, sent by the image sensor, and may generate a switching signal or a power-on switching signal, and send the switching signal or the power-on switching signal to the image sensor by using the pin 2.

It should be further noted that power consumption of the sensor hub is low. Therefore, generating the switching signal or the power-on switching signal by the sensor hub has an advantage of low power consumption.

In this embodiment, when the electronic device is powered on, the image sensor enters an ultra-low power mode by default, or usually enters the ultra-low power mode under control of the camera driver. Alternatively, when the electronic device is in a standby state, and the display is in a screen-off state, the image sensor also runs in the ultra-low power mode.

Figure 7B:
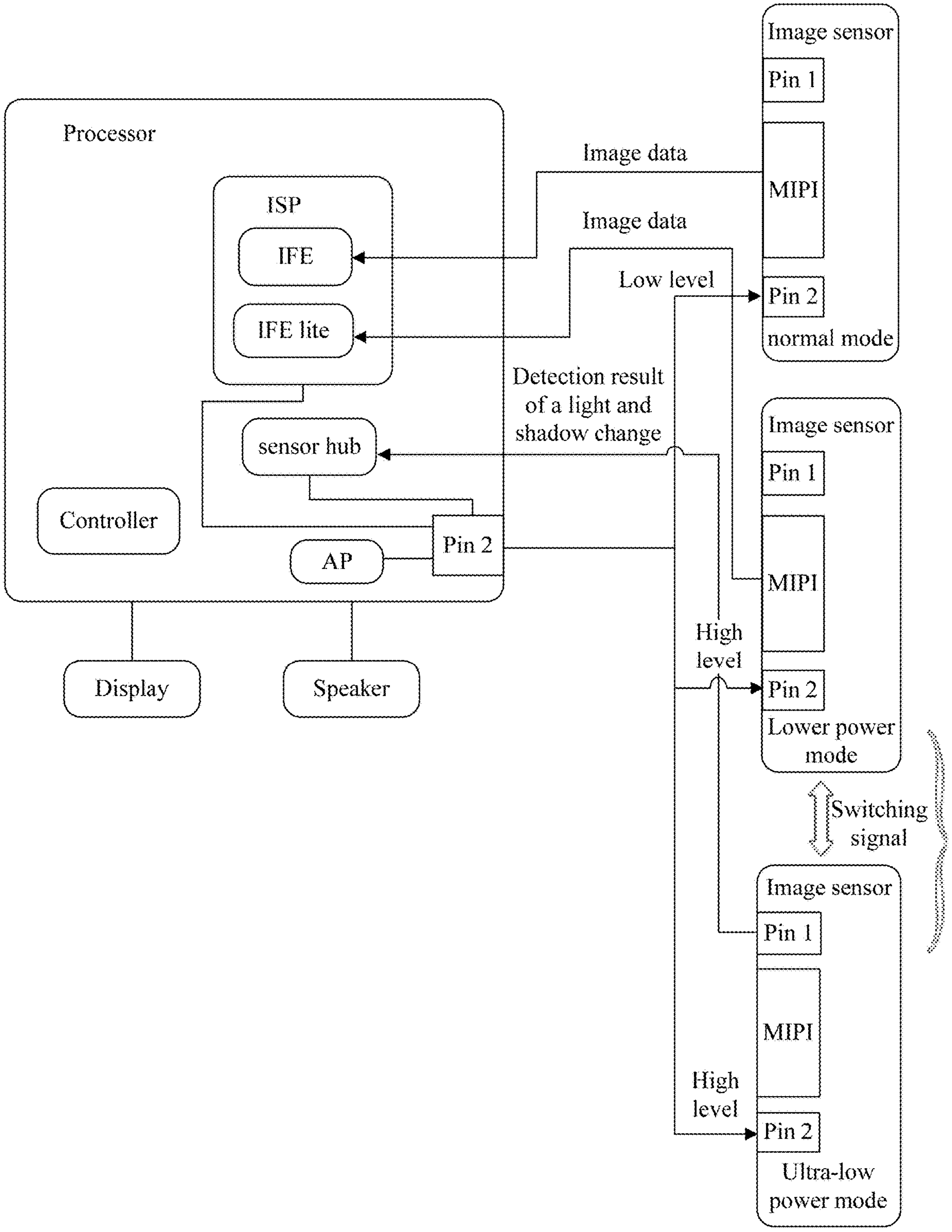
FIG. 7B is a schematic diagram of operation mode switching of an image sensor according to Embodiment 2 of this application.

FIG. 7A shows the components included in the processor of the electronic device and three operation modes of the image sensor. A specific manner in which the image sensor is driven by signals generated by the components in the processor to switch among the three operation modes is shown in FIG. 7B. Refer to FIG. 7B. The image sensor in the ultra-low power mode performs the foregoing step S501 and step S502 to obtain a detection result of a light and shadow change, and transmits the detection result of the light and shadow change to the sensor hub.

After receiving the detection result of the light and shadow change, the sensor hub may determine, based on the detection result of the light and shadow change, whether the front-facing camera of the electronic device detects the light and shadow change. If it is determined that the front-facing camera of the electronic device detects the light and shadow change, the sensor hub generates and sends a switching signal to the image sensor. The image sensor switches to a lower power mode in response to the switching signal.

In some embodiments, when the sensor hub determines that the front-facing camera of the electronic device detects the light and shadow change, the AP, the IFE, or the IFE lite may alternatively generate the switching signal. In this embodiment, an example in which the sensor hub generates the switching signal is used for description.

The image sensor in the lower power mode performs the foregoing step S506 and step S507 to send image data of an image with lower resolution to the image front end lite IFE lite.

If the front-facing camera of the electronic device is enabled, the sensor hub may generate a low-level power-on switching signal, and send the low-level power-on switching signal to the image sensor by using the pin 2, to control an operation mode of the image sensor to be switched to a normal mode.

The image sensor in the normal mode may perform the foregoing step S510 and step S512.

If the front-facing camera of the electronic device is disabled, the sensor hub may generate a high-level power-on switching signal, and send the high-level power-on switching signal to the image sensor by using the pin 2, to control the operation mode of the image sensor to be switched to the ultra-low power mode or the lower power mode.

In some embodiments, when receiving the high-level power-on switching signal, the image sensor may directly switch to the ultra-low power mode. In some other embodiments, when receiving the high-level power-on switching signal, the image sensor may control, based on a state of the display, the image sensor to be in the lower power mode or the ultra-low power mode. In some embodiments, the front-facing camera of the electronic device is triggered by a control instruction and is disabled, and the electronic device is in the screen-off state. After the image sensor receives the high-level power-on switching signal sent by the sensor hub, the image sensor switches to the ultra-low power mode. In some embodiments, the front-facing camera of the electronic device is triggered by a control instruction and is disabled, and the electronic device is in a screen-on state. After the image sensor receives the high-level power-on switching signal sent by the sensor hub, the image sensor switches to the lower power mode.

It should be further noted that when the sensor hub sends the high-level power-on switching signal to the image sensor and the image sensor may switch from the normal mode to another operation mode, the AP, the IFE, the IFE lite, or the sensor hub may generate a switching signal based on a current state of the electronic device, for example, a state of the display. The image sensor receives the high-level power-on switching signal and the switching signal, and switches to the lower power mode or the ultra-low power mode with reference to the high-level power-on switching signal and the switching signal.

It should be further noted that the high-level or low-level power-on switching signal mentioned above may alternatively be generated by the AP, the IFE, or the IFE lite, and sent to the image sensor.

In some embodiments, when an error occurs in the electronic device, the sensor hub may further reset the image sensor, that is, control the image sensor to be initialized to be in the ultra-low power mode.

Embodiment 3

For the foregoing problem 2 of complex processor control logic, an embodiment of this application provides an electronic device. The electronic device includes a processor and an image sensor that can interact with the processor. The image sensor is usually disposed in a front-facing camera of the electronic device. For a hardware structure and a software architecture of the electronic device, refer to the foregoing content. Details are not described herein again.

Figure 8A:
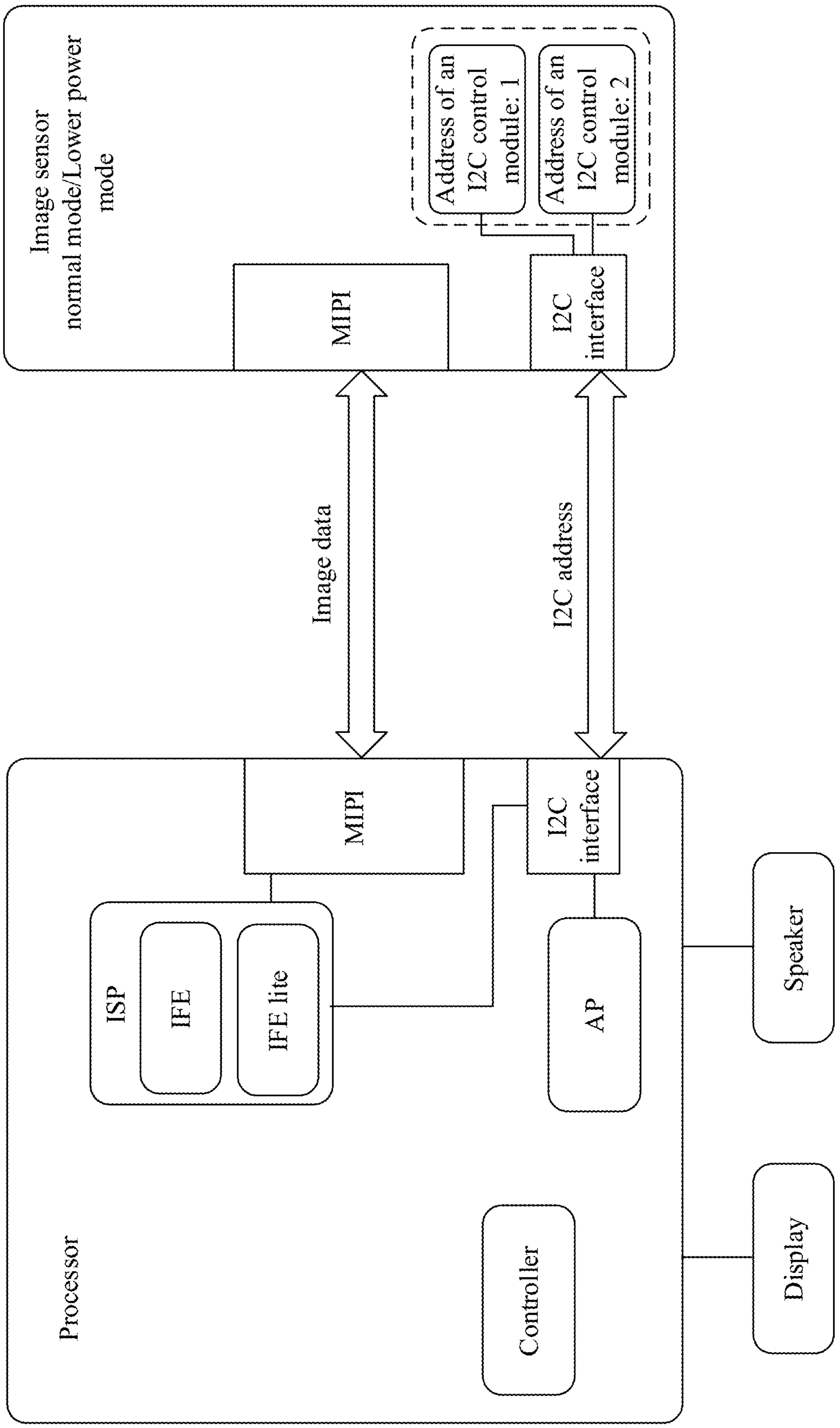
FIG. 8A is a schematic diagram of a connection between an image sensor and a processor in an electronic device according to Embodiment 3 of this application.

Refer to FIG. 8A. In the electronic device provided in this embodiment, the processor includes a controller, an image signal processor ISP, and an application processor AP. The ISP includes at least two integrated units: an image front end IFE and an image front end lite IFE lite. The controller may include three logic units: an AO module, an automatic exposure module, and a camera driver. For functions of the AO module, the automatic exposure module, and the camera driver, refer to the foregoing content. Details are not described herein again.

Two operation modes are set for the image sensor, which are a normal mode and a lower power mode. The normal mode is a normal operation mode of the image sensor, and resolution of an image generated in this mode is resolution configured by the image sensor, for example, may be 4208*3120. The lower power mode has lower power consumption than that of the normal mode. When the image sensor is in the lower power mode, an image with lower resolution may be generated, and the lower resolution may be usually 320*240, 520*392, 640*480, 720*540, 800*600, 960*720, or 1040*784.

As described in Embodiment 1, the normal mode may also be referred to as a first operation mode, and the lower power mode may also be referred to as a second operation mode. For details, refer to the content in the foregoing Embodiment 1. Details are not described herein again.

An MIPI interface and an I2C interface are disposed in each of the image sensor and the processor. An I2C control module connected to the I2C interface is disposed in the image sensor, and the I2C control module may interact with the processor through the I2C interface. The I2C control module may be understood as a logic module disposed in the image sensor, or may be understood as a hardware component of the image sensor.

In some embodiments, the camera driver of the controller, the IFE lite or the IFE in the ISP of the processor, or the AP of the processor generates an I2C address, and sends the I2C address through the I2C interface of the processor. Then, the I2C address is transmitted to the image sensor through the I2C interface of the image sensor. The image sensor performs operation mode switching based on the I2C address. In this embodiment, an example in which the AP generates the I2C address is used for description.

It should be noted that the AP delivers different I2C addresses to control the image sensor to enter different operation modes.

In a possible implementation, with reference to FIG. 8A, the AP is connected to the image sensor by using an I2C bus, two I2C control modules are disposed in the image sensor, and addresses of the two I2C control modules are set to be different. The AP delivers an I2C address, and an I2C control module whose address is set to the I2C address delivered by the AP is triggered, and can transmit a control signal to the image sensor. The image sensor detects the I2C control module that transmits the control signal, to enter a corresponding operation mode.

In an example, the address of one I2C control module is set to 1, and the address of the other I2C control module is set to 2. When the AP delivers an I2C address 1, the I2C control module whose address is set to 1 transmits a control signal to the image sensor, and the image sensor enters the normal mode. When the AP delivers an I2C address 2, the I2C control module whose address is set to 2 transmits a control signal to the image sensor, and the image sensor enters the lower power mode.

Figure 8B:
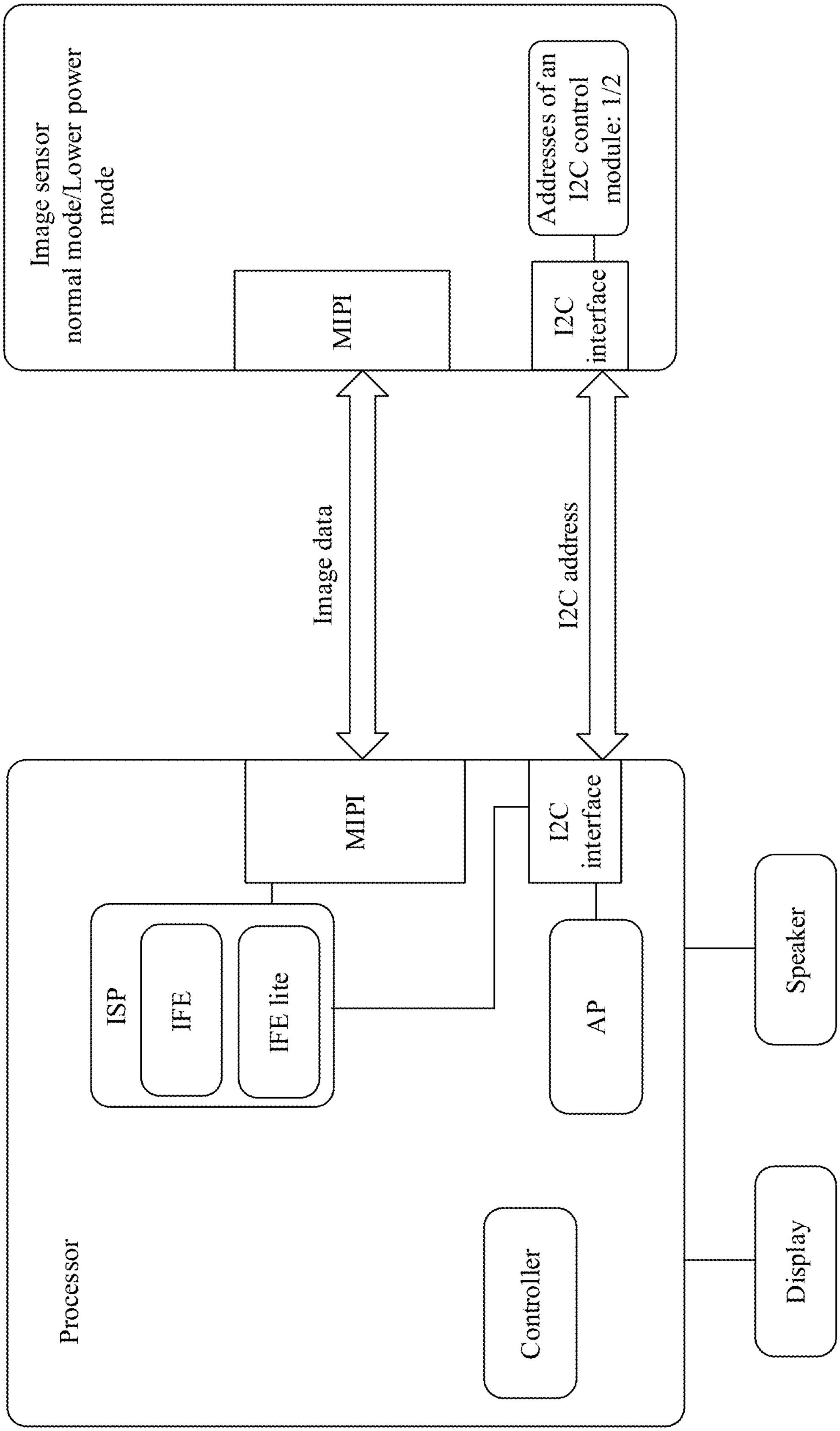
FIG. 8B is a schematic diagram of a connection between an image sensor and a processor in an electronic device according to Embodiment 3 of this application.

In another possible implementation, with reference to FIG. 8B, the AP is connected to the image sensor by using an I2C bus. One I2C control module is disposed in the image sensor, two addresses are set for the I2C control module, and the two addresses are multiplexed in a time division manner. The AP delivers one I2C address, and the I2C control module is triggered, and can transmit a control signal to the image sensor. The image sensor detects the I2C control module that transmits the control signal, to enter an operation mode corresponding to the address.

It should be further noted that, in the example mentioned above, the addresses of the I2C control module are represented by using a value 1 and a value 2 for ease of description. Usually, the address of the I2C control module may be represented by using one byte of binary data. In the one byte of binary data, the first seven values may be used to indicate the address of the I2C control module.

The MIPI interface of the image sensor may transmit image data of an image generated by the image sensor. The image data may be transmitted to the ISP of the processor through the MIPI interface of the processor. In some embodiments, the image front end IFE in the ISP obtains the image data received through the MIPI interface of the processor. In some other embodiments, the image front end lite IFE lite in the ISP obtains the image data received through the MIPI interface of the processor.

In this embodiment, for functions of the image sensor in the normal mode and the lower power mode and a procedure of interaction between the image sensor and the processor, refer to the content in the foregoing Embodiment 1. Details are not described herein again.

It should be further noted that, in this embodiment, the processor uses a manner of delivering different I2C addresses to control operation mode switching of the image sensor instead of using a power-on switching signal, and control logic is simple.

Embodiment 4

For the foregoing problem 1 of high power consumption and the foregoing problem 2 of complex control logic, an embodiment of this application provides another electronic device. The electronic device includes a processor and an image sensor that can interact with the processor. The image sensor is usually disposed in a front-facing camera of the electronic device. For a hardware structure and a software architecture of the electronic device, refer to the foregoing content. Details are not described herein again.

In the electronic device provided in this embodiment, the processor includes a controller, an image signal processor ISP, and an application processor AP. The ISP includes at least two integrated units: an image front end IFE and an image front end lite IFE lite. The controller may include three logic units: an AO module, an automatic exposure module, and a camera driver. For functions of the AO module, the automatic exposure module, and the camera driver, refer to the foregoing content. Details are not described herein again.

Three operation modes are set for the image sensor, which are a normal mode, a lower power mode, and an ultra-low power mode. For details, refer to the content in the foregoing Embodiment 1. Details are not described herein again. The ultra-low power mode and the lower power mode may be collectively referred to as low-power awareness modes. In this embodiment, the image sensor needs to switch among the normal mode, the lower power mode, and the ultra-low power mode. Details are described below.

Figure 9A:
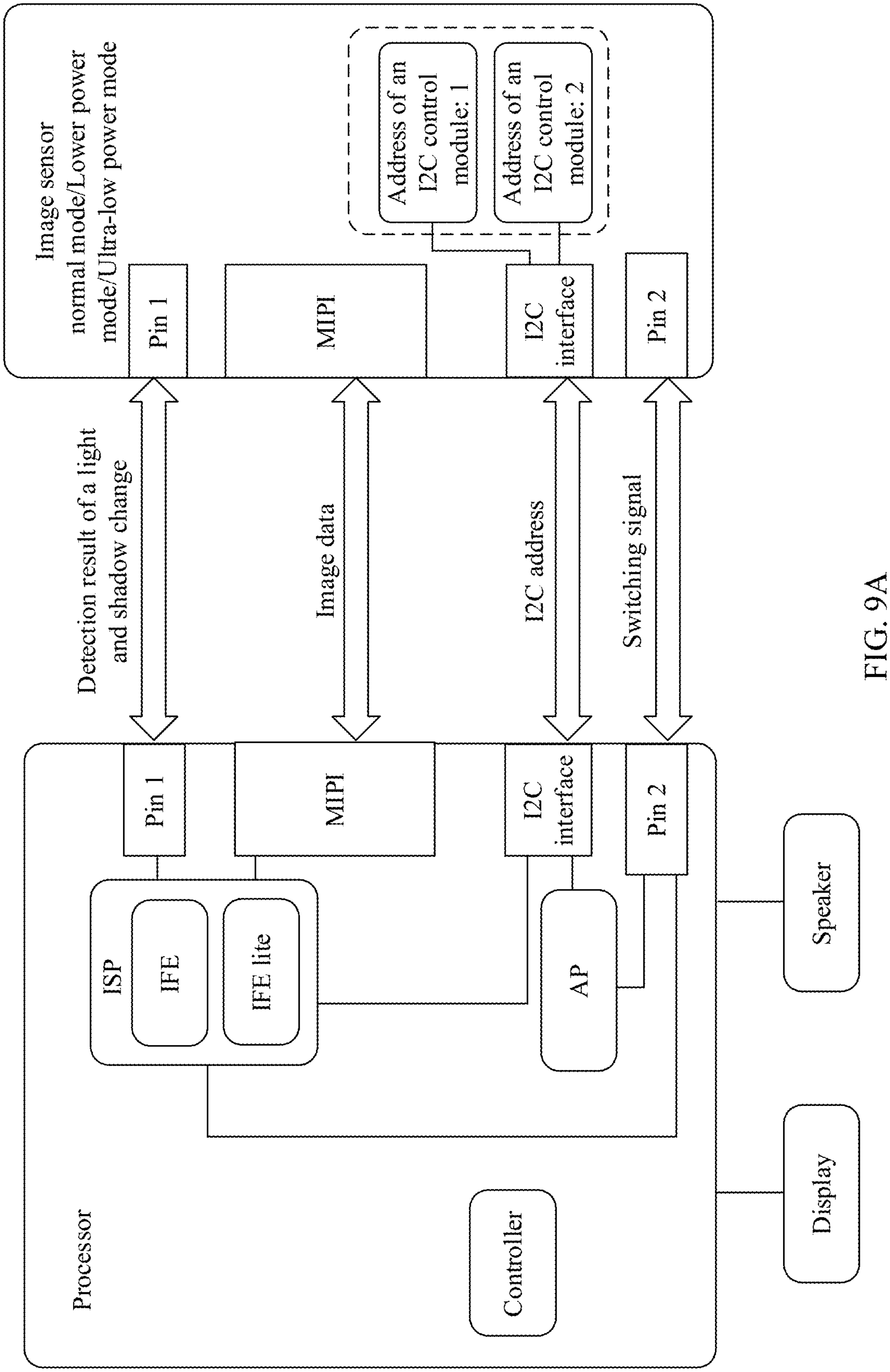
FIG. 9A and FIG. 9B are schematic diagrams of connections between an image sensor and a processor in an electronic device according to Embodiment 4 of this application.

In a possible implementation, with reference to FIG. 9A, an MIPI interface, a pin 1, a pin 2, and an I2C interface are disposed in each of the image sensor and the processor. For functions of the MIPI interfaces and the pins 1 that are disposed in the image sensor and the processor, refer to the content in the foregoing Embodiment 1. Details are not described herein again.

The normal mode corresponds to one I2C address, and the low-power awareness modes correspond to another I2C address. The I2C interfaces of the processor and the image sensor are configured to transmit the I2C address for switching the image sensor to the normal mode for running or the I2C address for switching the image sensor to the low-power awareness mode for running.

In addition, an I2C control module connected to the I2C interface is disposed in the image sensor, and the I2C control module may interact with the processor through the I2C interface. The I2C control module may be understood as a logic module disposed in the image sensor, or may be understood as a hardware component of the image sensor.

In some embodiments, the camera driver of the controller, the IFE lite or the IFE in the ISP of the processor, or the AP of the processor generates an I2C address, and sends the I2C address through the I2C interface of the processor. Then, the I2C address is transmitted to the image sensor through the I2C interface of the image sensor. The image sensor switches to the low-power awareness mode or the normal mode based on the I2C address. In this embodiment, an example in which the AP generates the I2C address is used for description.

Figure 9B:
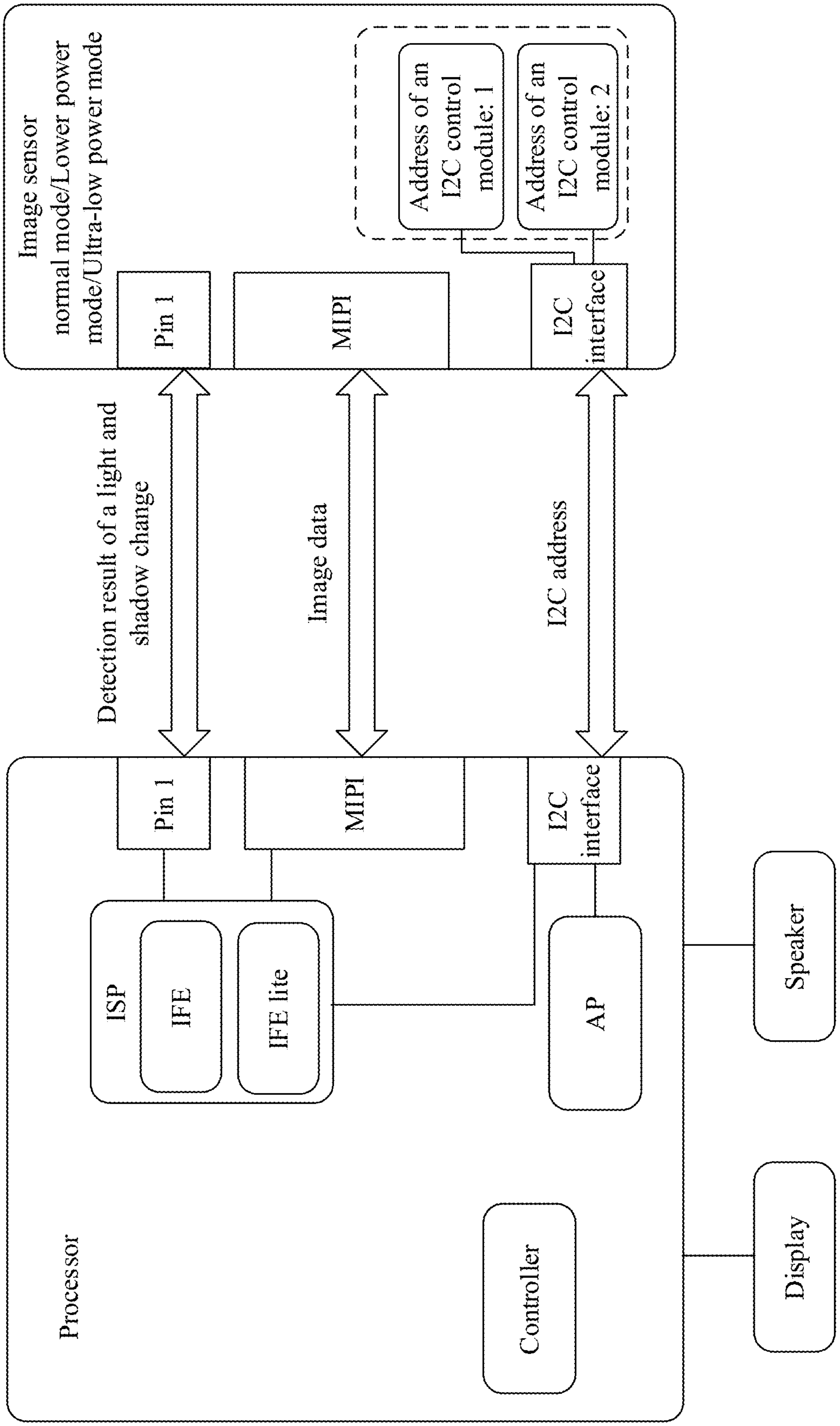
Figure 9C:
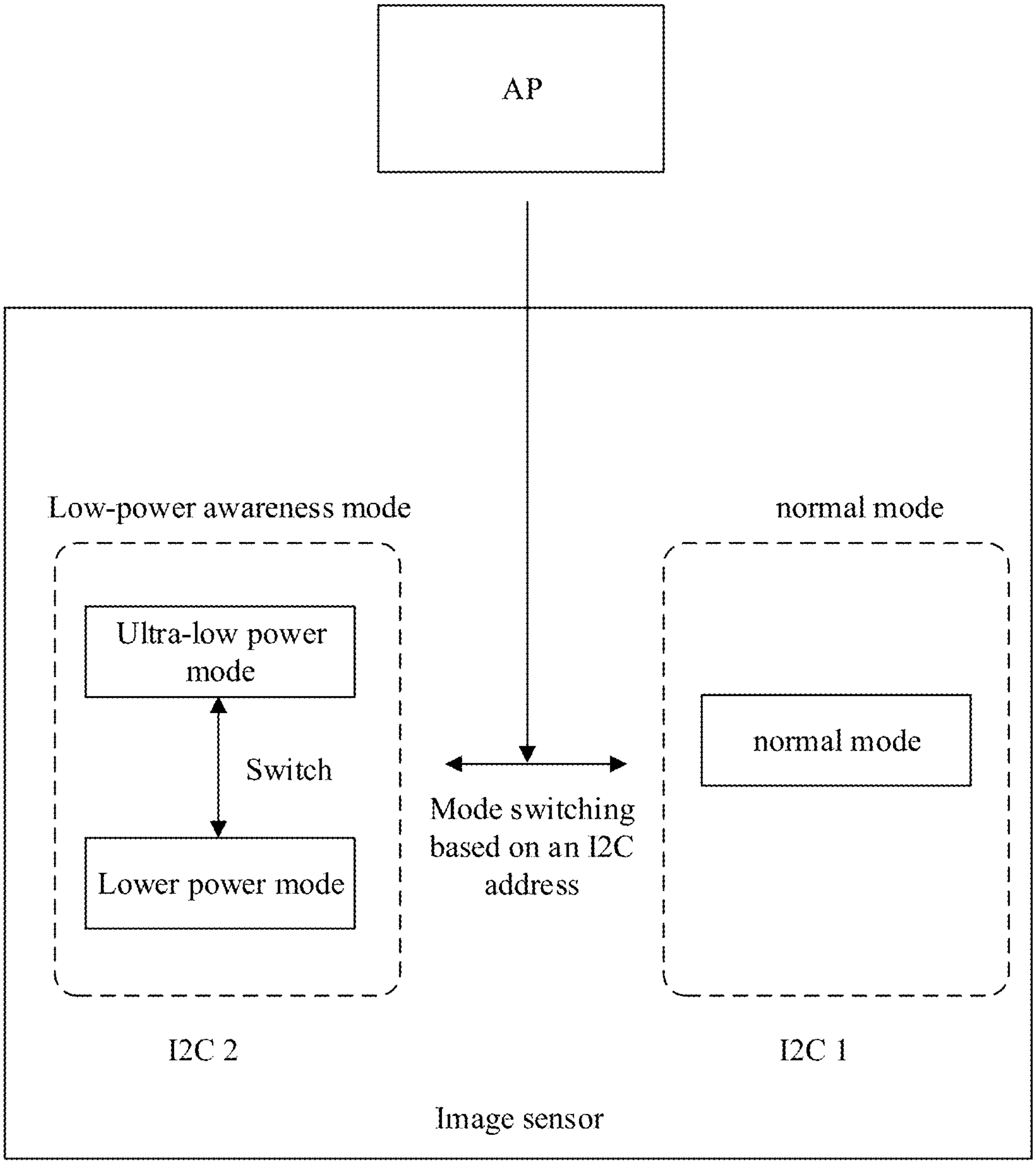
FIG. 9C and FIG. 9D are schematic diagrams of operation mode switching of an image sensor according to Embodiment 4 of this application.

As shown in FIG. 9C, the AP delivers different I2C addresses to control the image sensor to enter the low-power awareness mode or the normal mode.

In an implementation, as shown in FIG. 9A, the AP is connected to the image sensor by using an I2C bus, two I2C control modules are disposed in the image sensor, and addresses of the two I2C control modules are set to be different. The AP delivers an I2C address, and an I2C control module whose address is set to the I2C address delivered by the AP is triggered, and can transmit a control signal to the image sensor. The image sensor detects the I2C control module that transmits the control signal, to enter a corresponding operation mode.

In an example, the address of one I2C control module is set to 1, and the address of the other I2C control module is set to 2. When the AP delivers an I2C address 1, the I2C control module whose address is set to 1 transmits a control signal to the image sensor, and the image sensor enters the normal mode. When the AP delivers an I2C address 2, the I2C control module whose address is set to 2 transmits a control signal to the image sensor, and the image sensor enters the low-power awareness mode. The following uses this example for description.

In another implementation, the AP is connected to the image sensor by using an I2C bus. One I2C control module is disposed in the image sensor, two addresses are set for the I2C control module, and the two addresses are multiplexed in a time division manner. The AP delivers one I2C address, and the I2C control module is triggered, and can transmit a control signal to the image sensor. The image sensor detects the I2C control module that transmits the control signal, to enter an operation mode corresponding to the address.

The pin 2 of the image sensor is configured to transmit 1 bit of level signal. Similarly, the pin 2 of the processor is also configured to transmit 1 bit of level signal. In some embodiments, the pin 2 of the image sensor is a switching pin, and is configured to receive a switching signal for switching the image sensor to the lower power mode or the ultra-low power mode for running. In some examples, the pin 2 of the image sensor may be referred to as a PONV pin or an Xshutdown2 pin.

In some embodiments, the IFE lite or the IFE in the ISP of the processor or the AP of the processor may generate a switching signal, and sends the switching signal by using the pin 2 of the processor. Then, the switching signal is transmitted to the image sensor by using the pin 2 of the image sensor. The image sensor switches between the lower power mode and the ultra-low power mode based on the switching signal.

In another possible implementation, with reference to FIG. 9B, an MIPI interface, a pin 1, and an I2C interface are disposed in each of the image sensor and the processor. For functions of the MIPI interfaces and the pins 1 that are disposed in the image sensor and the processor, refer to the content in the foregoing Embodiment 1. Details are not described herein again. For a function of the I2C interface, refer to the content in the foregoing implementations. Details are not described herein again.

In this possible implementation, the image sensor switches between the ultra-low power mode and the lower power mode in an active manner. Details are described below.

When running in the ultra-low power mode, the image sensor detects a light and shadow change based on image data of an image with ultra-low resolution, to obtain a detection result of the light and shadow change. When the image sensor determines, based on the detection result of the light and shadow change, that the front-facing camera of the electronic device detects the light and shadow change, the image sensor switches to the lower power mode for running.

When the image sensor determines that the front-facing camera of the electronic device detects no light and shadow change, the image sensor is controlled to be continuously in the ultra-low power mode.

When being in the lower power mode, the image sensor generates an image with lower resolution. The image sensor may alternatively determine, based on image data of the image with lower resolution, that an exit condition of an event performed by the processor is met, for example, when an AO solution is performed and the image sensor continuously determines that human eyes in the image do not gaze at a display, the image sensor may continuously run in the lower power mode, or the image sensor is controlled to switch to the ultra-low power mode.

In this possible implementation, switching of the image sensor between the ultra-low power mode and the lower power mode is performed by the image sensor based on the detection result of the light and shadow change, and switching of the image sensor between the normal mode and the low-power awareness mode is performed by the processor based on different I2C addresses. In this way, operation mode switching of the image sensor can be completed by using simple control logic. The following uses this possible implementation as an example for further description.

Figure 9D:
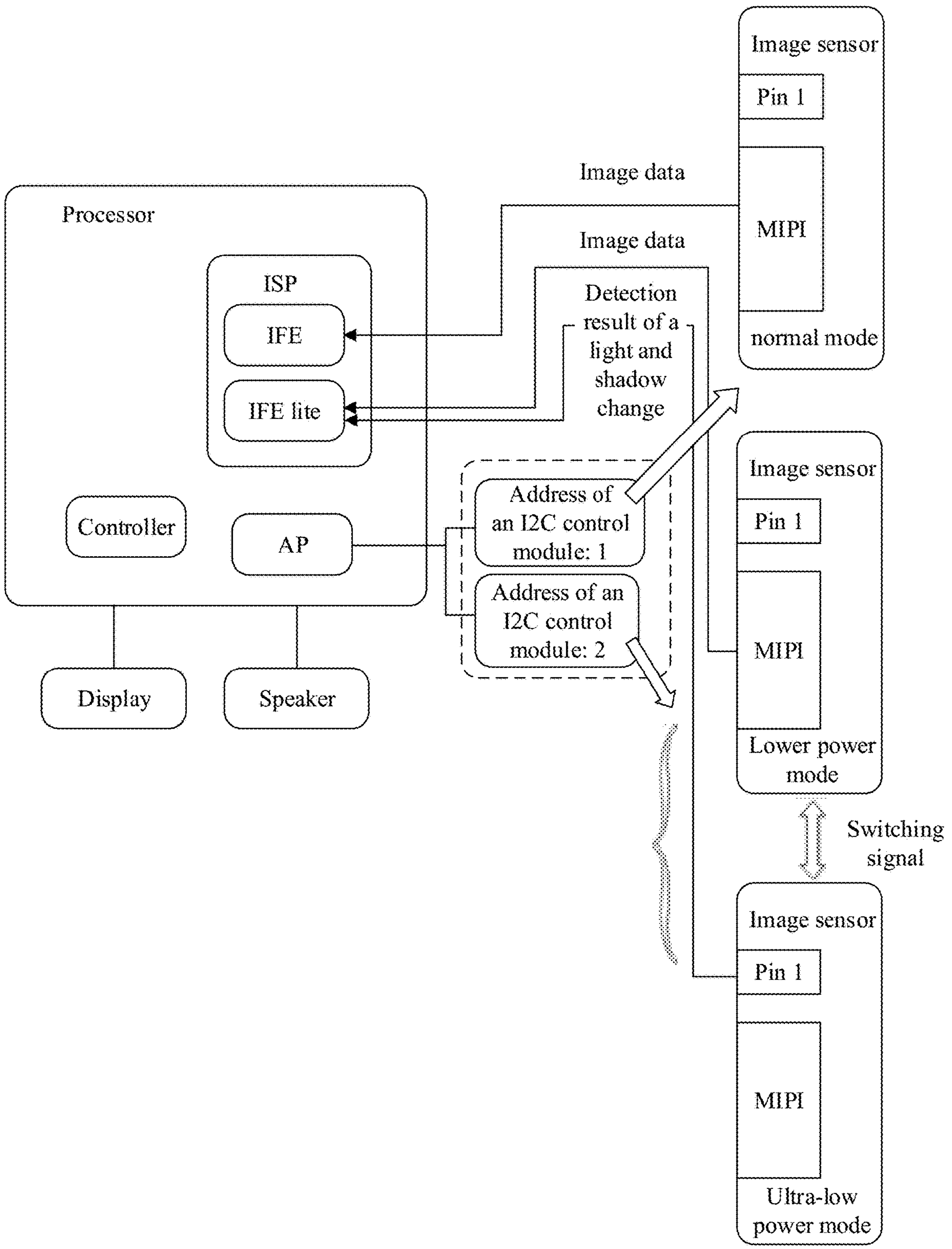

FIG. 9D shows a specific manner in which the image sensor is driven by signals generated by the components in the processor to switch among the normal mode, the ultra-low power mode, and the lower power mode. Refer to FIG. 9D (for ease of drawing, the pin 1, the pin 2, the MIPI interface, and the I2C interface of the processor are not depicted in FIG. 9D, the I2C interface and the pin 2 of the image sensor are not depicted either, the I2C control modules are depicted outside the image sensor, and these constitute no limitation on internal structures of the processor and the image sensor). When the electronic device is powered on, the image sensor enters the ultra-low power mode by default, or enters the ultra-low power mode under control of the camera driver. Alternatively, when the electronic device is in a standby state, and the display is in a screen-off state, the image sensor runs in the ultra-low power mode.

The image sensor in the ultra-low power mode generates an image with ultra-low resolution at a time interval, detects a light and shadow change based on image data of the image with ultra-low resolution, and inputs a detection result of the light and shadow change into the IFE lite by using the pin 1. The IFE lite may perform some events with low power consumption based on the detection result of the light and shadow change. For example, if it is detected that the front-facing camera detects the light and shadow change, the following functions are performed: maintaining the display in a screen-on state, turning down a ringtone volume, controlling the display to automatically rotate based on a face direction, triggering screenshot taking/playing and pause, and turning a page.

When determining, based on the detection result of the light and shadow change, that the front-facing camera of the electronic device detects the light and shadow change, the image sensor generates and sends a switching signal to the image sensor, and switches a mode of the image sensor from the ultra-low power mode to the lower power mode.

The image sensor in the lower power mode also generates an image with lower resolution at a time interval, and sends image data of the image with lower resolution to the IFE lite by using an MIPI pin. The image data that is of the image with lower resolution and that is output by the IFE lite is stored in a secure buffer of a memory.

The processor may perform a plurality of events based on the image data of the image with lower resolution. For example, the controller performs functions mentioned in the foregoing content, for example, detection of human eyes gazing at the display (also referred to as an AO solution), controlling the display to automatically rotate based on a face direction, triggering screenshot taking/playing and pause, and turning a page.

If the front-facing camera of the electronic device is enabled, the AP delivers the I2C address 1, the I2C control module whose address is set to 1 transmits a control signal to the image sensor, and the image sensor enters the normal mode.

The image sensor in the normal mode generates an image with standard resolution at a time interval, and sends image data of the image with standard resolution to the IFE by using the MIPI pin. The IFE processes the image data of the image with standard resolution, and the display displays processed image data.

If the front-facing camera of the electronic device is disabled, the AP delivers the I2C address 2 to control the image sensor to switch from the normal mode to the low-power awareness mode. There may be the following three implementations in which the image sensor receives the I2C address 2, and the I2C control module whose address is set to 2 transmits a control signal to the image sensor, and controls the image sensor to enter the lower power mode or the ultra-low power mode.

In an implementation, the I2C control module whose address is set to 2 transmits a control signal to the image sensor, and the image sensor directly switches to the ultra-low power mode.

In another implementation, the image sensor controls, with reference to the I2C address delivered by the AP and the state of the display, the image sensor to switch to the lower power mode or the ultra-low power mode. Usually, if the display is in the screen-off state, the image sensor switches to the ultra-low power mode; or if the display is in a screen-on state, the image sensor may switch to the lower power mode, or may switch to the ultra-low power mode.

In another implementation, the image sensor controls, with reference to the I2C address delivered by the AP and a switching signal transmitted by the pin 2, the image sensor to switch to the lower power mode or the ultra-low power mode. The switching signal transmitted by the pin 2 may be generated by the IFE lite or the IFE in the ISP of the processor or the AP of the processor based on a current state of the electronic device, for example, the state of the display. If the display is in the screen-off state, the generated switching signal is used to switch the image sensor to the ultra-low power mode.

Same as the foregoing Embodiment 3, the addresses of the I2C control modules are represented by using a value 1 and a value 2 for ease of expression. This does not constitute a limitation on a specific implementation of the addresses of the I2C control modules. Usually, the address of the I2C control module may be represented by using one byte of binary data. In the one byte of binary data, the first seven values may be used to indicate the address of the I2C control module. In addition, an address of an I2C control module mentioned in the following content may also be described by using a value as an example. Similarly, the value mentioned in the following content does not constitute a limitation on a specific implementation of the address of the I2C control module.

Figure 10A:
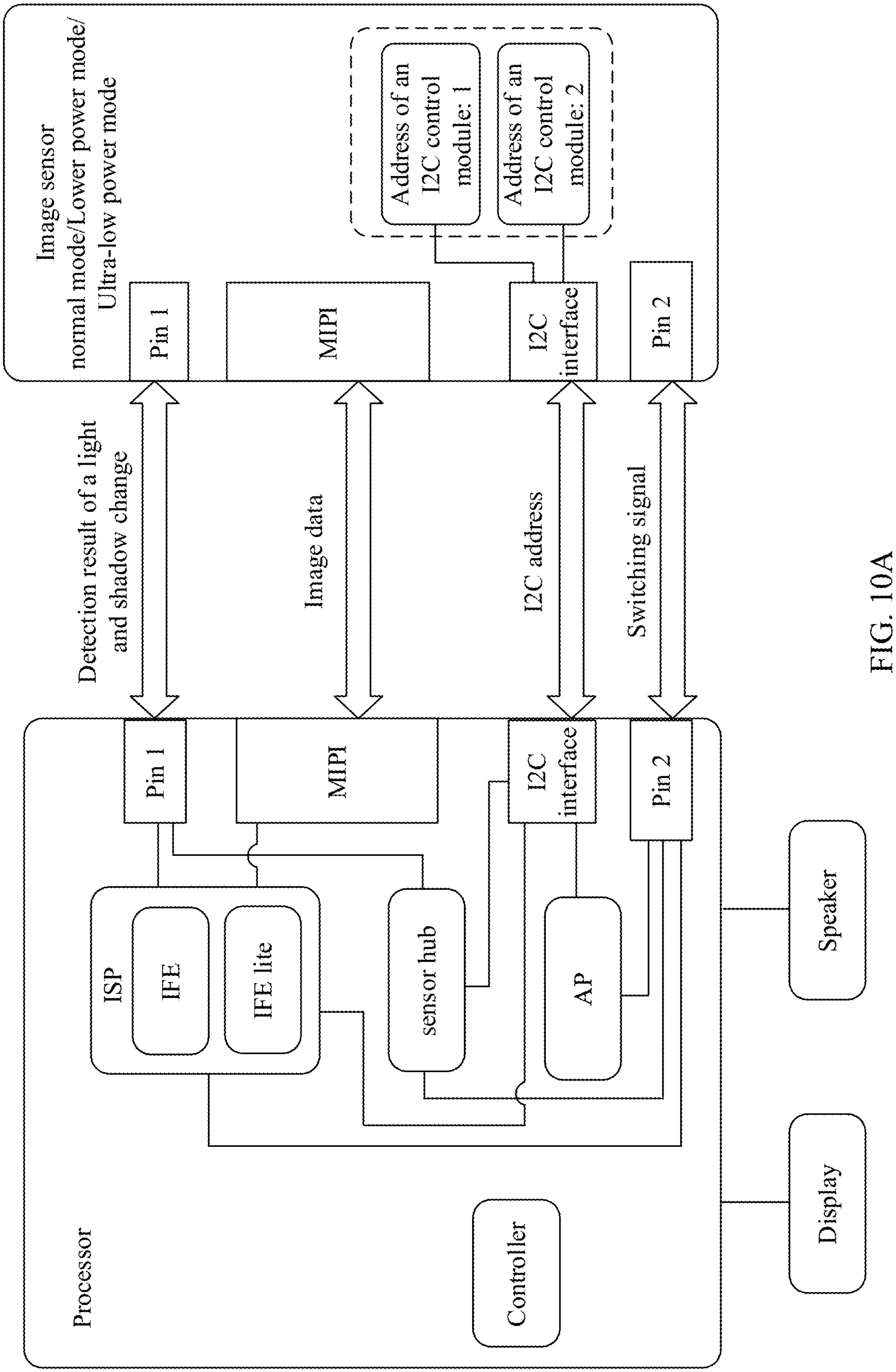
FIG. 10A is a schematic diagram of a connection between an image sensor and a processor in an electronic device according to Embodiment 4 of this application.

It should be further noted that, in consideration of a requirement for reducing power consumption, the electronic device provided in this embodiment may alternatively receive, by using the sensor hub in the processor, the detection result of the light and shadow change that is sent when the image sensor is in the ultra-low power mode, as shown in FIG. 10A.

Figure 10B:
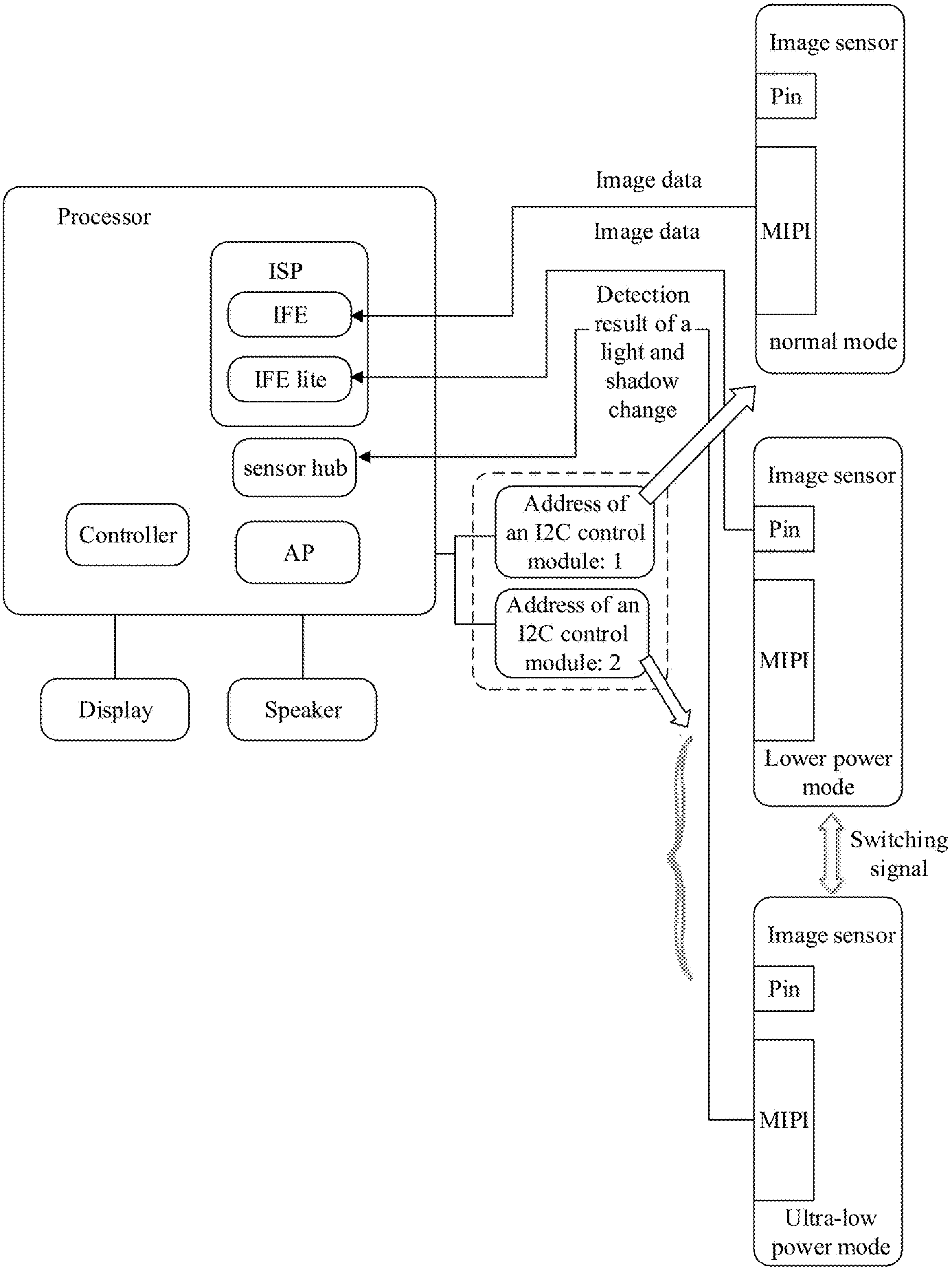
FIG. 10B is a schematic diagram of operation mode switching of an image sensor according to Embodiment 4 of this application.

FIG. 10B shows an implementation in which the image sensor depicted in FIG. 10A switches among the normal mode, the lower power mode, and the ultra-low power mode. Specifically, refer to FIG. 10B (for ease of drawing, the pin 1, the pin 2, the MIPI interface, and the I2C interface of the processor are not depicted in FIG. 10B, the I2C interface and the pin 2 of the image sensor are not depicted either, the I2C control modules are depicted outside the image sensor, and these constitute no limitation on internal structures of the processor and the image sensor). After receiving the detection result of the light and shadow change, the sensor hub may determine, based on the detection result of the light and shadow change, whether the front-facing camera of the electronic device detects the light and shadow change. If it is determined that the front-facing camera of the electronic device detects the light and shadow change, the sensor hub generates and sends a switching signal to the image sensor. The image sensor switches from the ultra-low power mode to the lower power mode in response to the switching signal.

In some embodiments, when the sensor hub determines that the front-facing camera of the electronic device detects the light and shadow change, the AP, the IFE, or the IFE lite may alternatively generate the switching signal.

The sensor hub may alternatively be configured to deliver different I2C addresses to send a power-on switching signal, to control the image sensor to enter the low-power awareness modes or the normal mode.

When the front-facing camera of the electronic device is enabled, the sensor hub may deliver the I2C address 1, the I2C control module whose address is set to 1 transmits the control signal to the image sensor, and the image sensor enters the normal mode.

When the front-facing camera of the electronic device is disabled, the sensor hub may deliver the I2C address 2, to control the image sensor to switch from the normal mode to the low-power awareness mode. For a manner in which the image sensor receives the I2C address 2, and the I2C control module whose address is set to 2 transmits the control signal to the image sensor, to control the image sensor to enter the lower power mode or the ultra-low power mode, refer to the three implementations mentioned above. Details are not described herein again.

It should be further noted that an MIPI interface, a pin 1, a pin 2, and an I2C interface are disposed in each of the image sensor and the processor. Functions of the pin 1 and the MIPI interface are the same as those in the foregoing content. Details are not described herein again.

Different from the foregoing content, the pin 2 may transmit a switching signal for switching of the image sensor between the low-power awareness mode and the normal mode. The switching signal includes a high level and a low level. In an example, when the processor transmits the high level by using the pin 2 of the processor and the pin 2 of the image sensor, the image sensor runs in the low-power awareness mode; and when the processor transmits the low level by using the pin 2 of the processor and the pin 2 of the image sensor, the image sensor runs in the normal mode.

In a possible implementation, different I2C addresses transmitted through the I2C interface are used to control the image sensor to switch between the ultra-low power mode and the lower power mode for running. One I2C address corresponds to the ultra-low power mode, and the other I2C address corresponds to the lower power mode. Correspondingly, two I2C control modules or one I2C control module may be disposed in the image sensor.

For a specific manner of operation mode switching of the image sensor, refer to the foregoing content. Details are not described herein again.

A high-level switching signal and a low-level switching signal are used to control the image sensor to switch between the low-power awareness mode and the normal mode, so that it can be ensured that all modules in the image sensor are enabled only in the normal mode. When the image sensor runs in the low-power awareness mode, only some modules with low power consumption can run, thereby ensuring low power consumption of the image sensor.

In addition, using the high-level switching signal and the low-level switching signal to switch the image sensor to the normal mode further has an advantage that all the modules can be quickly enabled after the image sensor receives the level signals, thereby ensuring performance of the image sensor.

In another possible implementation, the I2C interface transmits the I2C address and different control signals, to control the image sensor to switch between the ultra-low power mode and the lower power mode for running. Correspondingly, one I2C control module may be disposed in the image sensor. In an example, the I2C interface transmits the I2C address 1 and a first control signal, to control the image sensor to run in the lower power mode, and the I2C interface transmits the I2C address 1 and a second control signal, to control the image sensor to run in the ultra-low power mode.

It should be noted that, that the processor sends the I2C address and a control signal may be understood as that the processor sends, to the image sensor by using the I2C bus, information that carries the I2C address and the control signal. In addition, the control signal may be understood as an imperative switching signal, the first control signal is used to control the image sensor to run in the lower power mode, and the second control signal is used to control the image sensor to run in the ultra power mode.

The I2C interface of the image sensor receives the I2C address 1 and the control signal. The I2C control module whose address is set to 1 is triggered, and further transmits the control signal to the image sensor. The image sensor parses the control signal, and determines an operation mode specified by the control signal, and the image sensor switches to the operation mode specified by the control signal.

It should be further noted that, a manner in which the processor controls the image sensor to run in the normal mode may alternatively be that the processor transmits a level value by using the pin 2, and transmits an I2C address through the I2C interface. The I2C address may be the same as the I2C address used for controlling switching between the ultra-low power mode and the lower power mode, and the I2C address may be sent to the image sensor together with a conventional control signal by using the processor.

The conventional control signal may be understood as a signal that does not have a function of controlling the image sensor to run in a specific operation mode.

It should be further noted that control logic is simple because different I2C addresses are used to control the image sensor to switch to different modes. Therefore, the switching signal that controls the image sensor to switch between the ultra-low power mode or the lower power mode may alternatively be sent by using different I2C addresses.

In a possible implementation, switching of the image sensor between running in the normal mode and running in the low-power awareness mode may be implemented by using different I2C addresses. Switching of the image sensor between the low-power awareness modes may be implemented by using a same I2C address and different control signals.

The camera driver of the controller, the IFE lite or the IFE in the ISP of the processor, or the AP or the sensor hub of the processor may generate and send the I2C address or the I2C address and different control signals to the image sensor.

In an example, the processor generates and sends the I2C address 1 to the image sensor to control the image sensor to run in the normal mode; and the processor generates and sends the I2C address 2 and a control signal to the image sensor to control the image sensor to run in the low-power awareness mode. Specifically, the processor generates and sends the I2C address 2 and a first control signal to the image sensor, to control the image sensor to run in the lower power mode; and the processor generates and sends the I2C address 2 and a second control signal to the image sensor, to control the image sensor to run in the ultra-low power mode.

As described above, the first control signal and the second control signal are imperative switching signals, and each may specify the image sensor to run in a specific operation mode.

When the I2C interface of the image sensor receives the I2C address 1, the I2C control module whose address is set to 1 is triggered to control the image sensing to run in the normal mode. When the I2C interface of the image sensor receives the I2C address 2 and the control signal, the I2C control module whose address is set to 2 is triggered, and further transmits the control signal to the image sensor. The image sensor parses the control signal, and determines an operation mode specified by the control signal, and the image sensor switches to the operation mode specified by the control signal.

It should be further noted that the processor may alternatively control, by using the I2C address 1 and a control signal, the image sensor to run in the normal mode. The control signal may be an imperative switching signal and is used to specify the image sensor to run in the normal mode, or may be a conventional control signal.

In another possible implementation, each of the three operation modes of the image sensor corresponds to one I2C address. Specifically, the processor is connected to the image sensor by using an I2C bus, and I2C control modules are disposed in the image sensor. The AP delivers different I2C addresses, an I2C control module whose address is set to the I2C address delivered by the AP is triggered, and the image sensor is controlled to enter an operation mode corresponding to the I2C address delivered by the AP.

It should be noted that different I2C addresses may alternatively be generated and delivered by the camera driver of the controller or the IFE lite or the IFE in the ISP of the processor. The following uses the AP as an example for description.

Figure 11A:
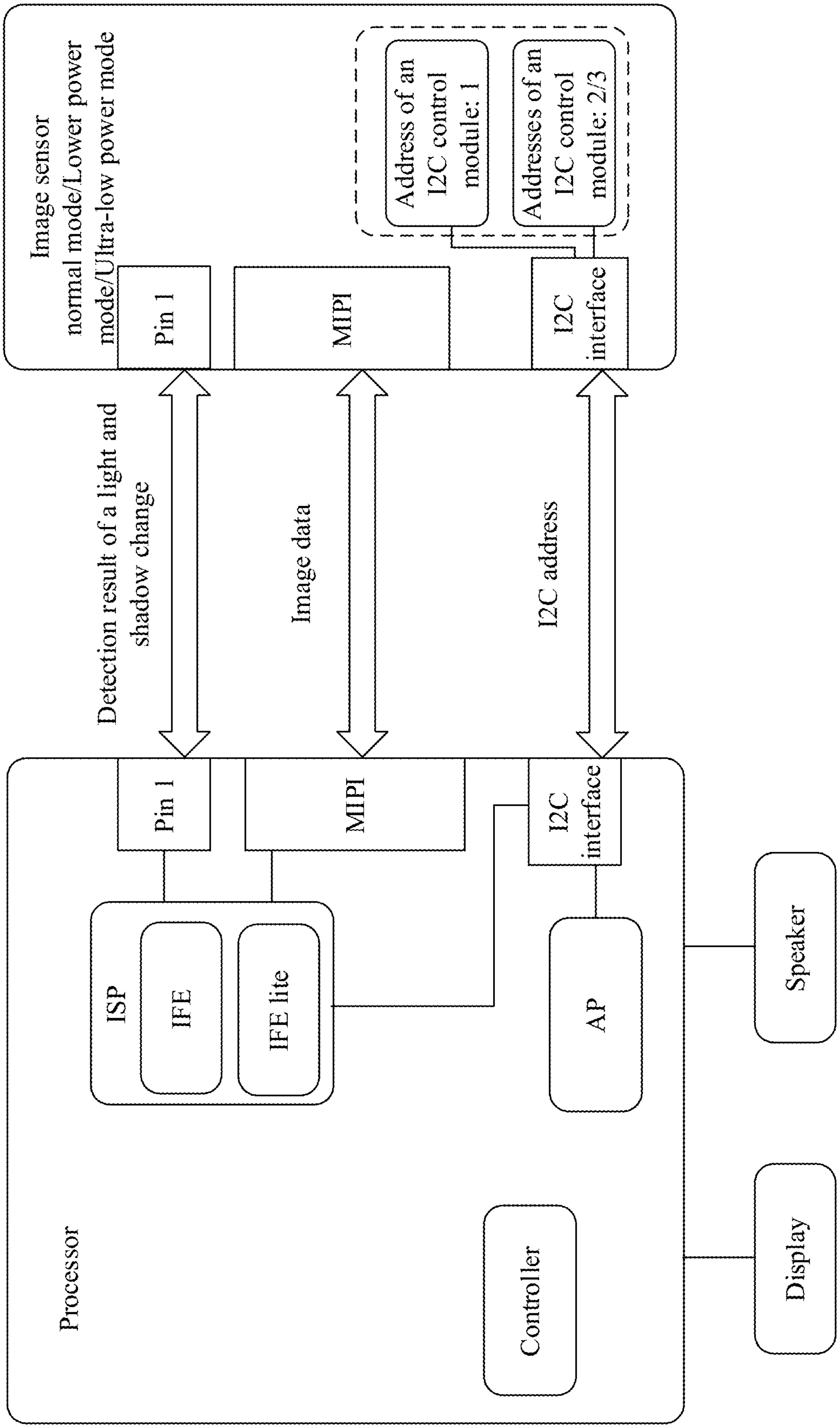
FIG. 11A, FIG. 11B, FIG. 11C, and FIG. 11D are schematic diagrams of connections between an image sensor and a processor in an electronic device according to Embodiment 4 of this application.

In some embodiments, with reference to FIG. 11A, two I2C control modules are disposed in the image sensor. An address of one I2C control module corresponds to the normal mode of the image sensor. One address of the other I2C control module corresponds to the lower power mode, and the other address of the I2C control module corresponds to the ultra-low power mode.

In an example, an address of one I2C control module is set to 1, addresses of the other I2C control module are set to 2 and 3, and the two addresses are multiplexed in a time division manner. When the AP delivers an I2C address 1, the I2C control module whose address is set to 1 transmits a control signal to the image sensor, and the image sensor enters the normal mode. When the AP delivers an I2C address 2, the I2C control module whose addresses are set to 2 and 3 transmits a control signal to the image sensor, and the image sensor enters the lower power mode corresponding to the address 2. When the AP delivers an I2C address 3, the I2C control module whose addresses are set to 2 and 3 transmits a control signal to the image sensor, and the image sensor enters the lower power mode corresponding to the address 3.

Figure 11B:
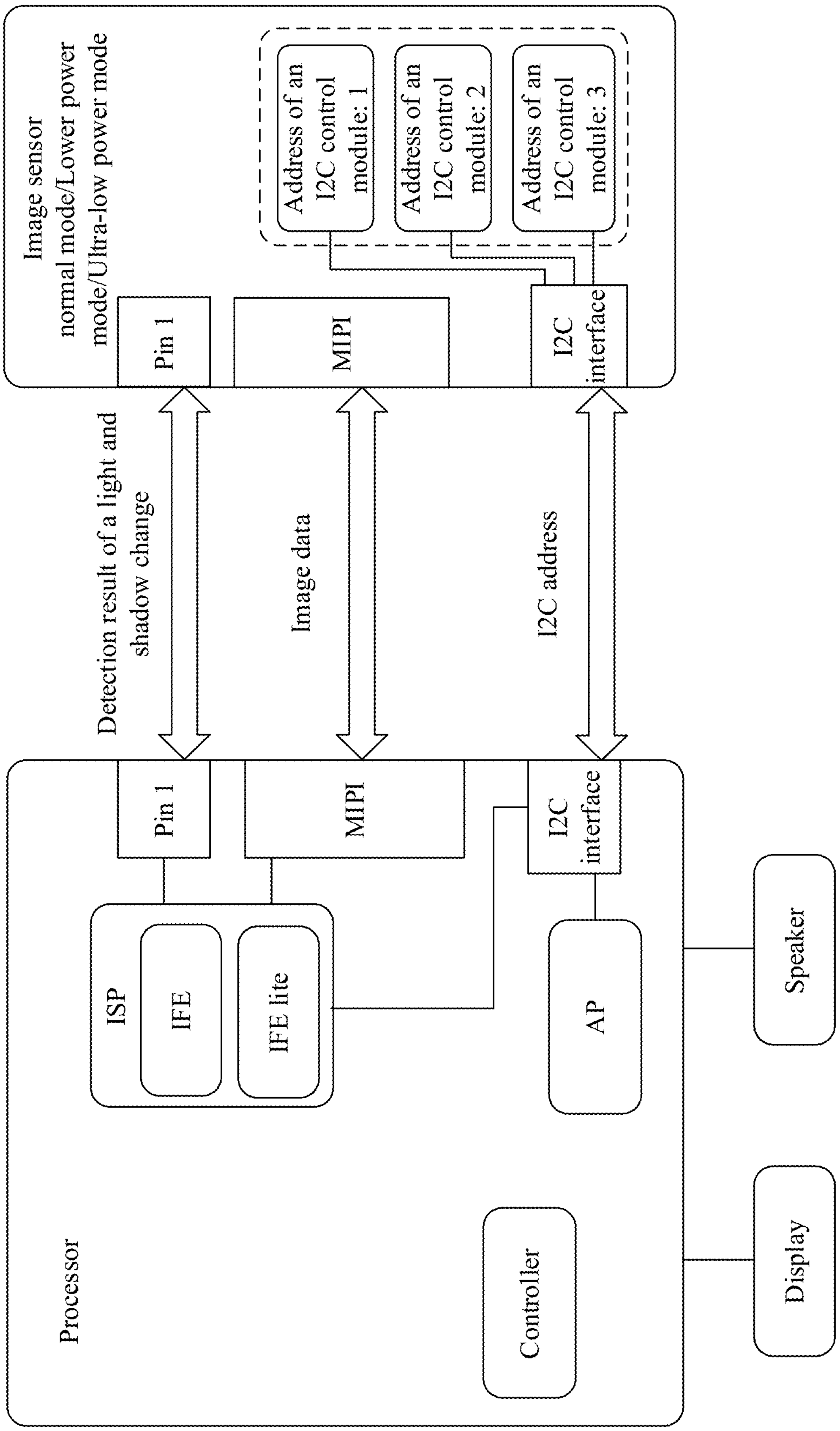

In some embodiments, with reference to FIG. 11B, three I2C control modules are disposed in the image sensor. An address of one I2C control module corresponds to the normal mode of the image sensor, an address of one I2C control module corresponds to the lower power mode, and an address of one I2C control module corresponds to the ultra-low power mode.

In an example, an address of one I2C control module is set to 1, an address of another I2C control module is set to 2, and an address of another I2C control module is set to 3. When the AP delivers an I2C address 1, the I2C control module whose address is set to 1 transmits a control signal to the image sensor, and the image sensor enters the normal mode. When the AP delivers an I2C address 2, the I2C control module whose address is set to 2 transmits a control signal to the image sensor, and the image sensor enters the lower power mode. When the AP delivers an I2C address 3, the I2C control module whose address is set to 3 transmits a control signal to the image sensor, and the image sensor enters the lower power mode.

When the sensor hub of the processor is connected to the I2C interface of the processor, the sensor hub may also be configured to deliver different I2C addresses, to control a corresponding I2C control module to be triggered, and the image sensor is controlled to enter an operation mode corresponding to the delivered I2C address.

Figure 11C:
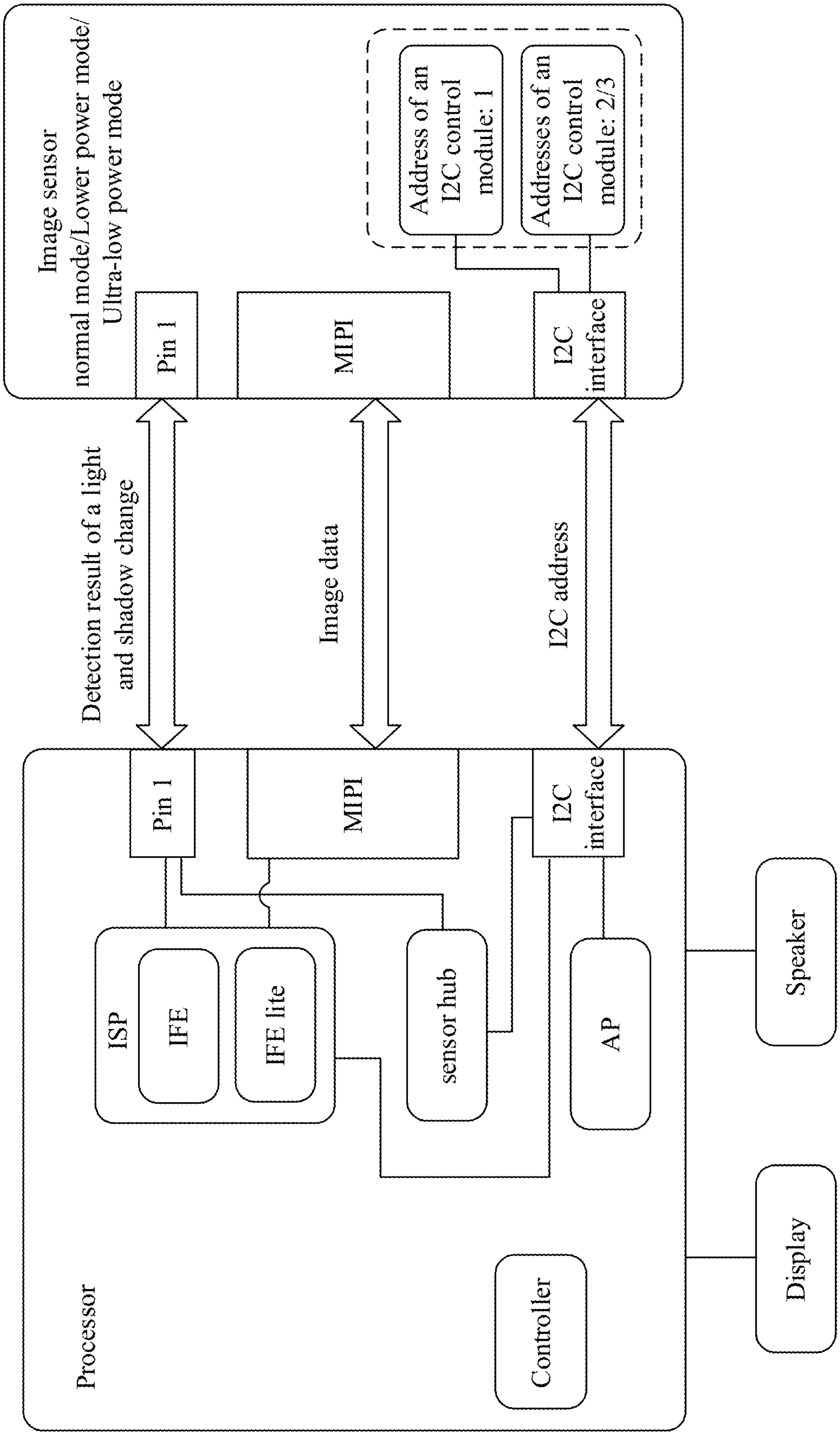

As shown in FIG. 11C, two I2C control modules are disposed in the image sensor. An address of one I2C control module corresponds to the normal mode of the image sensor. One address of the other I2C control module corresponds to the lower power mode, and the other address of the I2C control module corresponds to the ultra-low power mode.

In an example, an address of one I2C control module is set to 1, addresses of the other I2C control module are set to 2 and 3, and the two addresses are multiplexed in a time division manner. When the sensor hub delivers an I2C address 1, the I2C control module whose address is set to 1 transmits a control signal to the image sensor, and the image sensor enters the normal mode. When the sensor hub delivers an I2C address 2, the I2C control module whose addresses are set to 2 and 3 transmits a control signal to the image sensor, and the image sensor enters the lower power mode corresponding to the address 2. When the sensor hub delivers an I2C address 3, the I2C control module whose addresses are set to 2 and 3 transmits a control signal to the image sensor, and the image sensor enters the lower power mode corresponding to the address 3.

Figure 11D:
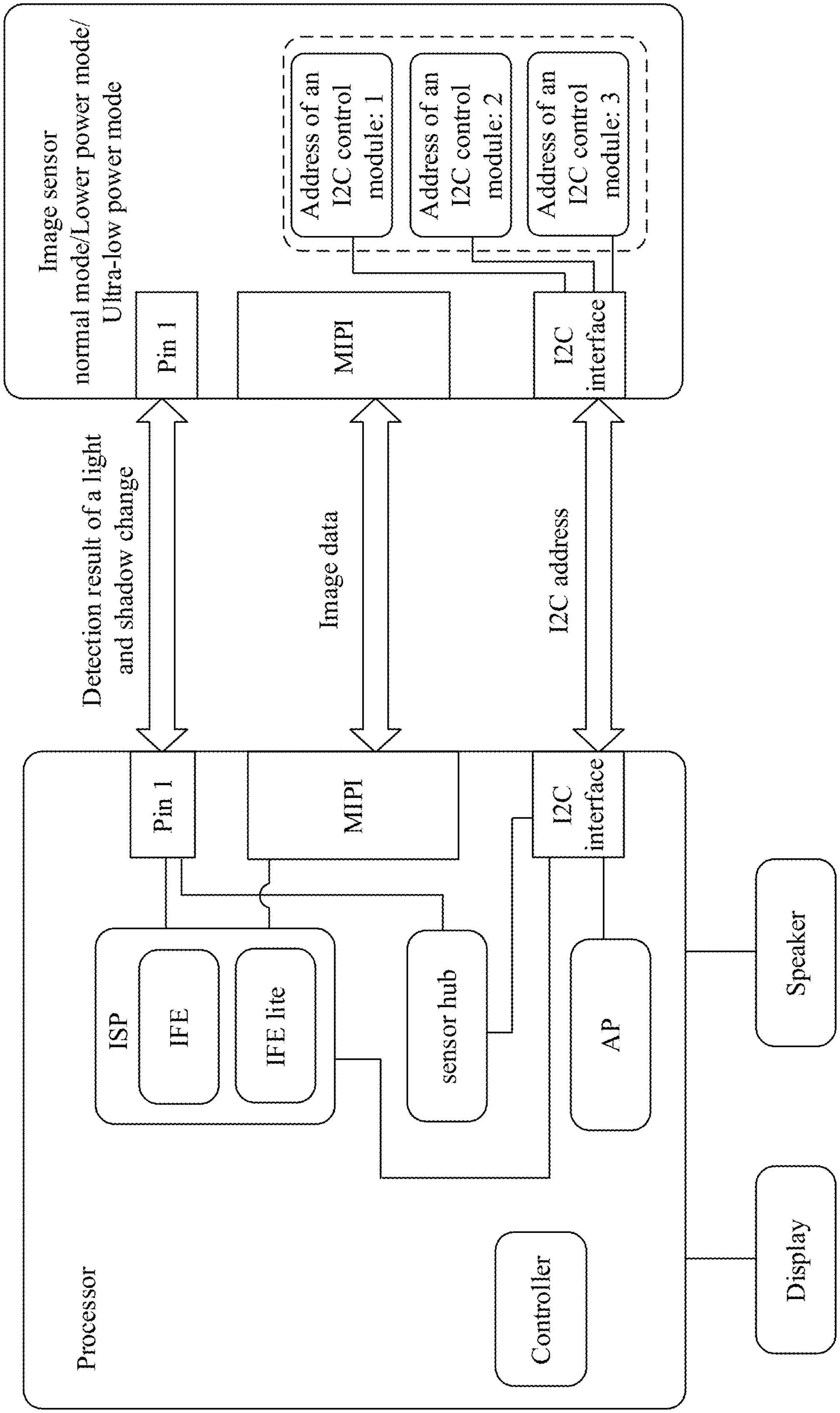

In some embodiments, with reference to FIG. 11D, three I2C control modules are disposed in the image sensor. An address of one I2C control module corresponds to the normal mode of the image sensor, an address of one I2C control module corresponds to the lower power mode, and an address of one I2C control module corresponds to the ultra-low power mode.

In an example, an address of one I2C control module is set to 1, an address of another I2C control module is set to 2, and an address of another I2C control module is set to 3. When the sensor hub delivers an I2C address 1, the I2C control module whose address is set to 1 transmits a control signal to the image sensor, and the image sensor enters the normal mode. When the sensor hub delivers an I2C address 2, the I2C control module whose address is set to 2 transmits a control signal to the image sensor, and the image sensor enters the lower power mode. When the sensor hub delivers an I2C address 3, the I2C control module whose address is set to 3 transmits a control signal to the image sensor, and the image sensor enters the lower power mode.

Embodiment 5

Another embodiment of this application further provides an electronic device. The electronic device includes a processor and an image sensor that can interact with the processor. The image sensor is usually disposed in a front-facing camera of the electronic device. For a hardware structure and a software architecture of the electronic device, refer to the foregoing content. Details are not described herein again.

Figure 12A:
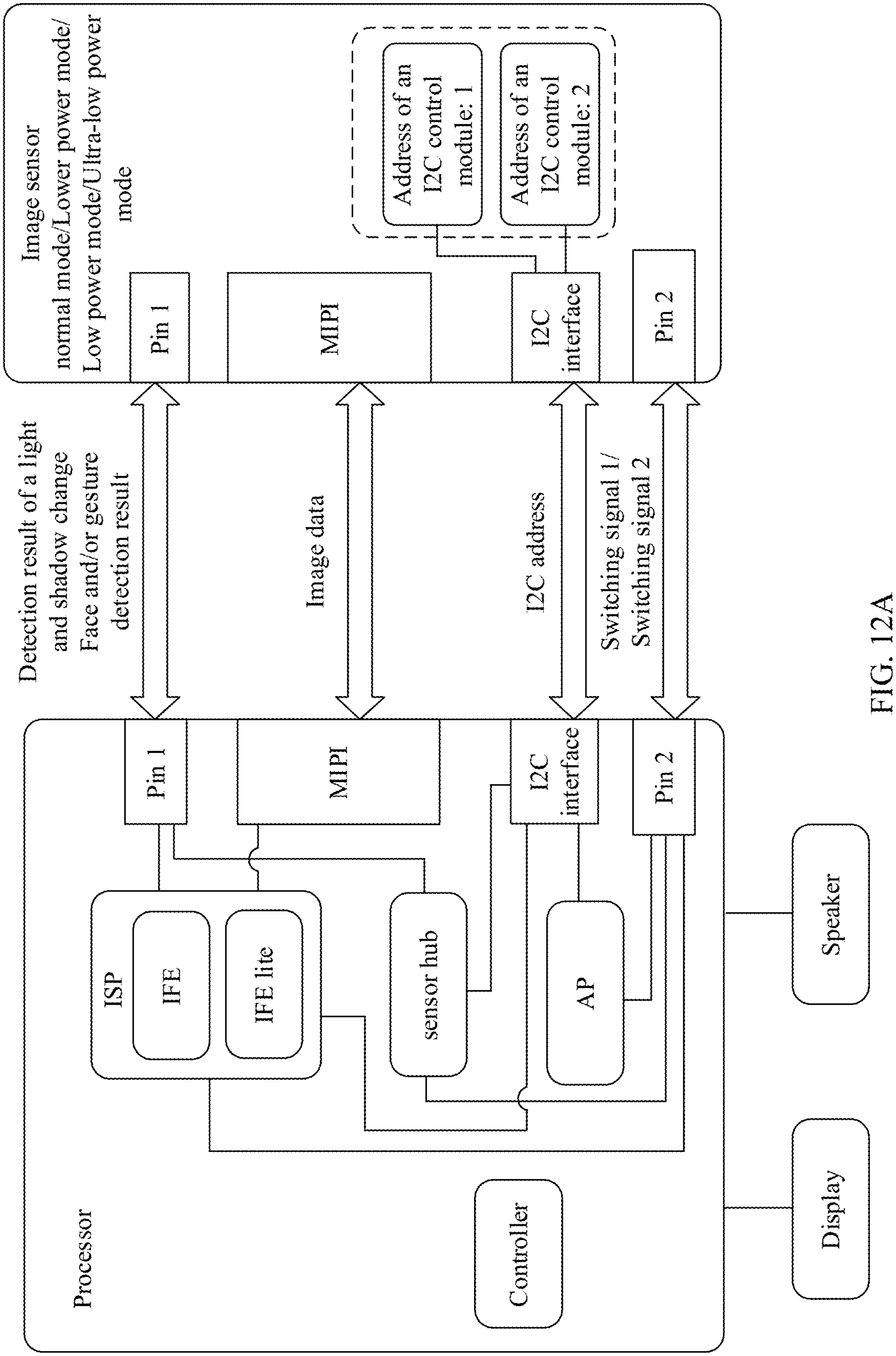
FIG. 12A is a schematic diagram of a connection between an image sensor and a processor in an electronic device according to Embodiment 5 of this application.

Refer to FIG. 12A. In the electronic device provided in this embodiment, the processor includes a controller, an image signal processor ISP, a smart sensor hub sensor hub, and an application processor AP. The ISP includes at least two integrated units: an image front end IFE and an image front end lite IFE lite. The controller may include three logic units: an AO module, an automatic exposure module, and a camera driver. For functions of the AO module, the automatic exposure module, and the camera driver, refer to the foregoing content.

In this embodiment, the image sensor includes four operation modes, which are respectively a first operation mode, a second operation mode, and a fourth operation mode. The first operation mode may also be referred to as a normal operation mode or a normal mode, and resolution of an image generated in the first operation mode is first image resolution, for example, may be 4208*3120. The second operation mode may also be referred to as a lower power mode. Power consumption of the second operation mode is lower than power consumption of the first operation mode, and resolution of an image generated in the second operation mode is second image resolution, which may be usually 320*240, 520*392, 640*480, 720*540, 800*600, 960*720, or 1040*784. The third operation mode may also be referred to as an ultra-low power mode. Power consumption of the third operation mode is lowest, and resolution of an image generated in the third operation mode is third image resolution, which is usually 16*12. The fourth operation mode may also be referred to as a low power mode. The low power mode has lower power consumption than that of the lower power mode, and resolution of an image generated in the fourth operation mode is fourth image resolution, which may be usually 64*48, 72*54, 80*60, 96*72, 120*90, or 128*96. Therefore, it can be learned that the first image resolution>the second image resolution>the fourth image resolution>the third image resolution.

An MIPI interface, a pin 1, a pin 2, and an I2C interface are disposed in each of the image sensor and the processor. For functions of the MIPI interfaces and the pins 1 that are disposed in the image sensor and the processor, refer to the content in the foregoing Embodiment 1. Details are not described herein again.

The four operation modes of the image sensor may be divided into two groups, a first group includes the normal mode and the lower power mode, and a second group includes the low power mode and the ultra-low power mode. The I2C interfaces of the processor and the image sensor are connected by using an I2C bus, and are configured to transmit an I2C address. The I2C address is used to control the image sensor to run in one operation mode in the first group or one operation mode in the second group.

In this embodiment, the camera driver of the controller, the IFE lite or the IFE in the ISP of the processor, or the AP or the sensor hub of the processor may generate different I2C addresses and send the different I2C addresses through the I2C interface of the processor. Then, the I2C address is transmitted to the image sensor through the I2C interface of the image sensor, and the image sensor switches to an operation mode corresponding to the I2C address. In this embodiment, an example in which the sensor hub generates the I2C address is used for description.

Specifically, an I2C control module connected to the I2C interface is disposed in the image sensor, and the I2C control module may interact with the processor through the I2C interface, to control operation mode switching of the image sensor. The I2C control module may be understood as a logic module disposed in the image sensor, or may be understood as a hardware component disposed in the image sensor.

The I2C control module may be disposed in the image sensor in the following two implementations.

In a possible implementation, as shown in FIG. 12A, two I2C control modules are disposed in the image sensor, and addresses of the two I2C control modules are set to be different. The sensor hub delivers an I2C address, and an I2C control module whose address is set to the I2C address delivered by the sensor hub is triggered, and can transmit a control signal to the image sensor. The image sensor detects the I2C control module that transmits the control signal, to enter a corresponding operation mode.

Figure 12B:
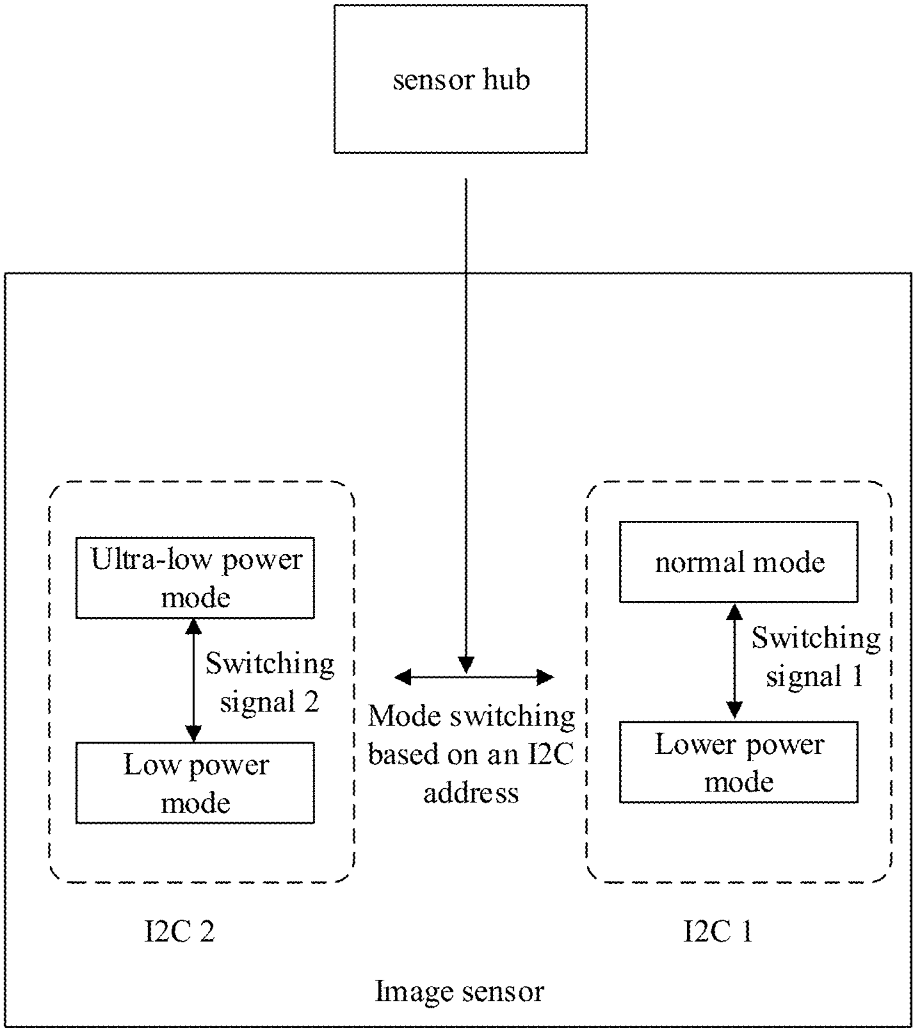
FIG. 12B and FIG. I2C are schematic diagrams of operation mode switching of an image sensor according to Embodiment 5 of this application.
Figure 12C:
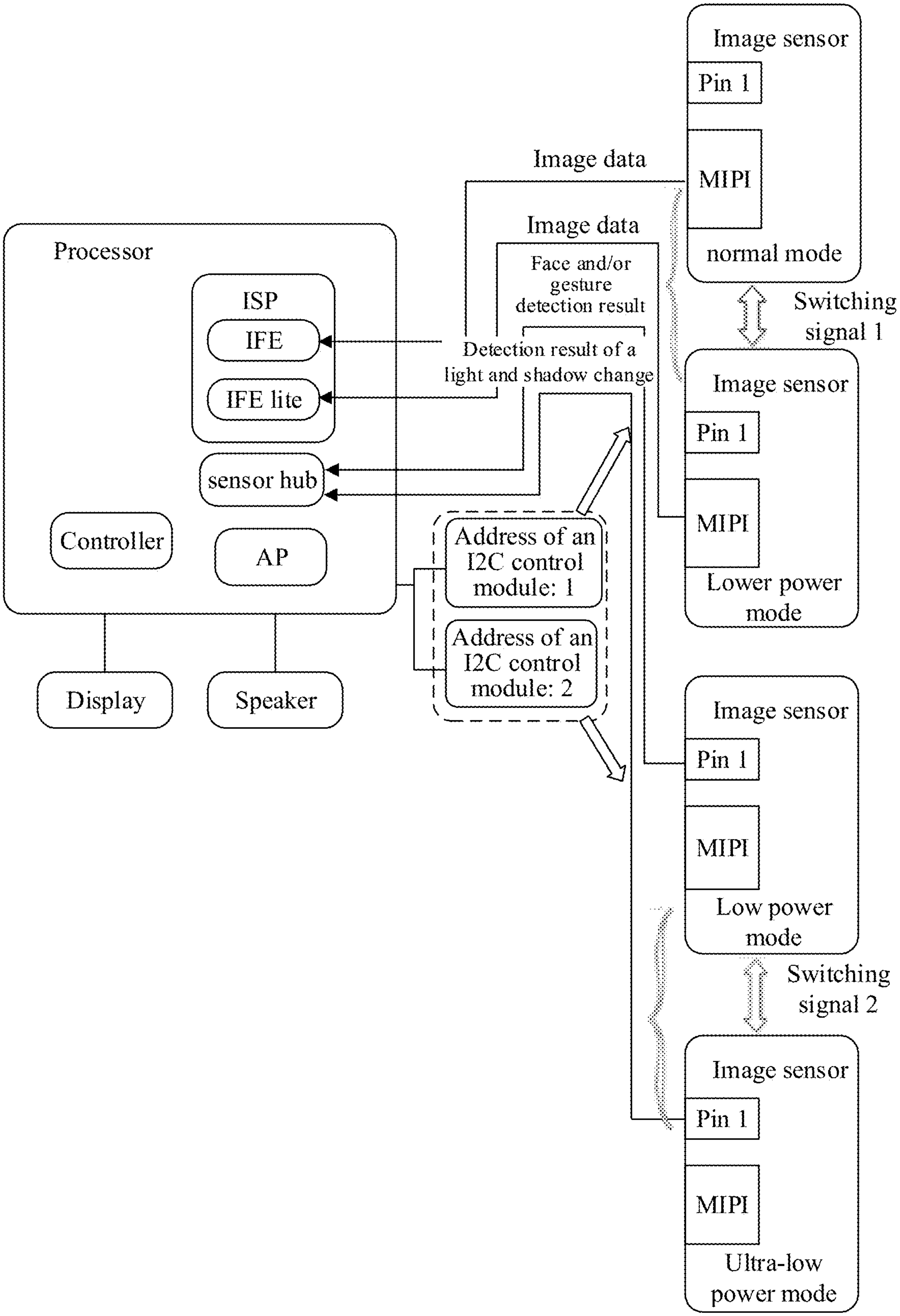
FIG. 12D(1) and FIG. 12D(2) are a sequence diagram of an operation mode switching control method according to Embodiment 5 of this application.

In an example, the address of one I2C control module is set to 1, and the address of the other I2C control module is set to 2. Refer to FIG. 12B. When the sensor hub delivers an I2C address 1, the I2C control module whose address is set to 1 transmits a control signal to the image sensor, and the image sensor may enter the normal mode or the lower power mode. When the sensor hub delivers an I2C address 2, the I2C control module whose address is set to 2 transmits a control signal to the image sensor, and the image sensor may enter the ultra-low power mode or the low power mode. This embodiment is described by using this example.

In another possible implementation, one I2C control module is disposed in the image sensor, two addresses are set for the I2C control module, and the two addresses are multiplexed in a time division manner. One address corresponds to the normal mode and the lower power mode, and the other address corresponds to the low power mode and the ultra-low power mode. The sensor hub delivers one I2C address of the I2C control module, and the I2C control module is triggered, and can transmit a control signal to the image sensor. The image sensor detects the I2C control module that transmits the control signal, to enter an operation mode corresponding to the I2C address.

The pin 2 of the image sensor is configured to transmit 1 bit of level signal. Similarly, the pin 2 of the processor is also configured to transmit 1 bit of level signal. In some examples, the pin 2 of the image sensor may be referred to as a PONV pin or an Xshutdown2 pin.

In this embodiment, the pin 2 of the image sensor is a switching pin, and is configured to receive a switching signal 1 and a switching signal 2 that are used for operation mode switching of the image sensor. The switching signal 1 is used to control the image sensor to run in the normal mode or the lower power mode, and the switching signal 2 is used to control the image sensor to run in the low power mode or the ultra-low power mode.

The switching signal 1 includes a high level and a low level. In an example, with reference to FIG. 12B, a high-level switching signal 1 is used to control the image sensor to enter the lower power mode, and a low-level switching signal 1 is used to control the image sensor to enter the normal mode. Certainly, the high-level switching signal 1 may alternatively control the image sensor to switch to the normal mode, and the low-level switching signal 1 controls the image sensor to enter the lower power mode. In this embodiment, an example in which the low-level switching signal 1 controls the image sensor to switch to the normal mode and the high-level switching signal 1 controls the image sensor to switch to the lower power mode is used for description.

The switching signal 2 also includes a high level and a low level. In an example, a high-level switching signal 2 is used to control the image sensor to enter the low power mode, and a low-level switching signal 2 is used to control the image sensor to enter the ultra-low power mode. Certainly, the high-level switching signal 2 may alternatively control the image sensor to switch to the ultra-low power mode, and the low-level switching signal 2 controls the image sensor to switch to the low power mode. In this embodiment, an example in which the low-level switching signal 2 controls the image sensor to switch to the low power mode and the high-level switching signal 2 controls the image sensor to switch to the ultra-low power mode is used for description.

In some embodiments, the IFE lite or the IFE in the ISP of the processor, or the AP or the sensor hub of the processor generates the switching signal 1 and the switching signal 2, and sends the switching signal 1 and the switching signal 2 by using the pin 2 of the processor, and then the switching signal 1 and the switching signal 2 are transmitted to the image sensor by using the pin 2 of the image sensor. The image sensor performs operation mode switching based on the switching signal 1 or the switching signal 2.

In this embodiment, an example in which the sensor hub generates the switching signal 2 and the switching signal 1 is used for description.

It should be further noted that a pin that is of the image sensor and that receives the switching signal 1 and a pin that is of the image sensor and that receives the switching signal 2 may alternatively be different pins. In an example, the pin 2 of the image sensor receives the switching signal 1, and another pin receives the switching signal 2. The following uses an example in which the pin 2 separately receives the switching signal 1 and the switching signal 2 for description.

It should be further noted that the image sensor may be configured as follows: An initial running mode is the ultra-low power mode. Based on this, when the electronic device is powered on, the image sensor of the front-facing camera runs in the ultra-low power mode in response to a power-on instruction.

If the initial running mode is not configured for the image sensor, after the electronic device is powered on, the processor of the electronic device generates a first instruction to control the front-facing camera to run. Specifically, the image sensor of the front-facing camera runs in the ultra-low power mode in response to the first instruction. In some embodiments, the first instruction may be generated by a camera driver module of the controller.

In a running process after the electronic device is powered on, the image sensor may perform operation mode switching based on different running states of the electronic device. The following describes, with reference to FIG. I2C (for ease of drawing, the pin 1, the pin 2, the MIPI interface, and the I2C interface of the processor are not depicted in FIG. I2C, the I2C interface and the pin 2 of the image sensor are not depicted either, the I2C control modules are depicted outside the image sensor, and these constitute no limitation on internal structures of the processor and the image sensor) and FIG. 12D(1) and FIG. 12D(2), an operation mode switching control method provided in this embodiment.

The operation mode switching control method provided in this embodiment is applied to the electronic device mentioned above. When the electronic device is powered on, the image sensor enters the ultra-low power mode by default, or usually enters the ultra-low power mode under control of the camera driver. The operation mode switching control method provided in this embodiment includes the following steps.

S1201: The image sensor in the ultra-low power mode generates an image with ultra-low resolution at a time interval.

In some embodiments, when the electronic device is powered on, a display is in a screen-on state and outputs a lock screen interface, and the image sensor runs in the ultra-low power mode to generate the image with ultra-low resolution at a configured time interval.

In some other embodiments, when the electronic device is in a standby state, and the display is in a screen-off state, the image sensor also runs in the ultra-low power mode to generate the image with ultra-low resolution at a configured time interval.

S1202: The image sensor in the ultra-low power mode detects a light and shadow change based on image data of the image with ultra-low resolution, to obtain a detection result of the light and shadow change.

The image sensor detects the light and shadow change based on the image data of the image with ultra-low resolution, to determine whether there is the light and shadow change in front of the front-facing camera of the electronic device.

S1203: The image sensor sends the detection result of the light and shadow change to the sensor hub.

The image sensor may input the detection result of the light and shadow change into the sensor hub by using the pin 1.

The sensor hub may perform some events with low power consumption based on the detection result of the light and shadow change. For example, if it is detected that the front-facing camera detects the light and shadow change, the following functions are performed: maintaining the display in the screen-on state, turning down a ringtone volume, controlling the display to automatically rotate based on a face direction, triggering screenshot taking/playing and pause, and turning a page.

S1204: The sensor hub determines, based on the detection result of the light and shadow change, that the front-facing camera of the electronic device detects the light and shadow change, and generates an I2C address 2 and a low-level switching signal 2.

When the sensor hub determines that the front-facing camera of the electronic device detects the light and shadow change, it indicates that a user may be using the electronic device and operation mode switching needs to be performed on the image sensor. Therefore, the sensor hub generates the I2C address 2 and the low-level switching signal 2, and controls the image sensor to switch from the ultra-low power mode to the low power mode.

It should be further noted that, when the sensor hub determines that the front-facing camera of the electronic device detects no light and shadow change, the image sensor is continuously in the ultra-low power mode.

In some embodiments, the I2C address 2 and the switching signal 2 may alternatively be generated by the IFE, the IFE lite, or the AP. Specifically, the IFE, the IFE lite, or the AP interacts with the sensor hub. When the sensor hub determines, based on the detection result of the light and shadow change, that the front-facing camera of the electronic device detects the light and shadow change, the IFE, the IFE lite, or the AP generates the I2C address 2 and the low-level switching signal 2. Alternatively, the IFE, the IFE lite, or the AP receives the detection result of the light and shadow change, determines, based on the detection result of the light and shadow change, that the front-facing camera of the electronic device detects the light and shadow change, and generates the I2C address 2 and the low-level switching signal 2.

S1205: The sensor hub sends the I2C address 2 and the low-level switching signal 2 to the image sensor.

The sensor hub may send the low-level switching signal 2 to the image sensor by using the pin 2, and transmit the I2C address 2 through the I2C interface. The image sensor receives the I2C address 2 through the I2C interface. The I2C address 2 is further transmitted to the I2C control module whose address is set to 2 in the image sensor. The I2C control module whose address is set to 2 is triggered, and can transmit a control signal to the image sensor. The image sensor detects the I2C control module that transmits the control signal, and may enter the low power mode or the ultra-low power mode. Further, the image sensor receives the low-level switching signal 2, and switches an operation mode from the ultra-low power mode to the low power mode in response to the low-level switching signal 2.

It should be further noted that switching of the image sensor between the ultra-low power mode and the low power mode may alternatively be implemented in an active switching manner. Specifically, when determining, based on the detection result of the light and shadow change, that the front-facing camera of the electronic device detects the light and shadow change, the image sensor switches the operation mode to the low power mode; and when determining that the front-facing camera of the electronic device detects no light and shadow change, the image sensor maintains in the ultra-low power mode.

When active switching is used between the ultra-low power mode and the low power mode, the foregoing steps S1204 and S1205 do not need to be performed.

S1206: The image sensor in the low power mode generates an image with low resolution at a time interval.

S1207: The image sensor performs face and/or gesture detection based on image data of the image with low resolution, to obtain a face and/or gesture detection result.

The image sensor may perform face detection based on the image data of the image with low resolution. When a face is detected, it may be determined that the user is using the electronic device. The image sensor may alternatively perform gesture detection based on the image data of the image with low resolution. When a preconfigured gesture is detected, it may also be determined that the user is using the electronic device. Certainly, the image sensor may alternatively perform face detection and gesture detection based on the image data of the image with low resolution, to obtain a face detection result and a gesture detection result.

It should be further noted that when the image sensor actively switches to the ultra-low power mode or the low power mode, the image sensor may further determine, based on the face and/or gesture detection result, that no face and/or gesture appears in an image shot by the front-facing camera of the electronic device, and the image sensor maintains in the low power mode. Alternatively, within a time period, for example, 5 seconds, when it is continuously determined, based on the face and/or gesture detection result, that no face and/or gesture appears in the image shot by the front-facing camera of the electronic device, the image sensor is controlled to switch to the ultra-low power mode.

S1208: The image sensor sends the face and/or gesture detection result to the sensor hub.

When separately performing face detection or gesture detection, the image sensor may send the face or gesture detection result to the sensor hub.

Specifically, the image sensor may send the face and/or gesture detection result to the sensor hub by using the pin 1.

S1209: The sensor hub determines, based on the face and/or gesture detection result, that a face and/or gesture appears in the image shot by the front-facing camera of the electronic device, and generates an I2C address 1 and a high-level switching signal 1.

It should be further noted that if the sensor hub determines, based on the face and/or gesture detection result received within a preset time period, for example, 5 seconds, that no face and/or gesture appears in the image shot by the front-facing camera of the electronic device, the image sensor is controlled to continuously run in the low power mode. Alternatively, the sensor hub generates and sends an I2C address 2 and a high-level switching signal 2 to the image sensor, to control the image sensor to switch to the ultra-low power mode for running.

S1210: The sensor hub sends the I2C address 1 and the high-level switching signal 1 to the image sensor, to control the image sensor to switch to the lower power mode.

The image sensor receives the I2C address 1 and the high-level switching signal 1, and switches, with reference to the I2C address 1 and the high-level switching signal 1, to the lower power mode for running.

Specifically, the sensor hub may send the high-level switching signal 1 to the image sensor by using the pin 2, and transmit the I2C address 1 through the I2C interface. After receiving the I2C address 1 through the I2C interface, the image sensor transmits the I2C address 1 to the I2C control module whose address is set to 1 in the image sensor. The I2C control module whose address is set to 1 is triggered, and can transmit a control signal to the image sensor. The image sensor detects the I2C control module that transmits the control signal, and may enter the normal mode or the lower power mode. Further, the image sensor receives the high-level switching signal 1, and the image sensor is controlled to enter the lower power mode.

S1211: The image sensor in the lower power mode generates an image with lower resolution at a time interval.

S1212: The image sensor in the lower power mode sends image data of the image with lower resolution to the image front end lite IFE lite.

The image sensor sends the image data of the image with lower resolution to the image front end lite IFE lite by using an MIPI pin.

In some embodiments, the image front end lite IFE lite may store the image data of the image with lower resolution in a secure buffer of a memory. After the image front end lite IFE lite stores the image data of the image with lower resolution in the secure buffer of the memory, the controller of the processor may perform a plurality of events based on the image data of the image with lower resolution, for example, perform functions such as detection of human eyes gazing at the display (also referred to as an AO solution), controlling the display to automatically rotate based on a face direction, triggering screenshot taking/playing and pause, and turning a page.

It should be further noted that, in a process in which the controller of the processor performs a plurality of events based on the image data of the image with lower resolution, if it is determined, based on the image data of the image with lower resolution, that an exit condition of a performed event is met, for example, when the AO solution is performed and the controller continuously determines, based on the foregoing content, that human eyes in the image do not gaze at the display, the image sensor may continuously run in the lower power mode, or the image sensor is controlled to switch to an operation mode that has lower power consumption than that of the lower power mode.

In some embodiments, the sensor hub generates and sends the I2C address 2 and the low-level switching signal 2 to the image sensor, to control the image sensor to switch to the low power mode.

In some other embodiments, the sensor hub generates and sends the I2C address 2 and the high-level switching signal 2 to the image sensor, to control the image sensor to switch to the ultra-low power mode. Usually, when the display of the electronic device is in the screen-off state, the sensor hub generates the I2C address 2 and the high-level switching signal 2.

It should be further noted that the camera driver of the controller, the IFE, the IFE lite, or the AP may alternatively generate the I2C address 2, and the IFE, the IFE lite, or the AP generates the switching signal 2, or different components are used to respectively generate the I2C address 2 and the switching signal 2.

When the image sensor runs in the ultra-low power mode, the foregoing step S1201 is performed. When the image sensor runs in the low power mode, the foregoing step S1206 is performed.

S1213: The sensor hub generates the I2C address 1 and a low-level switching signal 1.

The user enables the front-facing camera of the electronic device, and the display of the electronic device displays a shooting mode of the front-facing camera. The electronic device responds to an operation of the user, the front-facing camera shoots an image, and the display displays the shot image.

Specifically, the front-facing camera of the electronic device is triggered by a control instruction and is enabled, and the image sensor needs to enter the normal mode. In some embodiments, after the front-facing camera of the electronic device is enabled, the sensor hub generates the I2C address 1 and the low-level switching signal 1, to control the image sensor to enter the normal mode.

It should be further noted that a performing location of step S1213 is not limited to that shown in FIG. 12D(2). When the image sensor runs in the ultra-low power mode and the low power mode, if the front-facing camera is triggered and enabled, the image front end IFE also generates the low-level switching signal 1 to switch the image sensor to the normal mode for running.

S1214: The sensor hub sends the I2C address 1 and the low-level switching signal 1 to the image sensor.

The sensor hub sends the low-level switching signal 1 to the image sensor by using the pin 2, and transmits the I2C address 1 through the I2C interface. The I2C control module whose address is set to 1 in the image sensor is in a triggered state, and can transmit a control signal to the image sensor. The image sensor detects the I2C control module that transmits the control signal, and may enter the normal mode or the lower power mode. Further, the image sensor receives the low-level switching signal 1, and switches to the normal mode.

S1215: The image sensor in the normal mode generates an image with standard resolution.

In some embodiments, the image sensor may also generate the image with standard resolution by using a configured time interval as a cycle.

S1216: The image sensor in the normal mode sends image data of the image with standard resolution to the image front end IFE.

In some embodiments, the image sensor in the normal mode may send the image data of the image with standard resolution to the image front end IFE by using the MIPI pin. The image front end IFE processes the image data of the image with standard resolution, and the display displays processed image data.

S1217: The sensor hub generates an I2C address 1 and a high-level switching signal 1.

If the user disables the front-facing camera, the electronic device performs a corresponding procedure in response to the operation of the user. Specifically, the front-facing camera of the electronic device is triggered by a control instruction and is disabled, and the image sensor needs to switch from the normal mode to another operation mode.

In some embodiments, the sensor hub may generate the I2C address 1 and the high-level switching signal 1, to control the image sensor to switch from the normal mode to the lower power mode.

S1218: The sensor hub sends the I2C address 1 and the high-level switching signal 1 to the image sensor.

Certainly, when the sensor hub generates the I2C address 1 and the high-level switching signal 1, the I2C address 1 is transmitted to the image sensor through the I2C interface. The I2C control module whose address is set to 1 transmits a control signal to the image sensor, and the image sensor switches to the lower power mode with reference to the I2C address 1 and the high-level switching signal 1.

The image sensor switches to the lower power mode and runs in the lower power mode, and the foregoing step 1211 may be performed.

It should be further noted that when the front-facing camera of the electronic device is triggered by a control instruction and is disabled, the processor may alternatively switch the operation mode of the image sensor based on a current state of the electronic device.

In some embodiments, when the display of the electronic device is in the screen-off state, the sensor hub generates an I2C address 2 and a high-level switching signal 2, to control the image sensor to switch from the normal mode to the ultra-low power mode.

In some embodiments, when the display of the electronic device is in the screen-off state, the sensor hub generates an I2C address 2 and a low-level switching signal 2, to control the image sensor to switch from the normal mode to the low power mode.

It should be noted that, when the image sensor is in the ultra-low power mode, the low power mode, and the lower power mode, the automatic exposure module or an automatic exposure control module of the image sensor may adjust exposure parameters based on brightness of an image generated by the image sensor, so that the image sensor generates an image whose brightness meets a requirement.

It should be further noted that, in an application scenario in which the processor sends the switching signal 1 and the switching signal 2 by using different pins, the I2C address 1 may correspond to any operation mode in the first group of operation modes, and the I2C address 2 may correspond to any operation mode in the second group of operation modes. In addition, the lower power mode may be determined based on the switching signal 1, or may be determined based on the I2C address and the switching signal 1. The low power mode may be determined based on the switching signal 2, or may be determined based on the I2C address and the switching signal 2.

In an example, the I2C address 1 corresponds to the normal mode, the I2C address 2 corresponds to the ultra-low power mode, the lower power mode corresponds to the high-level switching signal 1, and the low power mode corresponds to the low-level switching signal 2. The solution is further described by using the foregoing example.

Specifically, in the foregoing step S1204, the sensor hub generates the low-level switching signal 2, to control the image sensor to run in the low power mode.

In the foregoing step S1209, the sensor hub may further determine, based on the face and/or gesture detection result, that a face and/or gesture appears in the image shot by the front-facing camera of the electronic device, and generate the high-level switching signal 1, to control the image sensor to run in the lower power mode.

In the foregoing step S1213, the sensor hub generates the I2C address 1, to control the image sensor to run in the normal mode.

In the foregoing step S1217, the sensor hub generates the I2C address 2, to control the image sensor to switch to the ultra-low power mode. Alternatively, the sensor hub generates the low-level switching signal 2, to control the image sensor to switch to the low power mode. Alternatively, the sensor hub generates the high-level switching signal 1, to control the image sensor to switch to the lower power mode.

It should be further noted that a manner in which the four operation modes of the image sensor are divided into two groups may be different from the foregoing content. The manner may be as follows: The normal mode is a first group of operation modes, and the lower power mode, the low power mode, and the ultra-low power mode are a second group of operation modes. When the image sensor runs in the second group of operation modes, power consumption is low. Therefore, the second group of operation modes may also be referred to as low-power awareness modes.

In a possible implementation, switching of the image sensor between the first group of operation modes and the second group of operation modes may be implemented by using high-level and low-level switching signals, and switching of the image sensor among the operation modes in the second group of operation modes may be implemented by using different I2C addresses. The high-level and low-level switching signals and the I2C addresses may be generated by a same component of the processor, or may be generated by different components. The high-level and low-level switching signals may be generated by the IFE lite or the IFE in the ISP of the processor, or the AP or the sensor hub of the processor. The I2C addresses may be generated by the camera driver of the controller, the IFE lite or the IFE in the ISP of the processor, or the AP or the sensor hub of the processor.

In an example, the processor generates and sends a low-level switching signal to the image sensor, to control the image sensor to run in the normal mode; and the processor generates and sends a high-level switching signal and different I2C addresses to the image sensor, to control the image sensor to run in the second group of operation modes. Specifically, the processor generates and sends an I2C address 1 to the image sensor, to control the image sensor to run in the lower power mode; the processor generates and sends an I2C address 2 to the image sensor, to control the image sensor to run in the low power mode; and the processor generates and sends an address 3 to the image sensor I2C, to control the image sensor to run in the ultra-low power mode.

In another possible implementation, switching of the image sensor between the first group of operation modes and the second group of operation modes may be implemented by using high-level and low-level switching signals, and switching of the image sensor among the operation modes in the second group of operation modes may be implemented by using a same I2C address and different control signals.

Certainly, the high-level and low-level switching signals, the I2C address, and the control signals may be generated by a same component of the processor, or may be generated by different components. The high-level and low-level switching signals may be generated by the IFE lite or the IFE in the ISP of the processor, or the AP or the sensor hub of the processor. The I2C address and the control signals may be generated by the camera driver of the controller, the IFE lite or the IFE in the ISP of the processor, or the AP or the sensor hub of the processor.

In an example, the processor generates and sends a low-level switching signal to the image sensor, to control the image sensor to run in the normal mode; and the processor generates and sends a high-level switching signal, an I2C address, and a control signal to the image sensor, to control the image sensor to run in the second group of operation modes. Specifically, the processor generates and sends an I2C address 1 and a first control signal to the image sensor, to control the image sensor to run in the lower power mode; the processor generates and sends the I2C address 1 and a second control signal to the image sensor, to control the image sensor to run in the low power mode; and the processor generates and sends the address 1 and a third control signal to the image sensor I2C, to control the image sensor to run in the ultra-low power mode.

The first control signal, the second control signal, and the third control signal each may be understood as an imperative switching signal. The first control signal is used to control the image sensor to run in the lower power mode, the second control signal is used to control the image sensor to run in the low power mode, and the third control signal is used to control the image sensor to run in the ultra-low power mode.

The I2C interface of the image sensor receives the I2C address 1 and the control signal. The I2C control module whose address is set to 1 is triggered, and further transmits the control signal to the image sensor. The image sensor parses the control signal, and determines an operation mode specified by the control signal, and the image sensor switches to the operation mode specified by the control signal.

It should be noted that, that the processor sends the I2C address 1 and the control signal may be understood as that the processor sends, to the image sensor by using the I2C bus, information that carries the I2C address 1 and the control signal.

It should be further noted that, in this implementation, when sending the low-level switching signal to the image sensor, the processor may also send the I2C address 1 and the control signal. However, the control signal is a conventional control signal, and does not have a function of controlling the image sensor to run in a specific operation mode.

In another possible implementation, switching of the image sensor between the first group of operation modes and the second group of operation modes may be implemented by using high-level and low-level switching signals. In an example, the first group of operation modes correspond to the high-level switching signal, and the lower power mode corresponds to the low-level switching signal; or vice versa. During switching of the image sensor among the operation modes in the second group of operation modes, the image sensor may switch between the ultra-low power mode and the low power mode in an active manner.

It should be further noted that, in a scenario in which one of the high-level and low-level switching signals corresponds to the first group of operation modes of the image sensor, and the other of the high-level and low-level switching signals corresponds to the second group of operation modes, the processor may further generate an I2C address to control the image sensor to run in the lower power mode.

In another possible implementation, switching of the image sensor between the first group of operation modes and the second group of operation modes may be implemented by using different I2C addresses, and switching of the image sensor among the operation modes in the second group of operation modes may be implemented by using a same I2C address and different control signals.

The I2C address or the I2C address and the different control signals may be generated and sent to the image sensor by the camera driver of the controller, the IFE lite or the IFE in the ISP of the processor, or the AP or the sensor hub of the processor.

In an example, the processor generates and sends an I2C address 1 to the image sensor, to control the image sensor to run in the normal mode; and the processor generates and sends an I2C address 2 and a control signal to the image sensor, to control the image sensor to run in the second group of operation modes. Specifically, the processor generates and sends the I2C address 2 and a first control signal to the image sensor, to control the image sensor to run in the lower power mode; the processor generates and sends the I2C address 2 and a second control signal to the image sensor, to control the image sensor to run in the low power mode; and the processor generates and sends the address 2 and a third control signal to the image sensor I2C, to control the image sensor to run in the ultra-low power mode.

Same as the foregoing implementation, the first control signal, the second control signal, and the third control signal each may be understood as an imperative switching signal. The first control signal is used to control the image sensor to run in the lower power mode, the second control signal is used to control the image sensor to run in the low power mode, and the third control signal is used to control the image sensor to run in the ultra-low power mode.

When the I2C interface of the image sensor receives the I2C address 1, the I2C control module whose address is set to 1 is triggered to control the image sensing to run in the normal mode. When the I2C interface of the image sensor receives the I2C address 2 and the control signal, the I2C control module whose address is set to 2 is triggered, and further transmits the control signal to the image sensor. The image sensor parses the control signal, and determines an operation mode specified by the control signal, and the image sensor switches to the operation mode specified by the control signal.

It should be further noted that, in this implementation, the processor may also send the I2C address 1 and the control signal to the image sensor, and the control signal may be a conventional control signal, or may be an imperative switching signal, so that the image sensor is controlled to run in the normal mode.

In another possible implementation, switching of the image sensor between the first group of operation modes and the second group of operation modes may be implemented by using different I2C addresses. During switching of the image sensor among the operation modes in the second group of operation modes, the image sensor may switch between the ultra-low power mode and the low power mode in an active manner.

The processor may generate one I2C address to control the image sensor to run in the normal mode, and generate another I2C address to control the image sensor to run in the lower power mode.

In the foregoing several possible implementations, for a specific procedure in which the processor and the image sensor implements operation mode switching of the image sensor in the switching manners provided in the implementations, refer to the content provided in Embodiment 5.

It should be further noted that control logic is simple because different I2C addresses are used to control the image sensor to switch to different modes. Therefore, control of switching of the image sensor among the four operation modes can be implemented by sending different I2C addresses.

Figure 13A:
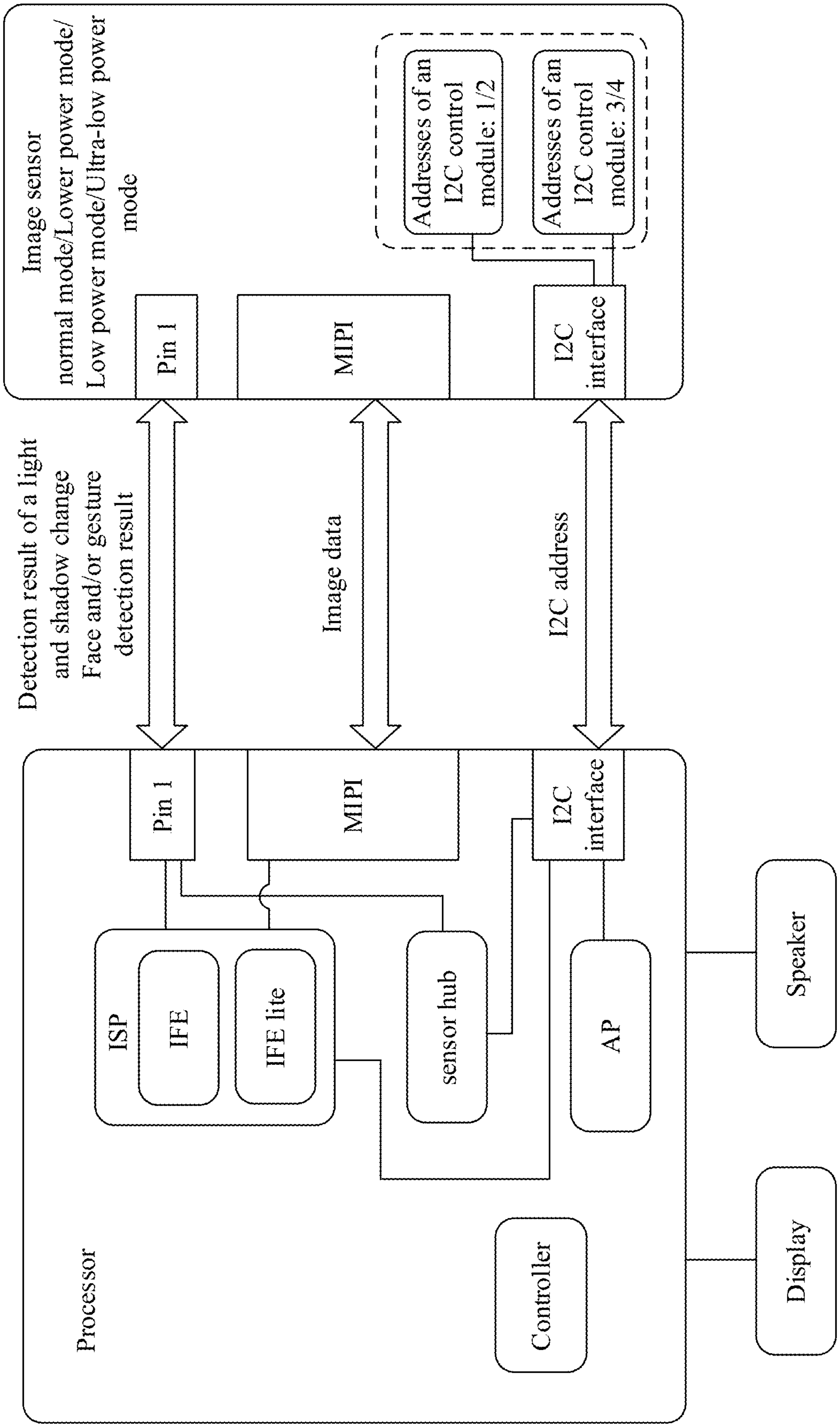
FIG. 13A and FIG. 13B are schematic diagrams of connections between an image sensor and a processor in an electronic device according to Embodiment 5 of this application.

In some embodiments, as shown in FIG. 13A, two I2C control modules are disposed in the image sensor, and two addresses are set for each I2C control module. One address of a first I2C control module corresponds to the normal mode of the image sensor, and the other address of the first I2C control module corresponds to the lower power mode. One address of a second I2C control module corresponds to the low power mode, and the other address of the second I2C control module corresponds to the ultra-low power mode.

In an example, an address of one I2C control module is set to 1, addresses of the other I2C control module are set to 2 and 3, and the two addresses are multiplexed in a time division manner. When the sensor hub delivers an I2C address 1, the I2C control module whose address is set to 1 transmits a control signal to the image sensor, and the image sensor enters the normal mode. When the sensor hub delivers an I2C address 2, the I2C control module whose addresses are set to 2 and 3 transmits a control signal to the image sensor, and the image sensor enters the lower power mode corresponding to the address 2. When the sensor hub delivers an I2C address 3, the I2C control module whose addresses are set to 2 and 3 transmits a control signal to the image sensor, and the image sensor enters the lower power mode corresponding to the address 3.

Figure 13B:
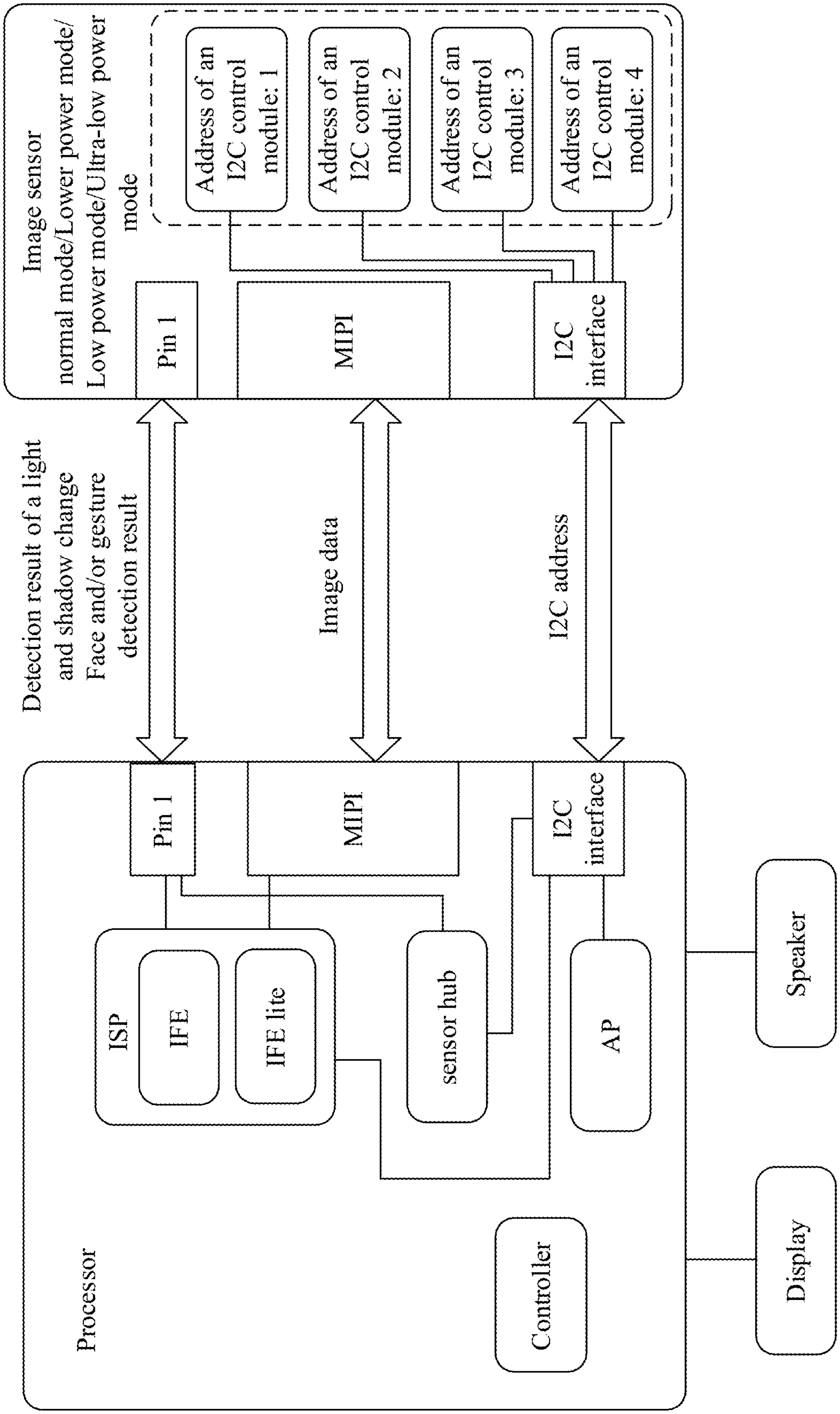

In some embodiments, as shown in FIG. 13B, four I2C control modules are disposed in the image sensor. An address of one I2C control module corresponds to the normal mode of the image sensor, an address of one I2C control module corresponds to the lower power mode, an address of one I2C control module corresponds to the low power mode, and an address of one I2C control module corresponds to the ultra-low power mode.

In an example, an address of one I2C control module is set to 1, an address of another I2C control module is set to 2, an address of another I2C control module is set to 3, and an address of another I2C control module is set to 4. When the sensor hub delivers an I2C address 1, the I2C control module whose address is set to 1 transmits a control signal to the image sensor, and the image sensor enters the normal mode. When the sensor hub delivers an I2C address 2, the I2C control module whose address is set to 2 transmits a control signal to the image sensor, and the image sensor enters the lower power mode. When the sensor hub delivers an I2C address 3, the I2C control module whose address is set to 3 transmits a control signal to the image sensor, and the image sensor enters the low power mode. When the sensor hub delivers an I2C address 3, the I2C control module whose address is set to 3 transmits a control signal to the image sensor, and the image sensor enters the ultra-low power mode.

Embodiment 6

For the foregoing problem 3 that use of the processor is limited, another embodiment of this application further provides an electronic device. The electronic device includes a processor and an image sensor that can interact with the processor. The image sensor is usually disposed in a front-facing camera of the electronic device. For a hardware structure and a software architecture of the electronic device, refer to the foregoing content. Details are not described herein again.

Figure 14:
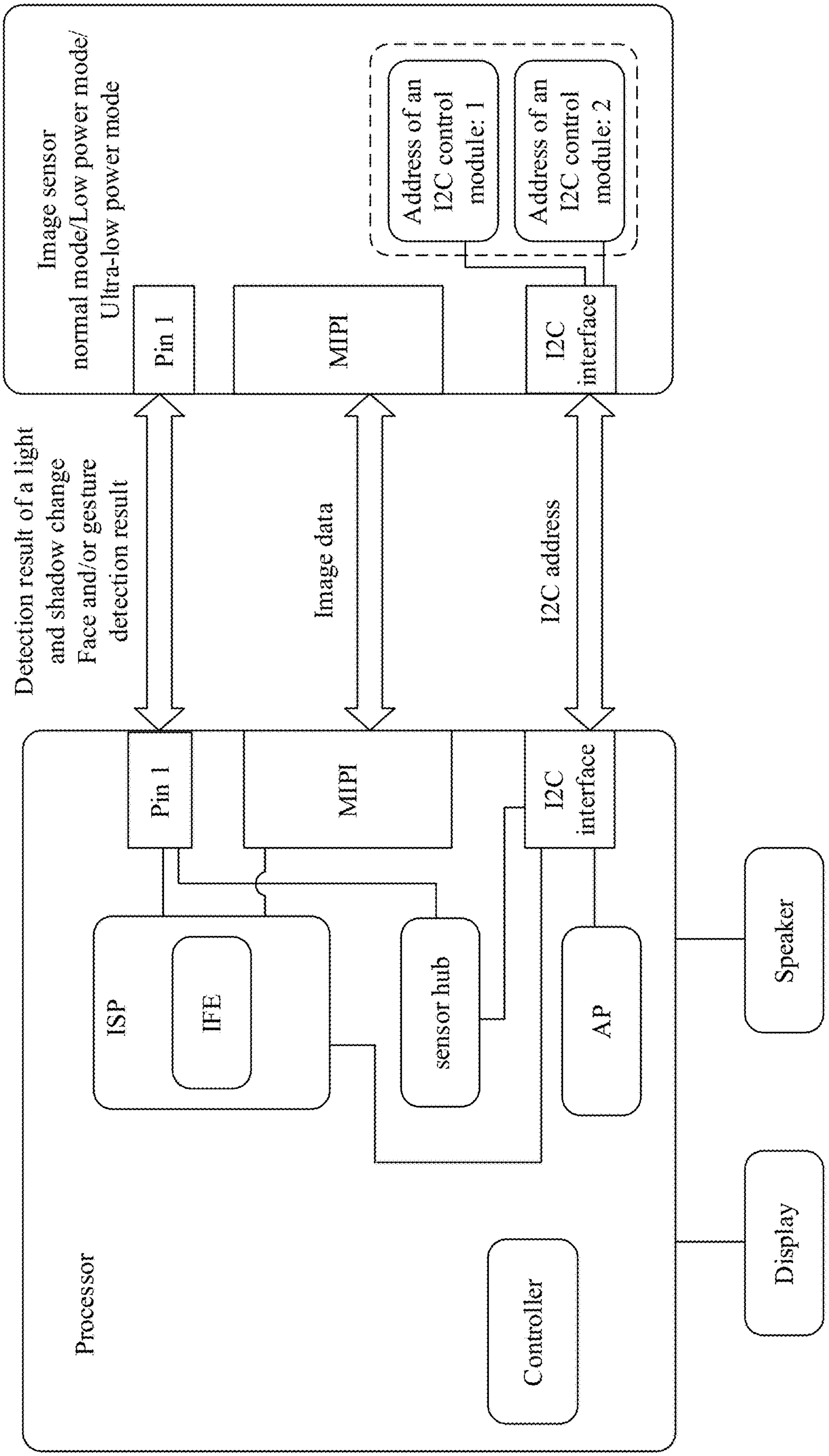
FIG. 14 is a schematic diagram of a connection between an image sensor and a processor in an electronic device according to Embodiment 6 of this application.

Refer to FIG. 14. In the electronic device provided in this embodiment, the processor includes a controller, an image signal processor ISP, a smart sensor hub sensor hub, and an application processor AP. The ISP includes at least an image front end IFE. The controller may include three logic units: an AO module, an automatic exposure module, and a camera driver. For functions of the AO module, the automatic exposure module, and the camera driver, refer to the foregoing content.

Because the smart sensor hub is a conventional component in the processor, and the smart sensor hub is disposed in any common processor, using the smart sensor hub to cooperate with a low-power operation mode of the image sensor can avoid a limitation on use of the processor by use of the image front end lite IFE lite.

In this embodiment, the image sensor includes three operation modes, which are respectively a normal mode, a low power mode, and an ultra-low power mode. For details, refer to the content in the foregoing Embodiment 1. Details are not described herein again. The normal mode is a normal operation mode of the image sensor, and resolution of an image generated in this mode is resolution configured by the image sensor, for example, may be 4208*3120. The low power mode has lower power consumption than that of the normal mode, and power consumption of the ultra-low power mode is lowest. Resolution of an image with ultra-low resolution that is generated by the image sensor in the ultra-low power mode is usually 16*12; and resolution of an image with low resolution that is generated by the image sensor in the low power mode may be usually 64*48, 72*54, 80*60, 96*72, 120*90, or 128*96.

An MIPI interface, a pin 1, and an I2C interface are disposed in each of the image sensor and the processor.

The pins 1 of the image sensor and the processor are configured to transmit a level signal that needs to be sent outward by the image sensor, for example, a detection result indicated by a high level or a low level.

The MIPI interfaces of the image sensor and the processor are configured to transmit image data of an image generated by the image sensor.

The I2C interfaces of the image sensor and processor are configured to transmit different I2C addresses to control the image sensor to enter different operation modes. In addition, an I2C control module connected to the I2C interface is disposed in the image sensor, and the I2C control module may interact with the processor through the I2C interface.

The I2C control module may be understood as a logic module disposed in the image sensor, or may be understood as a hardware component of the image sensor.

In some embodiments, the normal mode of the image sensor corresponds to one of a high-level signal and a low-level signal, the low power mode and the ultra-low power mode of the image sensor correspond to the other one of the high-level signal and the low-level signal, and switching of the image sensor between the low power mode and the ultra-low power mode is completed by the processor by delivering an I2C address and different control signals.

In some embodiments, the normal mode of the image sensor corresponds to one I2C address, and the low power mode and the ultra-low power mode of the image sensor correspond to one I2C address. Correspondingly, two I2C control modules may be disposed in the image sensor, and each I2C control module corresponds to one I2C address. Switching of the image sensor between the low power mode and the ultra-low power mode may be completed by the image sensor in an active manner, may be completed by the processor in a manner of delivering the high-level signal and the low-level signal by using a pin, or may be completed by using the I2C address and different control signals.

In some embodiments, the normal mode of the image sensor corresponds to one I2C address, the low power mode of the image sensor corresponds to one I2C address, and the ultra-low power mode of the image sensor corresponds to one I2C address. Correspondingly, three I2C control modules may be disposed in the image sensor, and each I2C control module corresponds to one I2C address. Alternatively, two I2C control modules may be disposed in the image sensor, one I2C control module corresponds to an I2C address of the normal mode, the other I2C control module corresponds to an I2C address of the ultra-low power mode and an I2C address of the low power mode, and the two I2C addresses are multiplexed in a time division manner.

In some embodiments, the camera driver of the controller, the IFE lite or the IFE in the ISP of the processor, or the AP of the processor generates an I2C address, and sends the I2C address through the I2C interface of the processor. Then, the I2C address is transmitted to the image sensor through the I2C interface of the image sensor. The image sensor performs operation mode switching based on the I2C address.

The following describes an operation mode of the image sensor by using an example in which the normal mode of the image sensor corresponds to one I2C address, the low power mode and the ultra-low power mode of the image sensor correspond to one I2C address, the sensor hub generates an I2C address to perform operation mode switching on the image sensor, and the image sensor actively switches between the low power mode and the ultra-low power mode.

Specifically, an operation mode switching manner of the image sensor includes the following steps.

S1301: The image sensor in the ultra-low power mode generates an image with ultra-low resolution at a time interval, and detects a light and shadow change based on image data of the image with ultra-low resolution, to obtain a detection result of the light and shadow change.

S1302: The image sensor in the ultra-low power mode sends the detection result of the light and shadow change to the sensor hub.

The image sensor may input the detection result of the light and shadow change into the sensor hub by using the pin 1.

The sensor hub may perform some events with low power consumption based on the detection result of the light and shadow change. For example, if it is detected that the front-facing camera detects the light and shadow change, the following functions are performed: maintaining the display in the screen-on state, turning down a ringtone volume, controlling the display to automatically rotate based on a face direction, triggering screenshot taking/playing and pause, and turning a page.

S1303: When determining, based on the detection result of the light and shadow change, that the front-facing camera of the electronic device detects the light and shadow change, the image sensor in the ultra-low power mode switches an operation mode to the low power mode.

S1304: The image sensor in the low power mode generates an image with low resolution at a time interval.

S1305: The image sensor performs face and/or gesture detection based on image data of the image with low resolution, to obtain a face and/or gesture detection result.

The image sensor may perform face detection based on the image data of the image with low resolution. When a face is detected, it may be determined that the user is using the electronic device. The image sensor may alternatively perform gesture detection based on the image data of the image with low resolution. When a preconfigured gesture is detected, it may also be determined that the user is using the electronic device.

Certainly, the image sensor may alternatively perform face detection and gesture detection based on the image data of a resolution image, to obtain a face detection result and a gesture detection result.

S1306: The image sensor sends the face and/or gesture detection result to the sensor hub.

When separately performing face detection or gesture detection, the image sensor may send the face or gesture detection result to the sensor hub.

Specifically, the image sensor may send the face and/or gesture detection result to the sensor hub by using the pin 1.

The sensor hub may perform some events with low power consumption based on the face and/or gesture detection result. For example, if a face and/or gesture is detected, the following functions are performed: maintaining the display in a screen-on state, turning down a ringtone volume, controlling the display to automatically rotate based on a face direction, triggering screenshot taking/playing and pause, and turning a page.

S1307: The front-facing camera of the electronic device is triggered by a control instruction and is enabled, and the image sensor needs to enter the normal mode.

In some embodiments, after the front-facing camera of the electronic device is enabled, the sensor hub generates an I2C address 1 to control the image sensor to enter the normal mode.

S1308: The front-facing camera of the electronic device is triggered by a control instruction and is disabled, and the image sensor needs to exit the normal mode and enter the ultra-low power mode or the low power mode.

In some embodiments, the sensor hub generates an I2C address 2, and the image sensor receives the I2C address 2 to control the image sensor to enter the ultra-low power mode.

In some embodiments, the sensor hub generates an I2C address 2, and the image sensor receives the I2C address 2, to control, based on a state of the electronic device, for example, a state of the display, the image sensor to be in the low power mode or the ultra-low power mode.

The front-facing camera of the electronic device is triggered by a control instruction and is disabled, and the electronic device is in a screen-off state. The image sensor receives the I2C address 2, and the image sensor switches to the ultra-low power mode. The front-facing camera of the electronic device is triggered by a control instruction and is disabled, and the display is still in a screen-on state. The image sensor is connected to the I2C address 2, and the image sensor switches to the low power mode.

Another embodiment of this application further provides a computer-readable storage medium. The computer-readable storage medium stores instructions. When the instructions are run on a computer or a processor, the computer or the processor is enabled to perform one or more steps in any of the foregoing methods.

Another embodiment of this application further provides a computer program product including instructions. When the computer program product runs on a computer or a processor, the computer or the processor is enabled to perform one or more steps in any of the foregoing methods.

What is claimed is:

1. An operation mode switching control method, applied to an electronic device, wherein the electronic device comprises a processor and a camera, an image sensor in the camera comprises at least two operation modes, and the operation mode switching control method comprises:

sending, by the processor, a signal comprising an I2C address, to the image sensor through an I2C interface, the I2C address is associated with at least one of the at least two operation modes, wherein the signal is used to control the image sensor to run in an operation mode corresponding to the signal.

2. The operation mode switching control method according to claim 1, wherein the image sensor comprises an I2C control module, and the sending, by the processor, a signal to the image sensor through an I2C interface comprises:

sending, by the processor, the I2C address to the image sensor through the I2C interface to trigger the I2C control module corresponding to the I2C address to run, to control the image sensor to run in an operation mode corresponding to the I2C address.

3. The operation mode switching control method according to claim 2, wherein one I2C control module corresponds to two I2C addresses, and one I2C address corresponds to at least one operation mode of the image sensor.

4. The operation mode switching control method according to claim 2, wherein the image sensor comprises I2C control modules of a same quantity as that of operation modes of the image sensor, and each I2C control module corresponds to one I2C address, and one I2C address corresponds to one operation mode of the image sensor.

5. The operation mode switching control method according to claim 3, wherein one I2C address corresponds to the at least two operation modes of the image sensor, and the operation mode switching control method further comprises:

controlling, by the image sensor in response to a switching signal, the image sensor to run in one of the at least two operation modes corresponding to a same I2C address, wherein the switching signal is sent by the processor to the image sensor or is generated by the image sensor.

6. The operation mode switching control method according to claim 1, wherein the operation modes of the image sensor comprise a first operation mode and a second operation mode, the second operation mode has lower power consumption than that of the first operation mode, the first operation mode of the image sensor corresponds to a first I2C address, and the second operation mode of the image sensor corresponds to a second I2C address; and the sending, by the processor, a signal to the image sensor through an I2C interface comprises:

when determining, by the processor, that the camera is enabled, sending the first I2C address to the image sensor to control the image sensor to run in the first operation mode;

when determining, by the processor, that the camera is disabled, sending the second I2C address to the image sensor to control the image sensor to run in the second operation mode; and when determining, by the processor, that a display of the electronic device is in a screen-off state, sending the second I2C address to the image sensor to control the image sensor to run in the second operation mode.

7. The operation mode switching control method according to claim 1, wherein the at least two operation modes of the image sensor comprise a first operation mode, a second operation mode, and a third operation mode, the second operation mode has lower power consumption than that of the first operation mode, the third operation mode has lower power consumption than that of the second operation mode, the first operation mode of the image sensor corresponds to a first I2C address, the second operation mode of the image sensor corresponds to a second I2C address, and the third operation mode of the image sensor corresponds to a third I2C address; and the sending, by the processor, a signal to the image sensor through an I2C interface comprises:

when determining, by the processor, that the camera is enabled, sending the first I2C address to the image sensor to control the image sensor to run in the first operation mode;

when determining, by the processor, that the camera is disabled, sending the second I2C address to the image sensor to control the image sensor to run in the second operation mode, or sending the third I2C address to the image sensor to control the image sensor to run in the third operation mode;

when determining, by the processor, that a display of the electronic device is in a screen-off state, sending the second I2C address to the image sensor to control the image sensor to run in the second operation mode, or sending the third I2C address to the image sensor to control the image sensor to run in the third operation mode;

when determining, by the processor based on a detection result of a light and shadow change, that the camera detects the light and shadow change, sending the second I2C address to the image sensor to control the image sensor to run in the second operation mode, wherein the detection result of the light and shadow change is obtained by detecting the light and shadow change by the image sensor in the third operation mode based on image data of an image with ultra-low resolution; and when determining, by the processor based on image data of an image with lower resolution, that the electronic device meets an exit condition of the second operation mode, sending the third I2C address to the image sensor to control the image sensor to run in the third operation mode, wherein the image with lower resolution is generated by the image sensor in the second operation mode.

8. The operation mode switching control method according to claim 5, wherein the at least two operation modes of the image sensor comprise a first operation mode, a second operation mode, and a third operation mode, the second operation mode has lower power consumption than that of the first operation mode, the third operation mode has lower power consumption than that of the second operation mode, the first operation mode of the image sensor corresponds to a first I2C address, and the second operation mode and the third operation mode of the image sensor correspond to a second I2C address; and the sending, by the processor, a signal to the image sensor through an I2C interface comprises:

when determining, by the processor, that the camera is enabled, sending the first I2C address to the image sensor to control the image sensor to run in the first operation mode;

when determining, by the processor, that the camera is disabled, sending the second I2C address to the image sensor to control the image sensor to run in the second operation mode or the third operation mode; and when determining, by the processor, that a display of the electronic device is in a screen-off state, sending the second I2C address to the image sensor to control the image sensor to run in the second operation mode or the third operation mode.

9. The operation mode switching control method according to claim 8, wherein the controlling, by the image sensor in response to a switching signal, the image sensor to run in one of the at least two operation modes corresponding to a same I2C address comprises:

controlling, by the image sensor in response to a first switching signal, the image sensor to run in the second operation mode, wherein the first switching signal is generated when the processor or the image sensor determines, based on a detection result of a light and shadow change, that the camera detects the light and shadow change, and the detection result of the light and shadow change is obtained by detecting the light and shadow change by the image sensor in the third operation mode based on image data of an image with ultra-low resolution; and controlling, by the image sensor in response to a second switching signal, the image sensor to run in the third operation mode, wherein the second switching signal is generated when the processor or the image sensor determines, based on image data of an image with lower resolution, that the electronic device meets an exit condition of the second operation mode, and the image with lower resolution is generated by the image sensor in the second operation mode.

10. The operation mode switching control method according to claim 8, wherein the controlling, by the image sensor in response to a switching signal, the image sensor to run in one of the at least two operation modes corresponding to a same I2C address comprises:

receiving, by the image sensor, a control signal transmitted by an I2C control module corresponding to the second I2C address, and controlling the image sensor to run in an operation mode specified by the control signal, wherein the control signal is used to specify the third operation mode or the second operation mode.

11. The operation mode switching control method according to claim 1, wherein the operation modes of the image sensor comprise a first operation mode, a second operation mode, a third operation mode, and a fourth operation mode, the second operation mode has lower power consumption than that of the first operation mode, the fourth operation mode has lower power consumption than that of the second operation mode, the third operation mode has lower power consumption than that of the fourth operation mode, the first operation mode corresponds to a first I2C address, the second operation mode corresponds to a second I2C address, the fourth operation mode corresponds to a third I2C address, and the third operation mode corresponds to a fourth I2C address; and the sending, by the processor, a signal to the image sensor through an I2C interface comprises:

when determining, by the processor, that the camera is enabled, sending the first I2C address to the image sensor to control the image sensor to run in the first operation mode;

when determining, by the processor, that the camera is disabled, sending the second I2C address to the image sensor to control the image sensor to run in the second operation mode, sending the third I2C address to the image sensor to control the image sensor to run in the fourth operation mode, or sending the fourth I2C address to the image sensor to control the image sensor to run in the third operation mode;

when determining, by the processor, that a display of the electronic device is in a screen-off state, sending the third I2C address to the image sensor to control the image sensor to run in the fourth operation mode, or sending the fourth I2C address to the image sensor to control the image sensor to run in the third operation mode;

when determining, by the processor based on a detection result of a light and shadow change, that the camera detects the light and shadow change, sending the third I2C address to the image sensor to control the image sensor to run in the fourth operation mode, wherein the detection result of the light and shadow change is obtained by detecting the light and shadow change by the image sensor in the third operation mode based on image data of an image with ultra-low resolution;

when determining, by the processor based on a face and/or gesture detection result, that a face and/or gesture appears in an image shot by the camera, sending the second I2C address to the image sensor to control the image sensor to run in the second operation mode, wherein the face and/or gesture detection result is obtained by performing face and/or gesture detection by the image sensor in the fourth operation mode based on image data of an image with low resolution;

when determining, by the processor based on the face and/or gesture detection result, that no face and/or gesture appears in the image shot by the camera, sending the fourth I2C address to the image sensor to control the image sensor to run in the third operation mode; and when determining, by the processor based on image data of an image with lower resolution, that the electronic device meets an exit condition of the second operation mode, sending the fourth I2C address to the image sensor to control the image sensor to run in the third operation mode, wherein the image with lower resolution is generated by the image sensor in the second operation mode.

12. The operation mode switching control method according to claim 5, wherein the operation modes of the image sensor comprise a first operation mode, a second operation mode, a third operation mode, and a fourth operation mode, the second operation mode has lower power consumption than that of the first operation mode, the fourth operation mode has lower power consumption than that of the second operation mode, the third operation mode has lower power consumption than that of the fourth operation mode, the first operation mode and the second operation mode correspond to a first I2C address, and the fourth operation mode and the third operation mode correspond to a second I2C address; and the sending, by the processor, a signal to the image sensor through an I2C interface comprises:

when determining, by the processor, that the camera is enabled, sending the first I2C address to the image sensor to control the image sensor to run in the first operation mode;

when determining, by the processor, that the camera is disabled, sending the second I2C address to the image sensor to control the image sensor to run in the third operation mode;

when determining, by the processor, that the display is in a screen-off state, sending the second I2C address to the image sensor to control the image sensor to run in the third operation mode; and when determining, by the processor based on a face and/or gesture detection result, that no face and/or gesture appears in an image shot by the camera, sending the second I2C address to the image sensor to control the image sensor to run in the third operation mode, wherein the face and/or gesture detection result is obtained by performing face and/or gesture detection by the image sensor in the fourth operation mode based on image data of an image with low resolution.

13. The operation mode switching control method according to claim 12, wherein the controlling, by the image sensor in response to a switching signal, the image sensor to run in one of operation modes corresponding to a same I2C address comprises:

controlling, by the image sensor in response to a first switching signal, the image sensor to run in the fourth operation mode, wherein the first switching signal is generated when the processor or the image sensor determines, based on a detection result of a light and shadow change, that the camera detects the light and shadow change, and the detection result of the light and shadow change is obtained by detecting the light and shadow change by the image sensor in the third operation mode based on image data of an image with ultra-low resolution; and controlling, by the image sensor in response to a second switching signal, the image sensor to run in the second operation mode, wherein the second switching signal is generated when the processor determines, based on the face and/or gesture detection result, that a face and/or gesture appears in the image shot by the camera, and the face and/or gesture detection result is obtained by performing face and/or gesture detection by the image sensor in the fourth operation mode based on the image data of the image with low resolution.

14. The operation mode switching control method according to claim 3, wherein one I2C address corresponds to at least two operation modes of the image sensor, and the sending, by the processor, a signal to the image sensor through an I2C interface comprises:

sending, by the processor, the I2C address and a switching signal to the image sensor to control the image sensor to run in an operation mode corresponding to the I2C address and the switching signal.

15. The operation mode switching control method according to claim 14, wherein the operation modes of the image sensor comprise a first operation mode, a second operation mode, a third operation mode, and a fourth operation mode, the second operation mode has lower power consumption than that of the first operation mode, the fourth operation mode has lower power consumption than that of the second operation mode, the third operation mode has lower power consumption than that of the fourth operation mode, the first operation mode and the second operation mode correspond to a first I2C address, and the fourth operation mode and the third operation mode correspond to a second I2C address; and the sending, by the processor, the I2C address and a switching signal to the image sensor to control the image sensor to run in an operation mode corresponding to the I2C address and the switching signal comprises:

when determining, by the processor, that the camera is enabled, sending the first I2C address and a first switching signal to the image sensor to control the image sensor to run in the first operation mode;

when determining, by the processor, that the camera is disabled, sending the first I2C address and a second switching signal to the image sensor to control the image sensor to run in the second operation mode, sending the second I2C address and a third switching signal to the image sensor to control the image sensor to run in the fourth operation mode, or sending the second I2C address and a fourth switching signal to the image sensor to control the image sensor to run in the third operation mode;

when determining, by the processor, that a display of the electronic device is in a screen-off state, sending the second I2C address and the third switching signal to the image sensor to control the image sensor to run in the fourth operation mode, or sending the second I2C address and the fourth switching signal to the image sensor to control the image sensor to run in the third operation mode;

when determining, by the processor based on a detection result of a light and shadow change, that the camera detects the light and shadow change, sending the second I2C address and the third switching signal to the image sensor to control the image sensor to run in the fourth operation mode, wherein the detection result of the light and shadow change is obtained by detecting the light and shadow change by the image sensor in the third operation mode based on image data of an image with ultra-low resolution;

when determining, by the processor based on a face and/or gesture detection result, that a face and/or gesture appears in an image shot by the camera, sending the first I2C address and the second switching signal to the image sensor to control the image sensor to run in the second operation mode, wherein the face and/or gesture detection result is obtained by performing face and/or gesture detection by the image sensor in the fourth operation mode based on image data of an image with low resolution;

when determining, by the processor based on the face and/or gesture detection result, that no face and/or gesture appears in the image shot by the camera, sending the second I2C address and the fourth switching signal to the image sensor to control the image sensor to run in the third operation mode; and when determining, by the processor based on image data of an image with lower resolution, that the electronic device meets an exit condition of the second operation mode, sending the second I2C address and the fourth switching signal to the image sensor to control the image sensor to run in the third operation mode, wherein the image with lower resolution is generated by the image sensor in the second operation mode.

16. An electronic device, comprising:

a display;

a camera, wherein the camera comprises an image sensor, and the image sensor comprises at least two operation modes;

one or more processors; and a memory, wherein the memory stores a program, and when the program is executed by the one or more processors, the electronic device is enabled to perform the operation mode switching control method comprises:

sending, by the processor, a signal comprising an I2C address, to the image sensor through an I2C interface, the I2C address is associated with at least one of the at least two operation modes, wherein the signal is used to control the image sensor to run in an operation mode corresponding to the signal.

17. The electronic device as claimed in claim 16, wherein the image sensor comprises an I2C control module, and the sending, by the processor, a signal to the image sensor through an I2C interface comprises:

sending, by the processor, the I2C address to the image sensor through the I2C interface to trigger the I2C control module corresponding to the I2C address to run, to control the image sensor to run in an operation mode corresponding to the I2C address.

18. The electronic device as claimed in claim 17, wherein one I2C control module corresponds to two I2C addresses, and one I2C address corresponds to at least one operation mode of the image sensor.

19. The electronic device as claimed in claim 17, wherein the image sensor comprises I2C control modules of a same quantity as that of operation modes of the image sensor, and each I2C control module corresponds to one I2C address, and one I2C address corresponds to one operation mode of the image sensor.

20. The electronic device as claimed in claim 16, wherein the at least two operation modes of the image sensor comprise a first operation mode, a second operation mode, and a third operation mode, the second operation mode has lower power consumption than that of the first operation mode, the third operation mode has lower power consumption than that of the second operation mode, the first operation mode of the image sensor corresponds to a first I2C address, the second operation mode of the image sensor corresponds to a second I2C address, and the third operation mode of the image sensor corresponds to a third I2C address; and the sending, by the processor, a signal to the image sensor through an I2C interface comprises:

when determining, by the processor, that the camera is enabled, sending the first I2C address to the image sensor to control the image sensor to run in the first operation mode;

when determining, by the processor, that the camera is disabled, sending the second I2C address to the image sensor to control the image sensor to run in the second operation mode, or sending the third I2C address to the image sensor to control the image sensor to run in the third operation mode;

when determining, by the processor, that a display of the electronic device is in a screen-off state, sending the second I2C address to the image sensor to control the image sensor to run in the second operation mode, or sending the third I2C address to the image sensor to control the image sensor to run in the third operation mode;

when determining, by the processor based on a detection result of a light and shadow change, that the camera detects the light and shadow change, sending the second I2C address to the image sensor to control the image sensor to run in the second operation mode, wherein the detection result of the light and shadow change is obtained by detecting the light and shadow change by the image sensor in the third operation mode based on image data of an image with ultra-low resolution; and when determining, by the processor based on image data of an image with lower resolution, that the electronic device meets an exit condition of the second operation mode, sending the third I2C address to the image sensor to control the image sensor to run in the third operation mode, wherein the image with lower resolution is generated by the image sensor in the second operation mode.

* * * * *